(12) United States Patent      (10) Patent No.:      US 12,597,141 B2

Retterath      (45) Date of Patent:      Apr. 7, 2026

---

(54) SYSTEM FOR OPTICAL DETERMINATION OF COEFFICIENT OF FRICTION FOR A SURFACE

(71) Applicant: Vergence Automation, Inc., Excelsior, MN (US)

(72) Inventor: James E. Retterath, Excelsior, MN (US)

(73) Assignee: VERGENCE AUTOMATION, INC., Chaska, MN (US)

( * ) Notice: Subject to any disclaimer, the term of this patent is extended or adjusted under 35 U.S.C. 154(b) by 528 days.

(21) Appl. No.: 17/441,365

(22) PCT Filed: Mar. 23, 2020

(86) PCT No.: PCT/US2020/024200

§ 371 (c)(1),
(2) Date: Sep. 21, 2021

(87) PCT Pub. No.: WO2020/198134

PCT Pub. Date: Oct. 1, 2020

(65)           Prior Publication Data

US 2022/0180643 A1      Jun. 9, 2022

Related U.S. Application Data

(60) Provisional application No. 62/822,600, filed on Mar. 22, 2019.

(51) Int. Cl.
G06T 7/11           (2017.01)
B60W 40/06          (2012.01)
          (Continued)

(52) U.S. Cl.
CPC ............... G06T 7/11 (2017.01); B60W 40/06 (2013.01); G01C 21/3867 (2020.08);
          (Continued)

(58) Field of Classification Search
CPC ... G06T 7/11; G06T 7/521; G06T 7/13; G06T 7/20; G06T 7/40; G06T 7/70;
          (Continued)

(56)           References Cited

U.S. PATENT DOCUMENTS

| | | | |
|---|---|---|---|
| 2012/0167663 A1 | 7/2012 | Groitzsch | |
| 2017/0257617 A1* | 9/2017 | Retterath | ............. H04N 13/271 |

(Continued)

FOREIGN PATENT DOCUMENTS

| | | | | |
|---|---|---|---|---|
| WO | WO-2005075959 A1 * | 8/2005 | ............. | G01N 21/55 |
| WO | WO-2011158306 A1 * | 12/2011 | ......... | G01C 21/3602 |
| WO | WO-2018127789 A1 * | 7/2018 | ............... | A01C 5/04 |

*Primary Examiner* — Chineyere Wills-Burns

*Assistant Examiner* — Emmanuel Silva-Avina

(74) *Attorney, Agent, or Firm* — Barnes & Thornburg LLP

(57)           ABSTRACT

Friction plays a vital role in keeping vehicles on the road, as adequate surface friction is necessary for a driver or control system to control/maneuver a vehicle safely, in both longitudinal and lateral directions. Providing adequate friction for safe driving is a key input for highway geometric design, as it is used in determining the adequacy of minimum stopping sight distance, minimum horizontal radius, minimum radius of crest vertical curves, and maximum super-elevation in horizontal curves. Roadway safety is enhanced with a system that determines the coefficient of friction of a road surface prior to a vehicle traversing a roadway. In embodiments, an optical system that determines a coefficient of friction for the road surface in real-time allows a driver or a vehicle safety system to take corrective action in response to changes in road surface friction and to adjust speed or trajectory for roadway topology based on such changes.

8 Claims, 49 Drawing Sheets

(51) Int. Cl.

| | |
|---|---|
| *B60W 60/00* | (2020.01) |
| *G01C 21/00* | (2006.01) |
| *G01N 21/55* | (2014.01) |
| *G06T 7/13* | (2017.01) |
| *G06T 7/20* | (2017.01) |
| *G06T 7/40* | (2017.01) |
| *G06T 7/521* | (2017.01) |
| *G06T 7/70* | (2017.01) |
| *G06V 10/74* | (2022.01) |
| *G06V 10/764* | (2022.01) |
| *G06V 10/82* | (2022.01) |
| *G06V 20/56* | (2022.01) |
| *H04N 17/00* | (2006.01) |
| *H04N 23/56* | (2023.01) |

(52) U.S. Cl.
CPC .............. *G01N 21/55* (2013.01); *G06T 7/13* (2017.01); *G06T 7/20* (2013.01); *G06T 7/40* (2013.01); *G06T 7/521* (2017.01); *G06T 7/70* (2017.01); *G06V 10/761* (2022.01); *G06V 10/764* (2022.01); *G06V 10/82* (2022.01); *G06V 20/56* (2022.01); *G06V 20/588* (2022.01); *H04N 17/002* (2013.01); *H04N 23/56* (2023.01); *B60W 60/001* (2020.02); *B60W 2420/403* (2013.01); *B60W 2552/53* (2020.02); *G06T 2207/20164* (2013.01); *G06T 2207/30241* (2013.01); *G06T 2207/30244* (2013.01); *G06T 2207/30256* (2013.01)

(58) Field of Classification Search
CPC . G06T 2207/30252; G06T 2207/30256; G06T 2207/30241; B60W 40/06; B60W 2420/403; B60W 2420/408; B60W 2420/40; B60W 2552/35; B60W 2552/40; B60W 60/0018; B60W 60/00182; B60W 60/00184; G01C 21/3867; G01C 21/3848; G01N 21/55; G01N 2021/558; G01N 2021/557; G01N 2021/551; G06V 20/588; G06V 20/56
USPC .......................................................... 382/103
See application file for complete search history.

(56) References Cited

U.S. PATENT DOCUMENTS

| | | | |
|---|---|---|---|
| 2018/0113200 A1* | 4/2018 | Steinberg ............... | G08G 1/166 |
| 2019/0369212 A1* | 12/2019 | Dylewski ............... | G01S 17/93 |

* cited by examiner

| Normal Angle θ (deg.) | Normal Angle φ (deg.) | Reflectivity | Size | Optical Profile | Object Descriptor |
|---|---|---|---|---|---|
| 90 | n/a | > threshold(PM refl.) | n/a | n/a | Reflective Pavement Marking |
| 90 | n/a | <= threshold(PM refl.) | n/a | n/a | Non-recognized Object |
| ≠90 | n/a | n/a | n/a | n/a | Non-recognized Object |

590

| Normal Angle θ (deg.) | Normal Angle φ (deg.) | Reflectivity | Size | Optical Profile | Object Descriptor | |
|---|---|---|---|---|---|---|
| 90 | n/a | > threshold (PM refl.) | n/a | n/a | Reflective Pavement Marking | 591 |
| 90 | n/a | <= threshold (PM refl.) | n/a | n/a | Road Surface | 592 |
| $\theta_{min} < \theta < \theta_{max}$ | $\phi_{min} < \phi < \phi_{max}$ | > threshold (sign refl.) | > threshold (sign size) | n/a | Reflective Sign | 593 |
| $\theta_{min} < \theta < \theta_{max}$ | $\phi_{min} < \phi < \phi_{max}$ | > threshold (sign refl.) | < threshold (sign size) | n/a | Non-recognized Object 0 | 594 |
| $\theta_{min} < \theta < \theta_{max}$ | $\phi_{min} < \phi < \phi_{max}$ | < threshold (sign refl.) | n/a | n/a | Non-recognized Object 1 | 595 |
| $\theta_{min} < \theta < \theta_{max}$ | $< \phi_{min}$ | n/a | n/a | n/a | Non-recognized Object 2 | 596 |
| $\theta_{min} < \theta < \theta_{max}$ | $\phi_{max} < \phi < 90$ | n/a | n/a | n/a | Non-recognized Object 3 | 597 |
| $< \theta_{min}$ | n/a | n/a | n/a | n/a | Non-recognized Object 4 | 598 |
| $\theta_{max} < \theta < 90$ | n/a | n/a | n/a | n/a | Non-recognized Object 5 | 599 |

FIG. 33

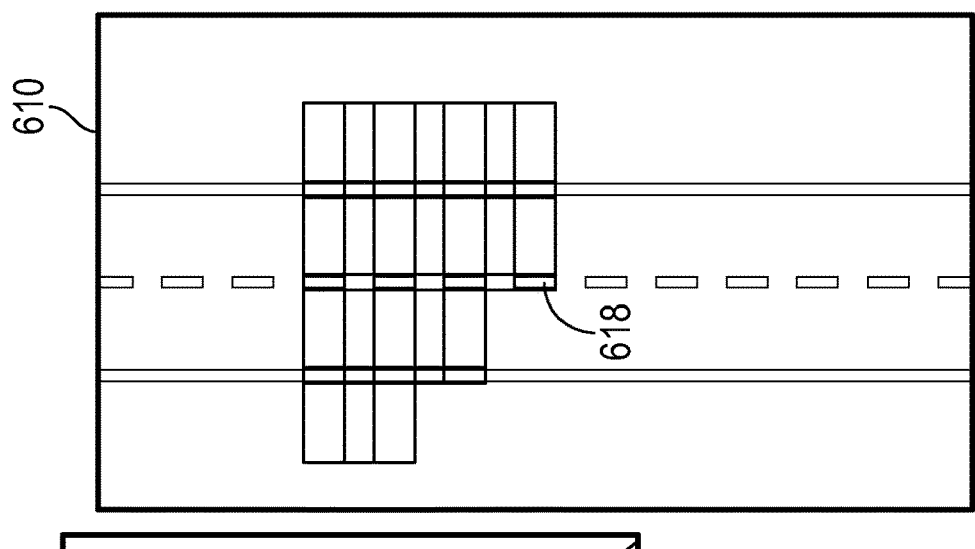
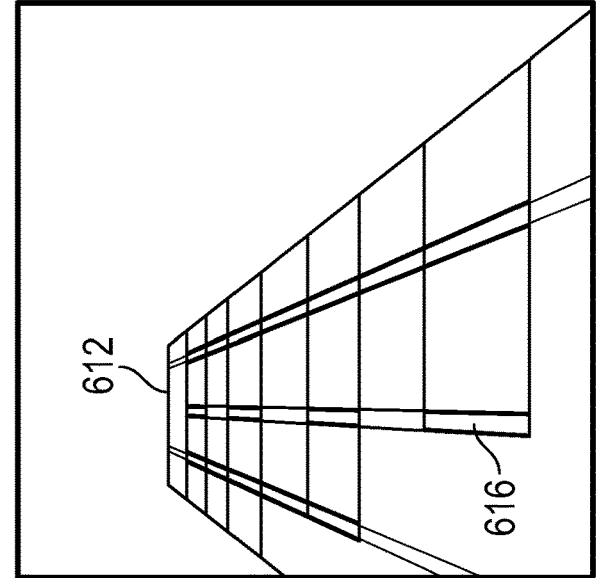
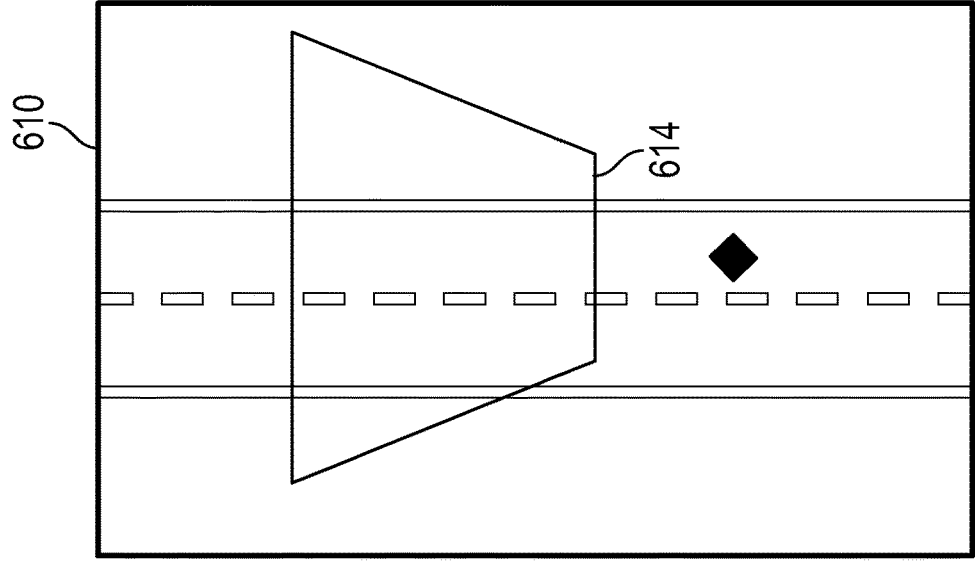
FIG. 35

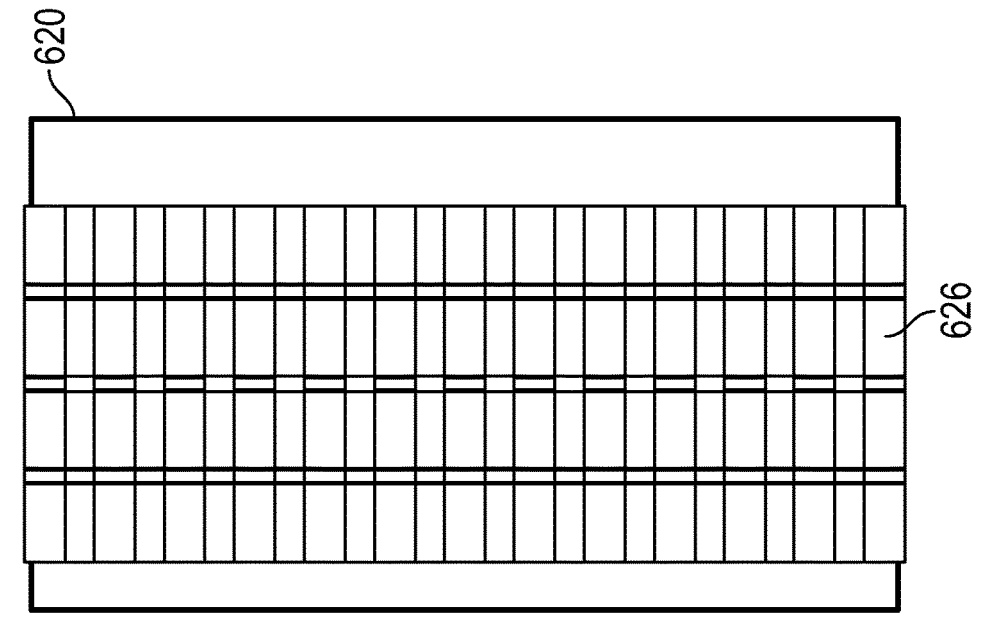
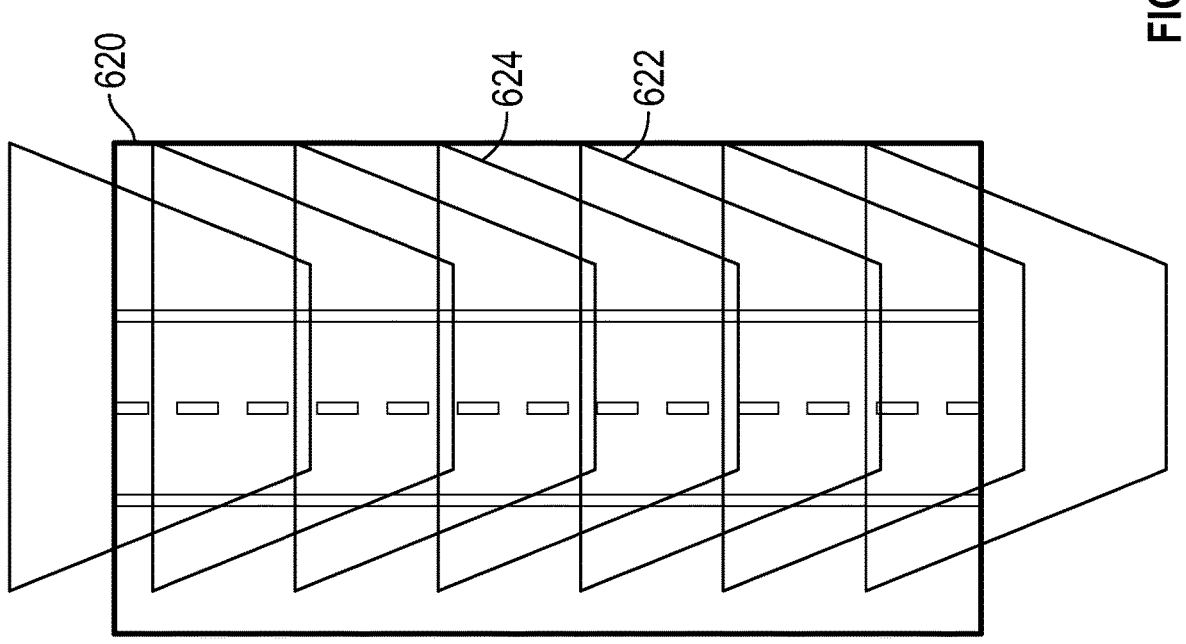
FIG. 36

680

| Normal Angle θ (deg.) | Normal Angle φ (deg.) | Reflectivity | Size | Optical Profile | Object Descriptor | |
|---|---|---|---|---|---|---|
| 90 | n/a | > threshold(PM refl.) | Aspect Ratio > min | n/a | Longitudinal Reflective Pavement Marking | } 682 |
| 90 | n/a | > threshold(PM refl.) | Aspect Ratio <= min | n/a | Other Reflective Pavement Marking | |
| 90 | n/a | <= threshold(PM refl.) | n/a | Road Surface Optical Profile A | Asphalt -smoothness Rating A | } 684 |
| 90 | n/a | <= threshold(PM refl.) | n/a | Road Surface Optical Profile B | Asphalt -smoothness Rating B | |
| 90 | n/a | <= threshold(PM refl.) | n/a | Road Surface Optical Profile C | Asphalt -smoothness Rating C | |
| 90 | n/a | <= threshold(PM refl.) | n/a | Road Surface Optical Profile D | Asphalt With Surface Moisture | |
| 90 | n/a | <= threshold(PM refl.) | n/a | Road Surface Optical Profile E | Asphalt With Surface Ice | |
| 90 | n/a | <= threshold(PM refl.) | n/a | Road Surface Optical Profile F | Concrete -smoothness Rating A | } 686 |
| 90 | n/a | <= threshold(PM refl.) | n/a | Road Surface Optical Profile G | Concrete -smoothness Rating B | |
| 90 | n/a | <= threshold(PM refl.) | n/a | Road Surface Optical Profile H | Concrete -smoothness Rating C | |
| 90 | n/a | <= threshold(PM refl.) | n/a | Road Surface Optical Profile I | Concrete With Surface Moisture | |
| 90 | n/a | <= threshold(PM refl.) | n/a | Road Surface Optical Profile J | Concrete With Surface Ice | |
| 90 | n/a | <= threshold(PM refl.) | n/a | Road Surface Optical Profile K | Gravel | 687 |
| 90 | n/a | <= threshold(PM refl.) | n/a | Road Surface Optical Profile L | Cobblestone | 688 |
| 90 | n/a | <= threshold(PM refl.) | n/a | No Match for Optical Profile | Other Road Surface | 689 |
| $\theta_{min}<\theta<\theta_{max}$ | $\phi_{min}<\phi<\phi_{max}$ | > threshold(sign refl.) | > Threshold(Guide Sign Size) | n/a | Reflective Guide Sign | } 690 |
| $\theta_{min}<\theta<\theta_{max}$ | $\phi_{min}<\phi<\phi_{max}$ | > threshold(sign refl.) | > Threshold(Sign Size) | n/a | Reflective Regulatory or Warning Sign | |
| $\theta_{min}<\theta<\theta_{max}$ | $\phi_{min}<\phi<\phi_{max}$ | > threshold(sign refl.) | < Threshold(Sign Size) | n/a | Non-recognized Object | } 692 |
| $\theta_{min}<\theta<\theta_{max}$ | $<\phi_{min}$ | n/a | n/a | n/a | Non-recognized Object | |
| $\theta_{min}<\theta<\theta_{max}$ | $\phi_{max}<\phi<90$ | n/a | n/a | n/a | Non-recognized Object | |
| $<\theta_{min}$ | n/a | n/a | n/a | n/a | Non-recognized Object | |
| $\theta_{max}<\theta<90$ | n/a | n/a | n/a | n/a | Non-recognized Object | |

| Pavement Surface Characteristics | Vehicle Operating Parameters | Tire Properties | Environment |
|---|---|---|---|
| • Micro-Texture<br>• Macro-Texture<br>• Mega-Texture/<br>  unevenness<br>• Material Properties<br>• Temperature | • Slip Speed<br>  ➤ Vehicle Speed<br>  ➤ Braking Action<br>• Driving Maneuver<br>  ➤ Turning<br>  ➤ Overtaking | • Foot Print<br>• Tread Design and<br>  Condition<br>• Rubber Composition<br>  and Hardness<br>• Inflation pressure<br><br>• Load<br>• Temperature | • Climate<br>  ➤ Wind<br>  ➤ Temperature<br>  ➤ Water (Rainfall, Condensation)<br>  ➤ Snow and Ice<br>• Contaminants<br>  ➤ Anti-Skid Material (Salt, Sand)<br>  ➤ Dirt, Mud, Debris |

802 ⁓

800 ⁓

Note: Critical factors are shown in bold.

FIG. 48
(Prior Art)

SYSTEM FOR OPTICAL DETERMINATION OF COEFFICIENT OF FRICTION FOR A SURFACE

CLAIM OF PRIORITY

This application claims priority to U.S. Provisional Patent Application Ser. No. 62/822,600 filed Mar. 22, 2019 and PCT International Application No. PCT/US2020/024200, filed Mar. 23, 2020, both of which are entitled LIGHTING-INVARIANT SENSOR SYSTEM FOR OBJECT DETECTION, RECOGNITION, AND ASSESSMENT, the entire contents of which are incorporated herein by reference.

FIELD OF THE INVENTION

Embodiments disclosed herein relate to object detection and recognition in a real-time image processing system. More particularly, various embodiments relate to systems and methods that utilize object vector creation and processing for object condition assessment, automated vehicle navigation, and High Definition (HD) Map creation and utilization for vehicle vision systems for roadways.

BACKGROUND OF THE INVENTION

Driver assistance and autonomous navigation systems for vehicles interacting with roadways are becoming increasingly common, and typically include one or more sensors and a form of machine vision, computer processing, and artificial intelligence (AI) or deep learning. These vehicle vision systems attempt to perform automated object detection and recognition in a wide variety of environmental conditions and varying road topologies. Methods that have been proposed to increase functionality include Structure from Motion (SfM), Simultaneous Localization And Mapping (SLAM), and Convolutional Neural Networks (CNNs). These systems, however, are lacking in normalized, linearized, and calibrated assessment and processing capabilities for objects and road surfaces for such vehicle vision systems.

SUMMARY OF THE INVENTION

Various embodiments of systems and methods for vehicle vision systems for roadways utilize object vector creation and processing for object condition assessment, automated vehicle navigation, and HD Map creation and utilization. These embodiments provide a set of solutions for normalized, linearized, and calibrated assessment and processing capabilities for objects and road surfaces for vehicle vision systems.

In embodiments, an imaging sensor on board a vehicle is calibrated with a boresight angle that is defined relative to an optical center of a forward-facing or rear-facing imaging sensor that is an array of photodetector elements. The boresight angle is calibrated to be parallel to an axis of travel of the vehicle. In embodiments, sensor boresight angles for the photodetector elements in the array are established via measurement, either dynamic or predetermined, or via calibration, either dynamic or predetermined.

In embodiments, an imaging sensor on board a vehicle is calibrated such that pixels in an imaging plane are defined by a pixel offset from an optical center and an angular offset from an optical center of an array of photodetector elements. In embodiments, the array of photodetector elements has a one-to-one correspondence with a corresponding array of pixels in an image. In other embodiments, for each pixel in an image is associated with a given set of one or more photodetector elements in the array of photodetector elements. In embodiments, the array of photodetector elements is configured in a planar arrangement that defines the imaging plane. In other embodiments, the array of photodetector elements is configured in a non-planar arrangement, such as a convex or concave surface, and the imaging plane is a virtual plane based on the transformed output of the non-planar array of photodetector elements. In embodiments, a calibration procedure is used to populate values in a look-up table (LUT) that is used to map each pixel to its angular offset from an optical center of the array of photodetector elements.

In embodiments, radiance values are used instead of intensity values as the basis for providing enhanced characteristic assessments of images, scenes, objects, and surfaces. Intensity-to-radiance conversion is the process by which intensity values are converted to radiance values for radiation received by elements in a photodetector system. Unlike existing systems that can only produce estimates for radiance values, various embodiments of the vehicle visions system incorporate photodetector elements for which electro-optical responses are linearized and normalized such that intensity-to-radiance conversion is expressed as a relationship that is dependent on a global conversion constant, dependent on a conversion function for each photodetector, or dependent on a conversion function for each photodetector at various detection distances throughout an imaging sensor's depth of field. Actual radiance values provide a different platform for the various enhanced characteristic assessment techniques that can use reflectivity determinations based on actual radiance values and calibrated flux densities.

Various photodetector systems, imaging sensors and vision systems are described in different embodiments, which can include both active and passive devices that detect photons. In embodiments, a photodetector system could be a passive device, such as a camera, that detects ambient photons or an active device, such as a LiDAR unit, that emits a signal and detects photon reflections of that signal in addition to ambient photons. Some photodetector systems and imaging sensors operate in broad ranges of electromagnetic frequencies, such as visible light, while other systems and sensor may operate in narrow ranges or specific electromagnetic frequencies, such as laser light. In some embodiments the light energy can be in the wavelength ranges of ultraviolet (UV)—100-400 nm, visible—400-700 nm, near infrared (NIR)—700-1400 nm, infrared (IR)—1400-8000 nm, long-wavelength IR (LWIR)—8 micron-15 micron, far IR (FIR)—15 micron-1000 micron, or terahertz—0.1 mm-1 mm.

In practice, the individual fields of view of the elements of a photodetector system are not equivalent. More specifically, photodetector elements typically do not provide for a constant surface per unit projected area. Because radiance is specified as optical power per unit projected area, intensity values for photodetectors will not typically have a constant-driven relationship between radiance and intensity. In embodiments, intensity-to-radiance conversion for normalized and linearized photodetector elements is expressed as a relationship that is dependent on a radiance conversion constant that is separate for each photodetector element in an array.

In embodiments, non-normalized photodetector elements for vision systems utilize a radiance conversion function for each pixel associated with a given set of one or more photodetector elements. In embodiments, a LUT is used for pixel-level radiance conversion functions for normalization. In embodiments, non-linearized photodetector elements use a radiance conversion function for each pixel. In embodiments, a LUT is used for pixel-level radiance conversion functions for linearization.

An ideal configuration for an active imaging sensor includes a field of view that is perfectly aligned with a field of illumination, with the field of illumination displaying uniform illumination throughout the field of illumination at all distances within the field of view. In embodiments, flux determination for an active imaging sensor on a per-pixel basis is defined by the total optical power output of a sensor illumination source divided by the number of pixels within a field of illumination.

In practice, an ideal active imaging sensor configuration is neither practical nor sustainable across the manufacture of multiple devices or over time for any given device. In embodiments, a calibration procedure is used to determine values for a flux LUT that are used for determining reflectivity values for objects or points on objects within scenes. For each pixel [m,n] the as-determined flux value is stored for subsequent lookup and reflectivity determination for embodiments whereby the optical axis of an imager is aligned with an optical axis of illuminants.

In practice, an optical axis of an active imaging sensor field of view will not always align with an axis of a field of illumination. Due to a non-aligned or unknown alignment of optical axes, the flux for a given pixel will be different at various distances throughout a field of view. In embodiments, accounting for varying pixel flux at varying distances employs the use of multiple LUTs consisting of pixel flux values at predefined distances.

In embodiments, a calibration procedure is used to determine values for a plurality of flux density LUTs that are utilized for determining reflectivity values for objects or points on objects within scenes for a vision system. The number of flux density LUTs depends on the desired depth of field for which reflectivity measurements are desired and the specified depth granularity within the depth of field. For each pixel [m,n] in each flux density LUT, the as-determined flux density value is stored for subsequent lookup and reflectivity determination for embodiments whereby the optical axis of an imager may not be optically aligned with an optical axis of illuminants.

Dynamic positioning systems for vehicles may include Inertial Measurement Units (IMUs) that utilize embedded accelerometers, gravitometers, and gyroscopes, for example, for providing 6 DOF information to a vehicle control system. In embodiments, a single, calibrated photodetector system is utilized to provide 6 DOF information based only on vision sensing with y-axis movement and z-axis movement assumed to be zero. In embodiments, a single, calibrated photodetector system is used to provide 6 DOF information to be used in conjunction with the use of embedded accelerometers for determination of y-axis and z-axis movement. In some embodiments, a forward-facing calibrated photodetector system and a rear-facing calibrated photodetector system provide a photodetector-only 6-DOF determination system that does not require the assistance of accelerometers or gyroscopes to provide information equivalent to a conventional IMU. In embodiments, for a photodetector-only 6 DOF determination system, lever arm calibration procedures are enabled via measurement methods or dynamic calibration methods.

In embodiments, image vectors that define attributed sections within a sensor frame are used to facilitate object vectorization for a vision system. In embodiments, attribution for image vectors may include vector intensity, reflectivity, and timestamp. In embodiments, image vectors are converted to scene vectors by including attribution that may include distance, size, normal angle, and links to scene vectors from other images. In embodiments, scene vectors are converted to object vectors by grouping one or more adjacent, like-attributed scene vectors into object vectors that may include a motion attribute.

In embodiments, object recognition for a vehicle vision system compares attribution of object vectors or scene vectors to attribution contained within an object descriptor library. In embodiments for a vehicle vision system, object descriptor library usage is demonstrated for a lane keep system, for conflation of object vectors to orthophotos, and for generating an object vector set for a vector-based HD Map.

In embodiments, sensor pose estimation is enabled by receiving GNSS or terrestrial positioning information and utilizing camera calibration parameters to perform real-time or post-processed photogrammetry. In embodiments, precise positional information obtained from a vector-based HD Map is utilized to establish corrected pose information for an imaging sensor in a vehicle vision system.

Polyline-based HD Maps suffer limitations in practice that make their widespread adoption in vehicle safety systems problematic. One limitation is the requirement for highly-accurate sensor pose information. A second limitation is the utilization of polyline trajectories whereby some or most of the segment edges are not specifically tied to sensor-recognizable physical features. A third limitation is the representation of longitudinal physical features in polyline form and not in a sensor-friendly recognizable format. A fourth limitation is that polyline-based HD Maps are not safe when there is the potential for hacking or spoofing for one of the system inputs—GNSS, sensor or HD Maps. In embodiments, a vehicle vision system produces object-vector-based HD Maps with authenticated trajectories to overcome the limitations of traditional HD Maps.

Traditional HD Maps have utilized polyline or polyline-like linear features to describe lane-level topology and enable real-time control in autonomous vehicle control systems. The polyline approach to HD Maps has several limitations that prevent their widespread adoption in vehicle safety systems including, but not limited to: 1) attributed trajectory polyline points include 3D location (lat, long, alt), but typically do not include relative locations from physical features on the roadway, 2) attributed lane-edge and road edge polylines align with the longitudinal paths of the physical features they represent, but the attribution is insufficient to adequately describe the features in sufficient detail for proper recognition, identification and classification for on-board sensors, and 3) GNSS outages on board a vehicle for long periods of time create positional-error problems for polyline-based systems that rely mainly on the spatial location of polyline features.

In embodiments, a vehicle vision system produces attributed, polyline trajectory information whereby polyline points are referenced from physical features in a scene of a roadway. In embodiments, a vehicle vision system produces object vector representations of physical features from a scene of a roadway to assist in their rapid, accurate identification in real-time machine vision systems. In embodiments, a vehicle vision system produces a vector-based HD Map and a sensor-based object vectorization system that does not require GNSS or terrestrial positioning system information for proper, accurate, safe navigation.

In embodiments, vector-based HD Maps with authenticated trajectories provide a means for vehicle navigation along a desired path whereby the authenticity of a trajectory is validated by identifying and validating the physical features in a scene from which the trajectory information is derived.

In embodiments, an object vectorization system for objects, images, video, and/or scenes is utilized as part of a machine vision stack within a vehicle navigation system. Object vectorization may co-exist with image processing and convolutional neural network processing. In embodiments, a vector-based HD Map engine occupies a key functional role in a machine vision stack, working in concert with object vectorization functionality.

Pavement friction plays a vital role in keeping vehicles on the road, as sufficient friction is needed for a driver or a control system to control/maneuver a vehicle in a safe manner, in both the longitudinal and lateral directions. Few automated navigation systems have any ability to determine a coefficient of friction that is experienced by a vehicle. Coefficient of friction determination is typically performed by systems or devices that are in physical contact with a roadway. These kinds of contact-based systems do not allow for real-time determination of road surface friction characteristics as a vehicle is traveling on a roadway. In embodiments, real-time reflectivity measurements of road surfaces by a vehicle vision system are utilized for dynamic determination of a coefficient of friction of a roadway in dry conditions, wet conditions, and when a road surface is covered with ice or snow.

BRIEF DESCRIPTION OF THE DRAWINGS

FIG. 33 illustrates an embodiment of an object descriptor library definition used for conflation of object vectors and orthophotos.

FIG. 35 illustrates an embodiment of conflated vector placement onto an orthophoto.

FIG. 36 illustrates an embodiment of conflated vector placement onto an orthophoto for multiple sensor pose estimations.

7

Figure 37:
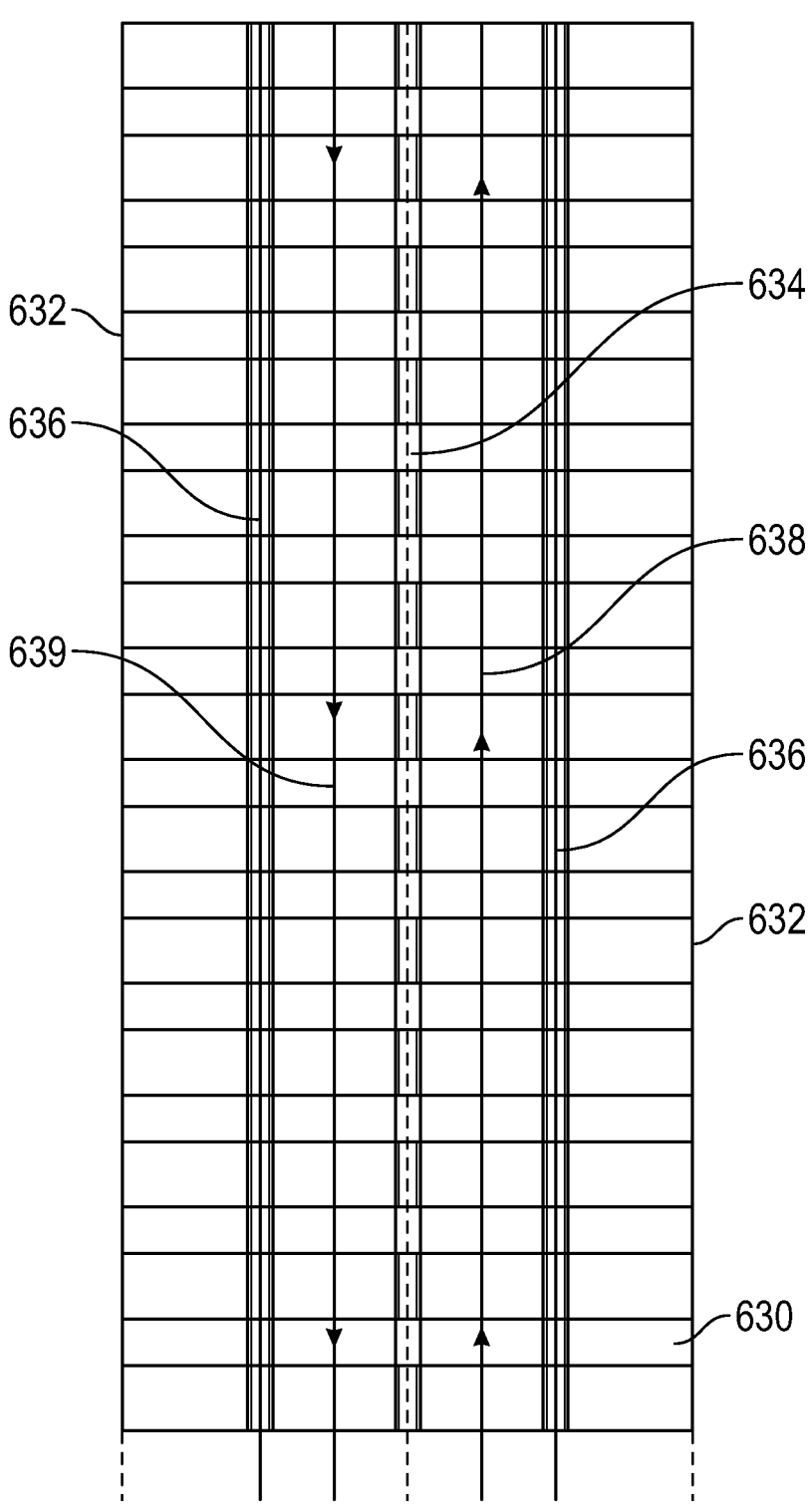

FIG. 37 illustrates an embodiment of road feature and trajectory polyline placement relative to roadway object vectors.

Figure 38:
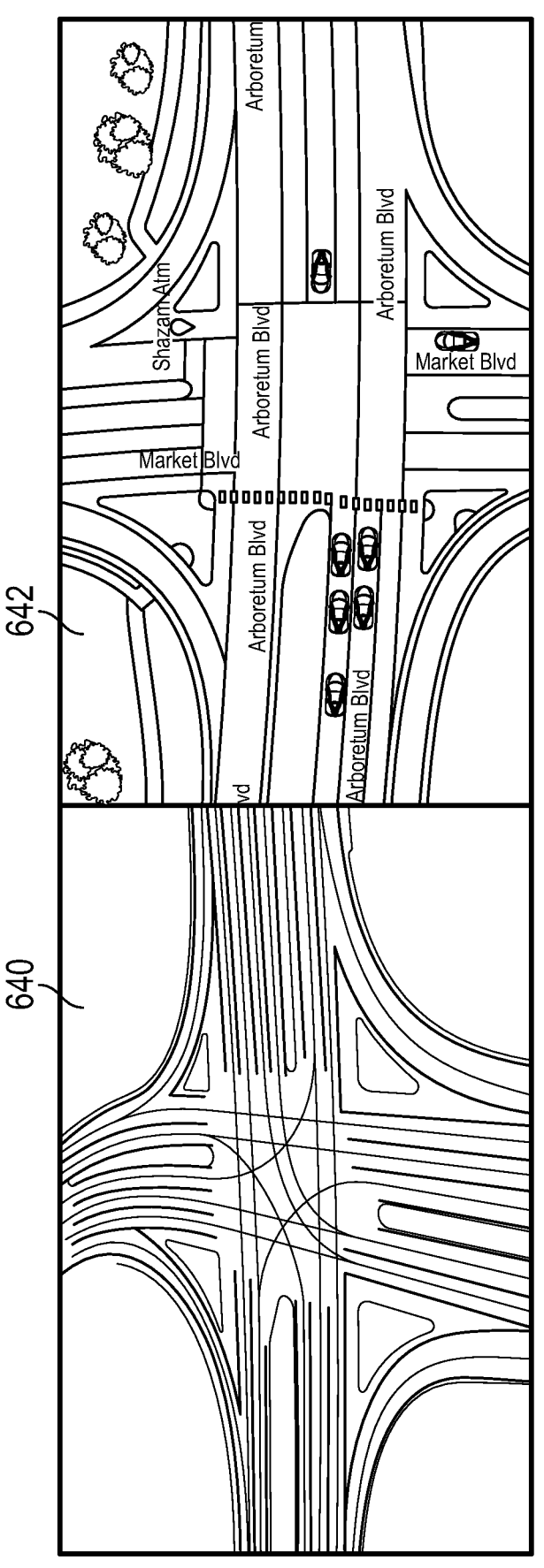

FIG. 38 illustrates an embodiment of a polyline HD Map and an orthophoto of a roadway intersection.

Figure 39:
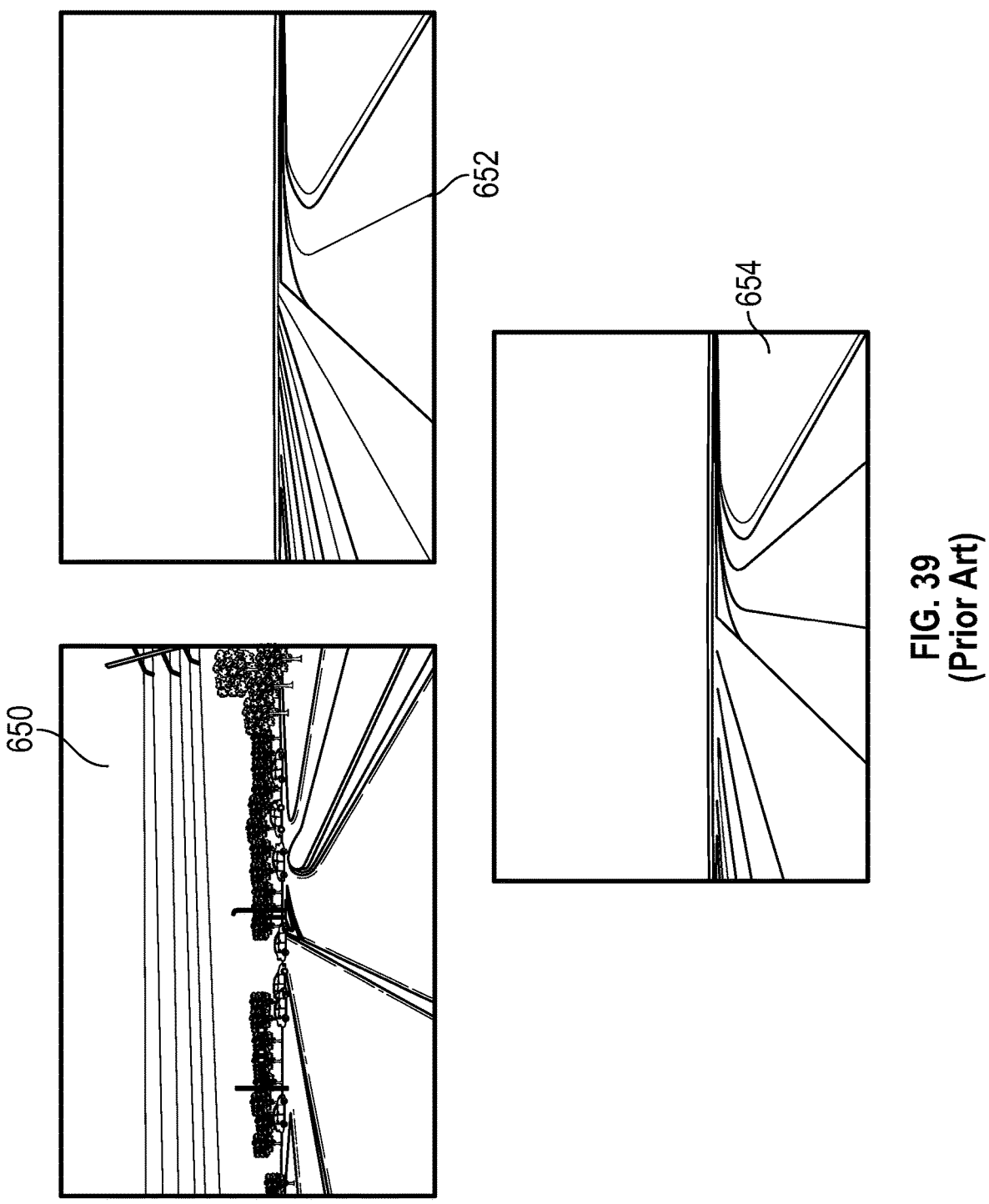

FIG. 39 illustrates an embodiment of a sensor view, a rendered HD Map view, and a trajectory view of a connecter segment at a roadway intersection.

Figure 40:
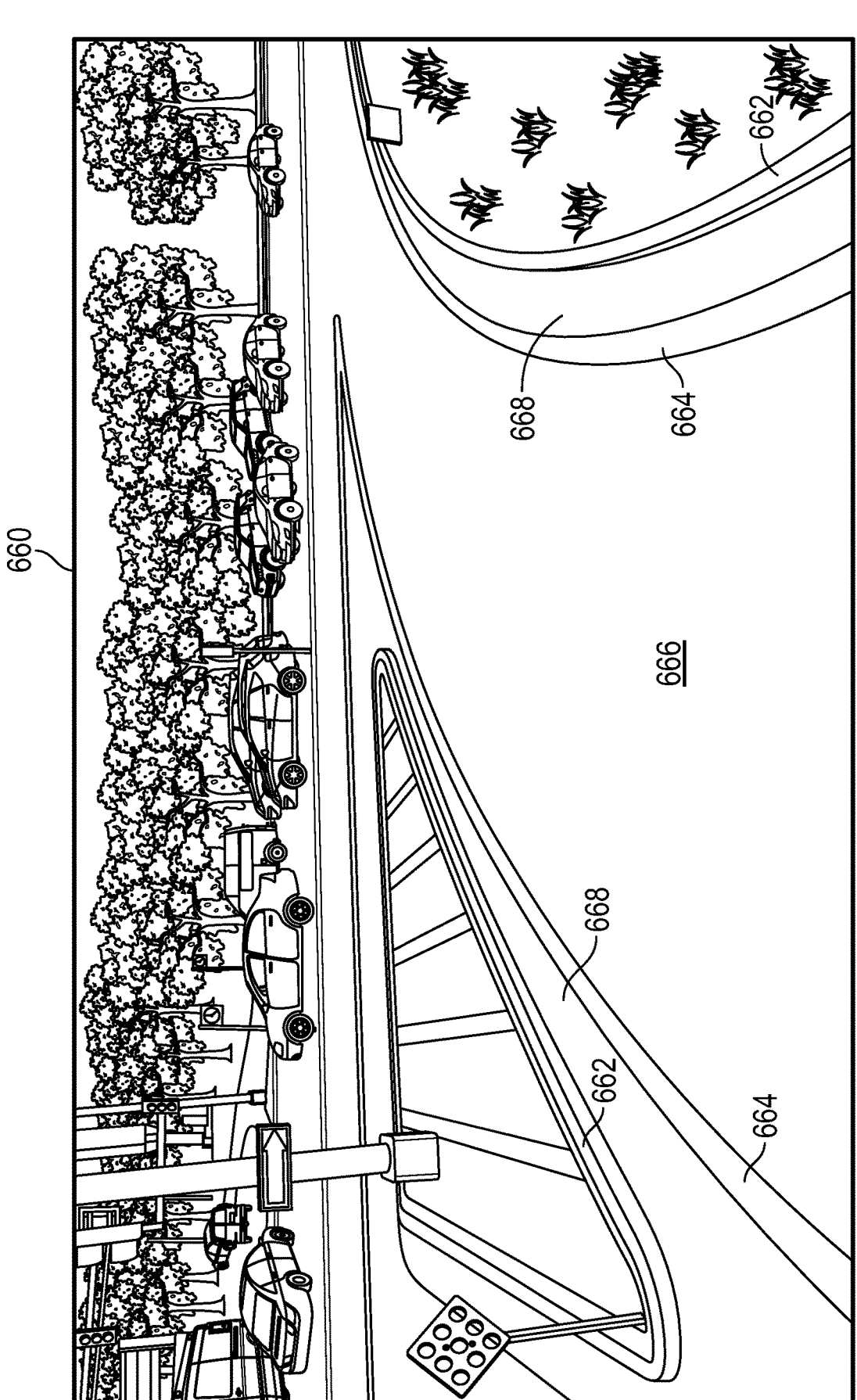

FIG. 40 illustrates an embodiment of a sensor view of a roadway connector segment.

Figure 41:
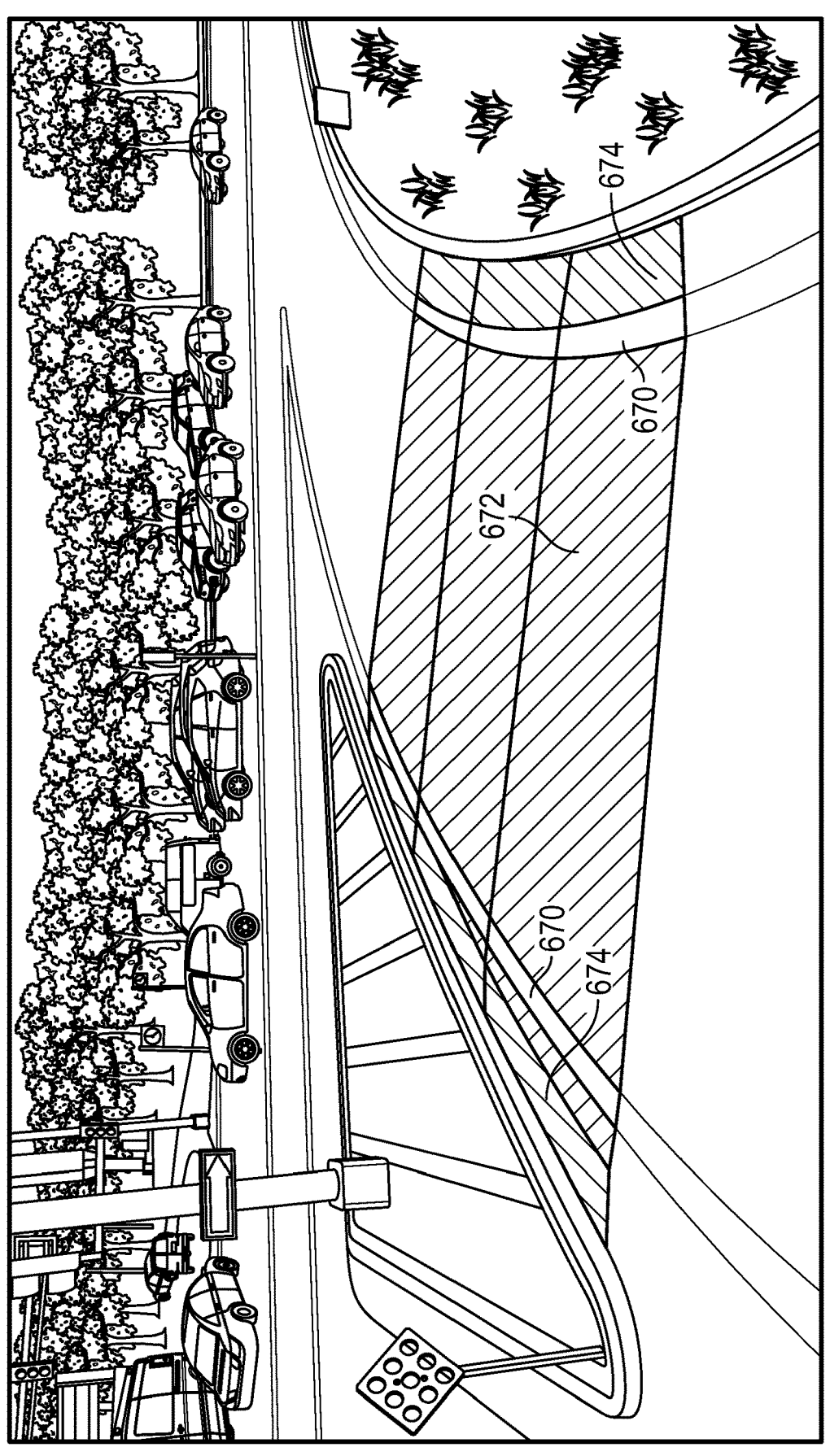

FIG. 41 illustrates an embodiment of object vectors overlaid on a sensor view of a roadway connector segment.

FIG. 42 illustrates an embodiment of an object descriptor library definition used creating a vector-based HD Map.

Figure 43:
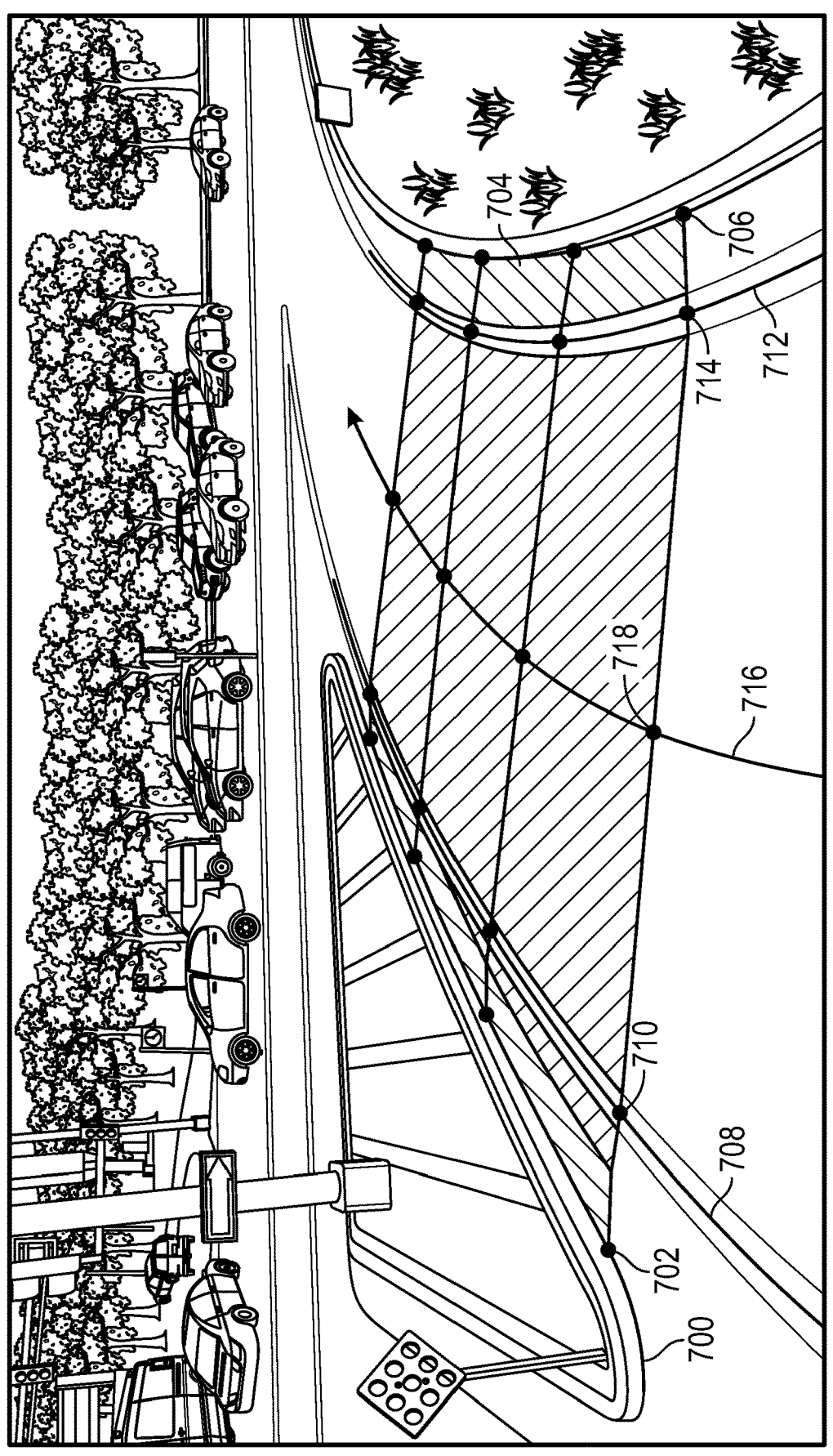

FIG. 43 illustrates an embodiment of vector and polyline generation for a vector-based HD Map.

Figure 44:
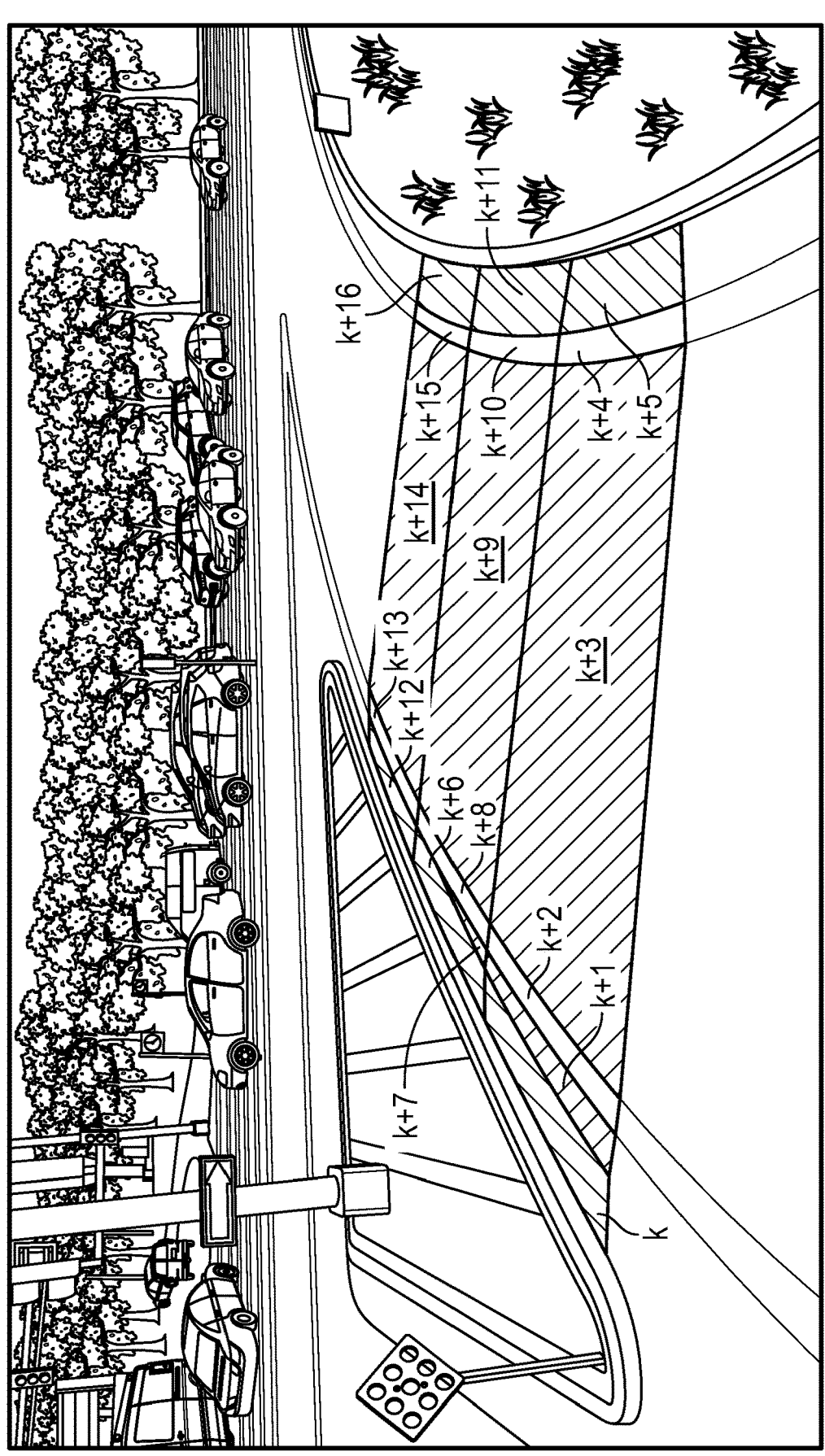

FIG. 44 illustrates an embodiment of vector numbering for vector and polyline generation for a vector-based HD Map.

Figure 45:
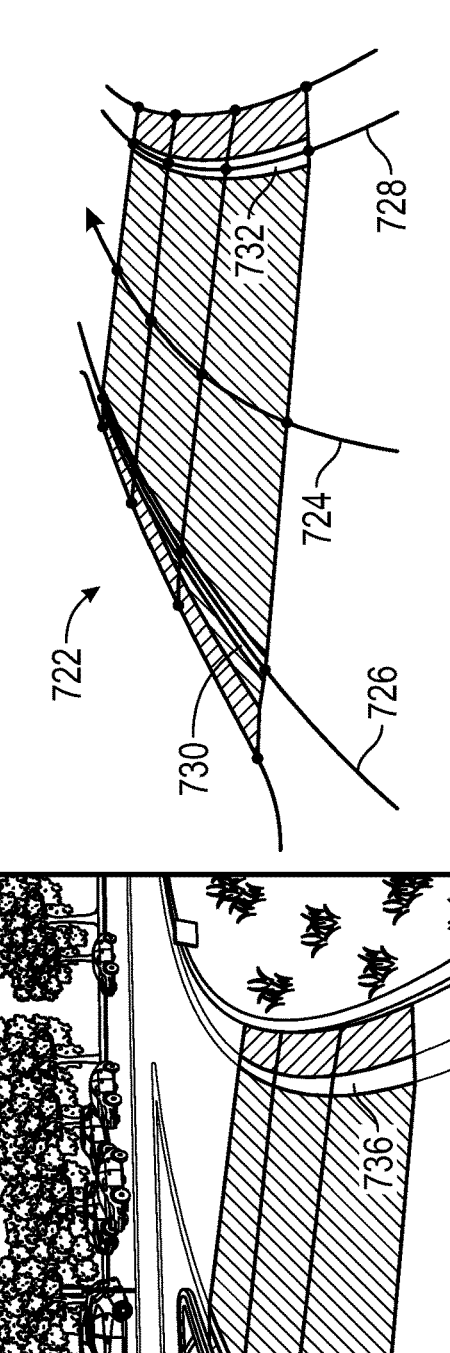

FIG. 45 illustrates an embodiment of a vectorized sensor view and a rendered vector-based HP Map view of a roadway connector segment.

Figure 46:
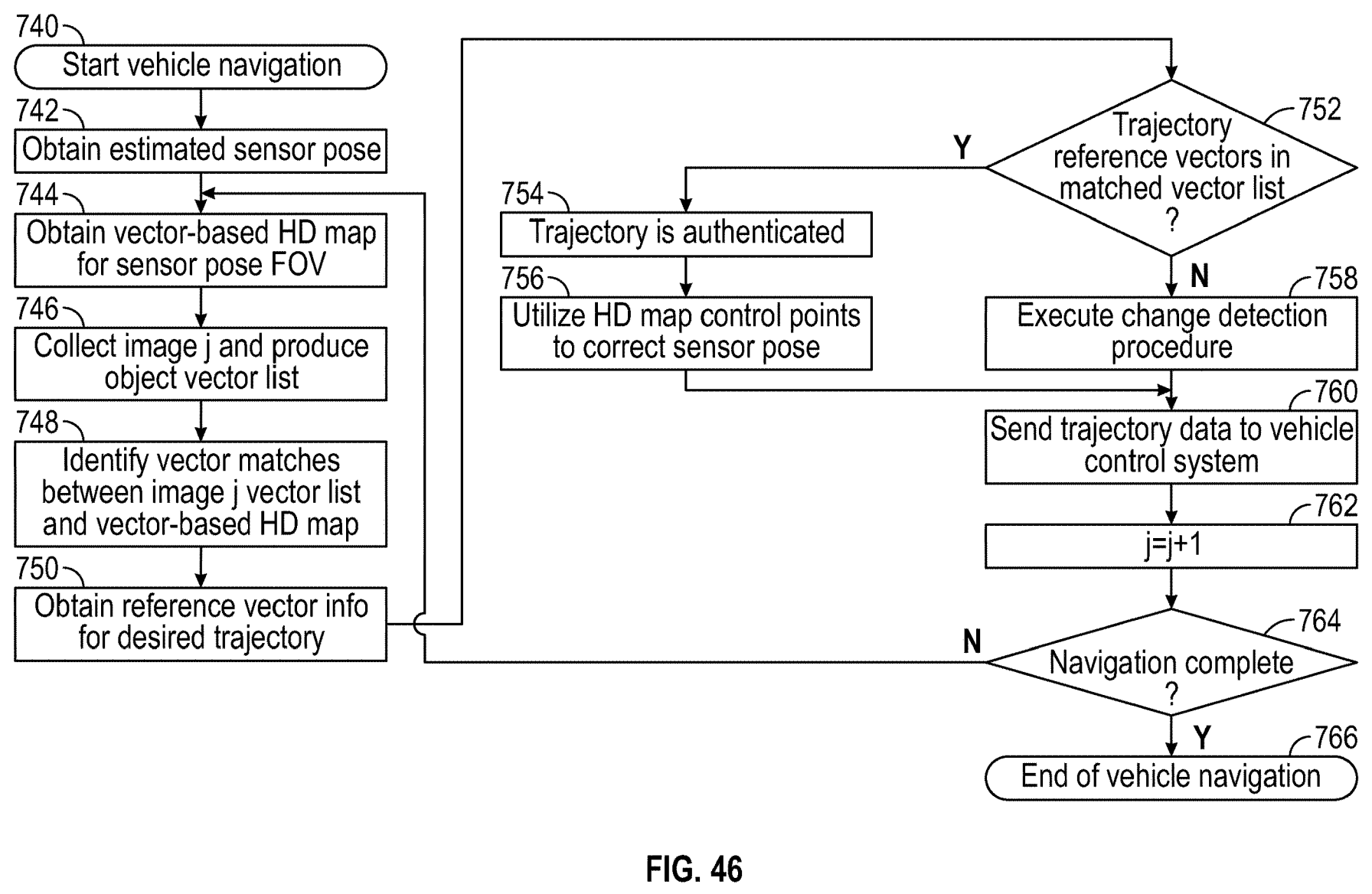

FIG. 46 illustrates an embodiment of a flowchart of a procedure for vehicle navigation that utilizes a vector-based HP Map.

Figure 47:
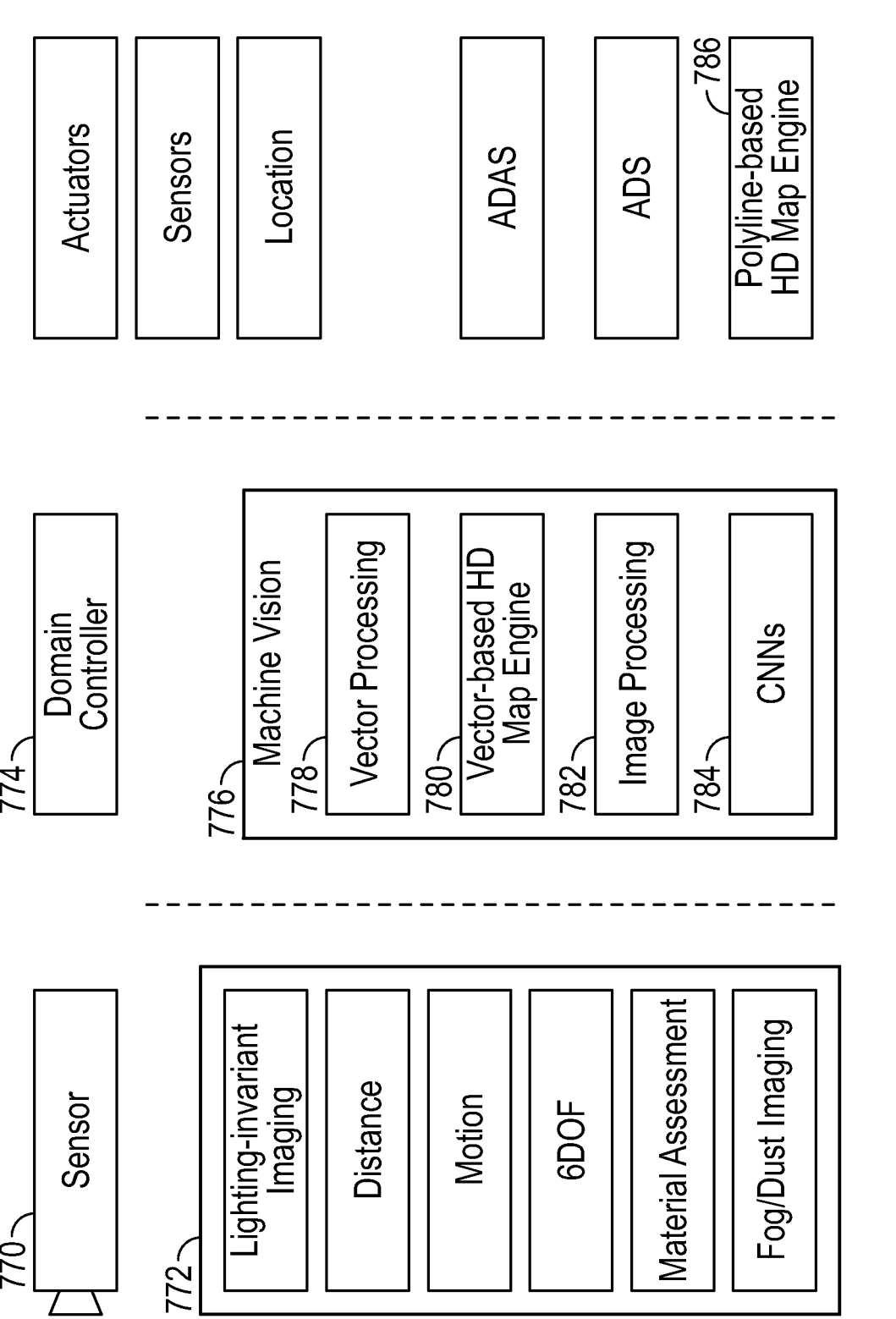

FIG. 47 illustrates an embodiment of a functional diagram of components utilized in a machine vision system.

FIG. 48 illustrates an embodiment of a table that identifies critical parameters that influence pavement friction forces.

Figure 49:
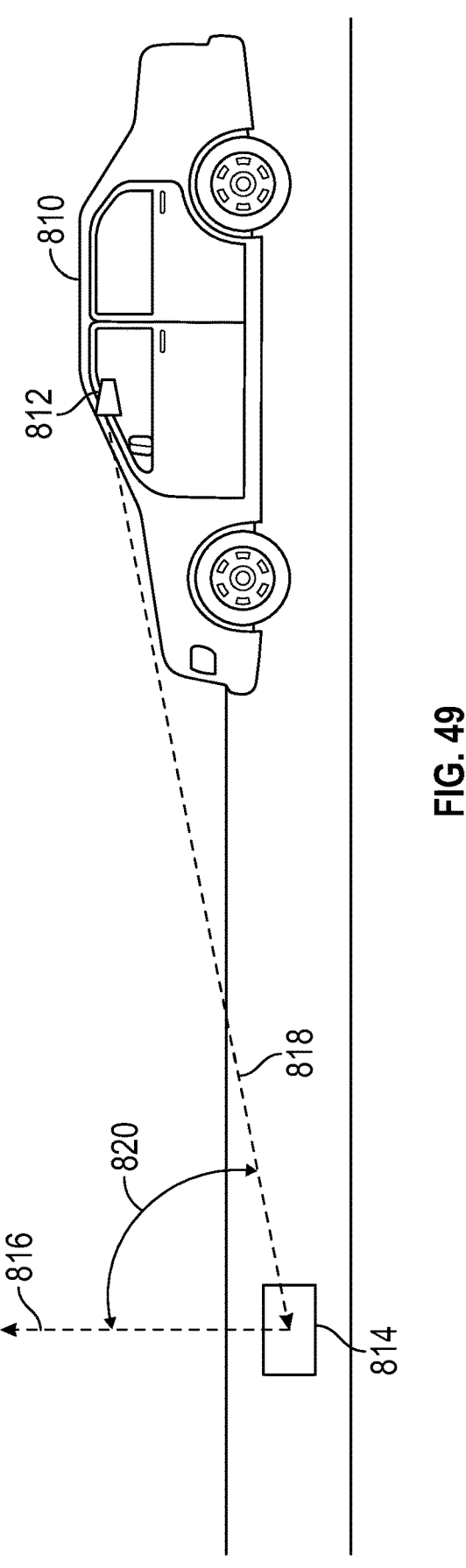

FIG. 49 illustrates an embodiment of a reflectivity measurement on a roadway used for dynamically determining friction forces.

DETAILED DESCRIPTION OF THE EMBODIMENTS

Active imaging sensors define a class of imaging sensors and photodetector systems that consist of imaging optical components with a defined field of view, a light source with a defined field of illumination, and electronics to control the imaging events and the associated illumination events. When used in connection with vehicle vision systems for imaging roadways, active imaging sensors have typically taken the form of an integrated illumination source and optical detection circuitry in the same devices. U.S. Pat. No. 9,671,328 teaches the use of vehicle headlamps in an active sensor configuration to perform roadway feature identification and assessment based on whether an object of interest includes a reflective surface. U.S. Pat. No. 9,866,816 (the '816 patent), which is hereby incorporated by reference in its entirety, teaches the use of vehicle headlamps and/or lighting components and an array of photodetector elements to create a camera system having an active sensor system.

Figure 1:
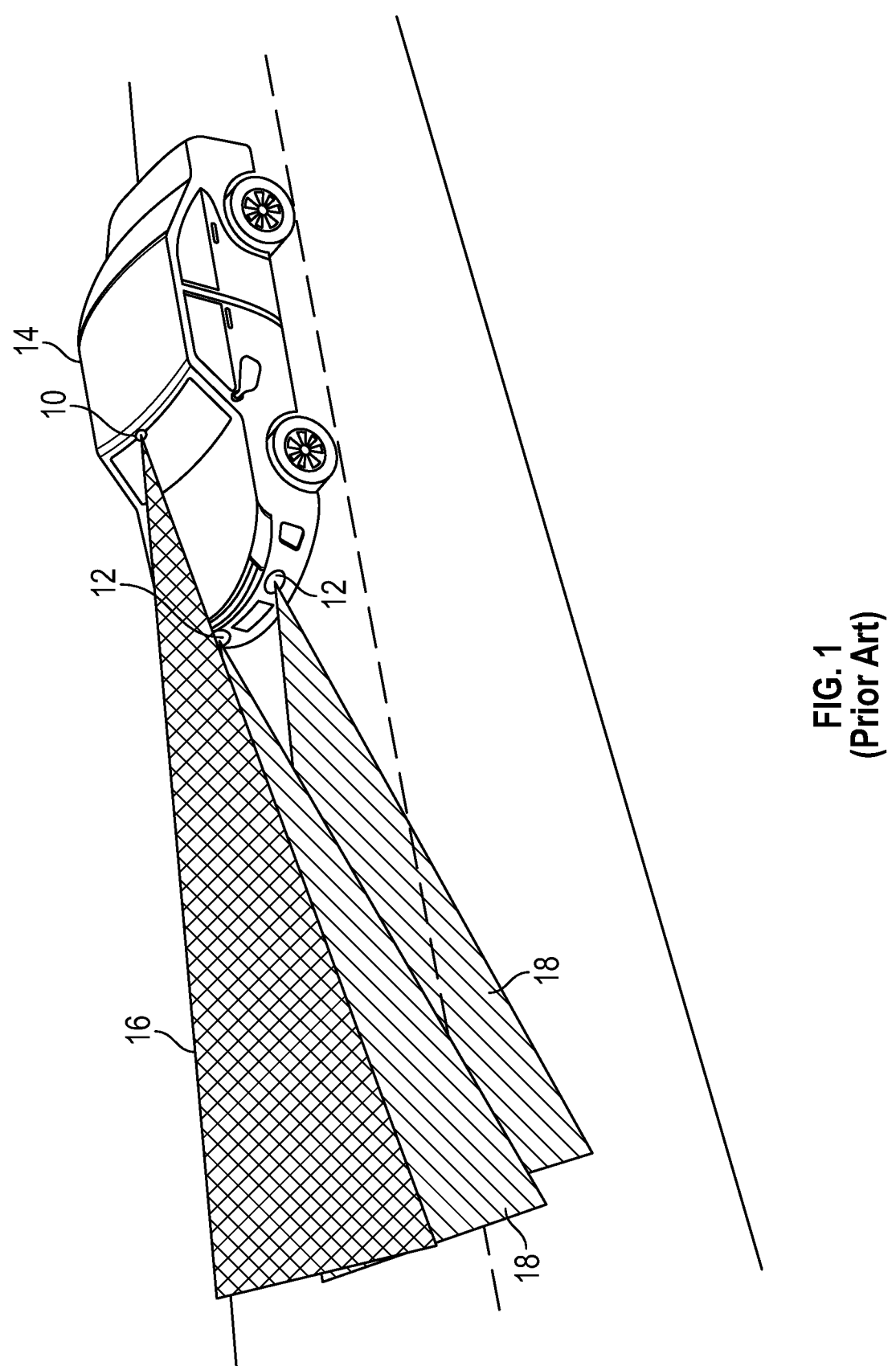
FIG. 1 illustrates a prior art configuration of a forward-facing active sensor on board a vehicle.

FIG. 1 illustrates an embodiment from the '816 patent for an active sensor system for a vehicle. A forward-facing sensor 10 resides behind a windshield of a vehicle 14, the sensor 10 having a field of view 16. Forward-facing illuminators 12 reside in headlamp assemblies of the vehicle 14, the illuminators 12 each having a corresponding field of illumination 18. In the context of present disclosure, forward and forward-facing refer to a direction of travel or orientation associated with a front of a vehicle. Likewise, rearward and rearward-facing refer to a direction of travel or orientation associated with a back of a vehicle.

Other definitions as used herein unless expressly noted otherwise include:

"Accelerometer" is a device that measures the total forces (including gravity) applied on an object to which the device is affixed and infers the total acceleration. Because it measures gravity, when the object is stationary the output of the device is g (the force of gravity). When the object is in acceleration, the device's output is the direction and amplitude of the total acceleration (gravity plus body acceleration).

"Conflation" is matching features in two images to determine common object points in each image. Absolute location attributes for the (typically) more-spatially-accurate image are used to replace or modify the absolute location attributes in the (typically) less-spatially-accurate image. "Flux" or "Radiant Flux" is the radiant optical energy per unit time, is expressed in Watts, and denoted by the symbol $\Phi$.

"Flux Density" or "Irradiance Flux Density" is the amount of radiant flux received by a surface per unit area, is expressed in Watts/m², and is denoted by the symbol E.

"GNSS" (Global Navigation Satellite System) is a system of orbiting satellites that, when used in concert with receivers, allow for absolute positioning and heading of vehicles and devices.

"Gyroscope" or "Gyro" is a device that measures the rate of rotation of an object around each of its axes (1, 2, or 3). This allows estimating the object's current angles, if the angles were known at a previous point in time and integrating the rate of rotation over time.

"HD Maps" or "High Definition Maps" are digital representations of navigable roadways sufficient to enable the use of adaptive cruise control, advanced driver assist systems, and automated driving systems.

"IMU" or "Inertial Measurement Unit" is a device that measures velocity, orientation, and gravitational forces.

"Intensity" or "Photodetector Intensity" refer to the electrical response to circuitry that is operably connected to optical photodetector components for an imaging system. Intensity is a unitless value and is denoted by the symbol $I_{[m,n]}$.

"Linearization" or "Photodetector Linearization" describe a relationship whereby each increment in photodetector intensity value corresponds to an equivalent increase in radiance at the optical input of each photodetector.

"Lever Arm Calibration" is the measured or computed x, y, z offset between the focal point of a GNSS or terrestrial positioning system receiver and the optical center of an imaging sensor rigidly mounted to a structure containing both a receiver and an imaging sensor.

"Normalization" or "Photodetector Normalization" describe a relationship whereby the responses of photodetectors are operably equivalent for all photodetectors in a photodetector system.

"Off Board" or "Off-board" describe the location of processing, circuitry, or components that are not on board the same vehicle as imaging sensor of a vehicle vision system.

"On Board" or "On-board" describe the location of processing, circuitry, or components that are positioned within, on, or carried by the same vehicle as an imaging sensor of a vehicle vision system.

"Orthophoto" or "Orthophotograph" or "Orthoimage" is an aerial (nadir or oblique) image geometrically corrected (orthorectified) such that the scale is uniform (the photo has the same lack of distortion as a map). Unlike a corrected aerial photograph, an orthophoto can be used to measure true distances because it is an accurate representation of the Earth's surface, having been adjusted for topographic relief, lens distortion, and camera pose.

"Photogrammetry" is defined by the American Society for Photogrammetry and Remote Sensing (ASPRS) as the art, science, and technology of obtaining reliable information about physical objects and the environment through processes of recording, measuring and interpreting photographic images and patterns of recorded radiant electromagnetic energy and other phenomena.

"Polyline," when used in reference to computer graphics, 2D mapping and 3D mapping, describes a continuous line composed of one or more line segments.

"Sensor Pose" is the position and orientation of an imaging sensor relative to a coordinate system.

"Pose Correction" is the use of absolute location attributes from imagery to determine a corrected position and orientation for an imaging sensor.

"Pose Estimation" is utilizing location data from a GNSS or terrestrial positioning system to determine an estimated position and orientation for an imaging sensor.

"Radiance" is the amount of radiant flux emitted or reflected by a surface per unit projected area, is expressed in Watts/m², and is denoted by the symbol L.

"Retroreflectivity" or "Reflectivity" is the ratio of reflected radiation to incident radiation for a surface, is computed by dividing the Radiance by the Flux Density, is expressed in milliwatts per watt per meter squared (mW/W-m²), and is denoted by the symbol R.

"Roadway" is a surface on the earth, including a bridge, tunnel, floor, railway, or runway, which has been configured for travel by a vehicle.

"Six Degree of Freedom" or "6 Degree of Freedom" or "6 DOF" are descriptors of a device or devices that measure six positioning and orientation components of an object. In automotive, mapping and avionics applications, six degrees of freedom are typically specified as (x, y, z, roll, pitch, yaw) or (latitude, longitude, altitude, roll, pitch, yaw).

"Specular Reflection" or "regular reflection" is the mirror-like reflection of electromagnetic waves, such as light, from a surface.

"Spherical Coordinate System" is a three-dimensional coordinate space used for description of locations relative to a known point on a vehicle or an imaging component. Spherical coordinates are specified as $(\rho, \theta, \varphi)$, where $\rho$ specifies distance, $\theta$ specifies the vertical angle, and $\varphi$ specifies the horizontal or azimuth angle.

"Terrestrial Positioning System" is any low-altitude orbit or ground mounted wireless system that, when used in concert with receivers, allows for the absolute positioning and heading of vehicles and devices.

"Vehicle" is any machine designed to travel along a roadway, such as an automobile designed to travel along a road, or an airplane designed to travel along a runway.

Figure 2:
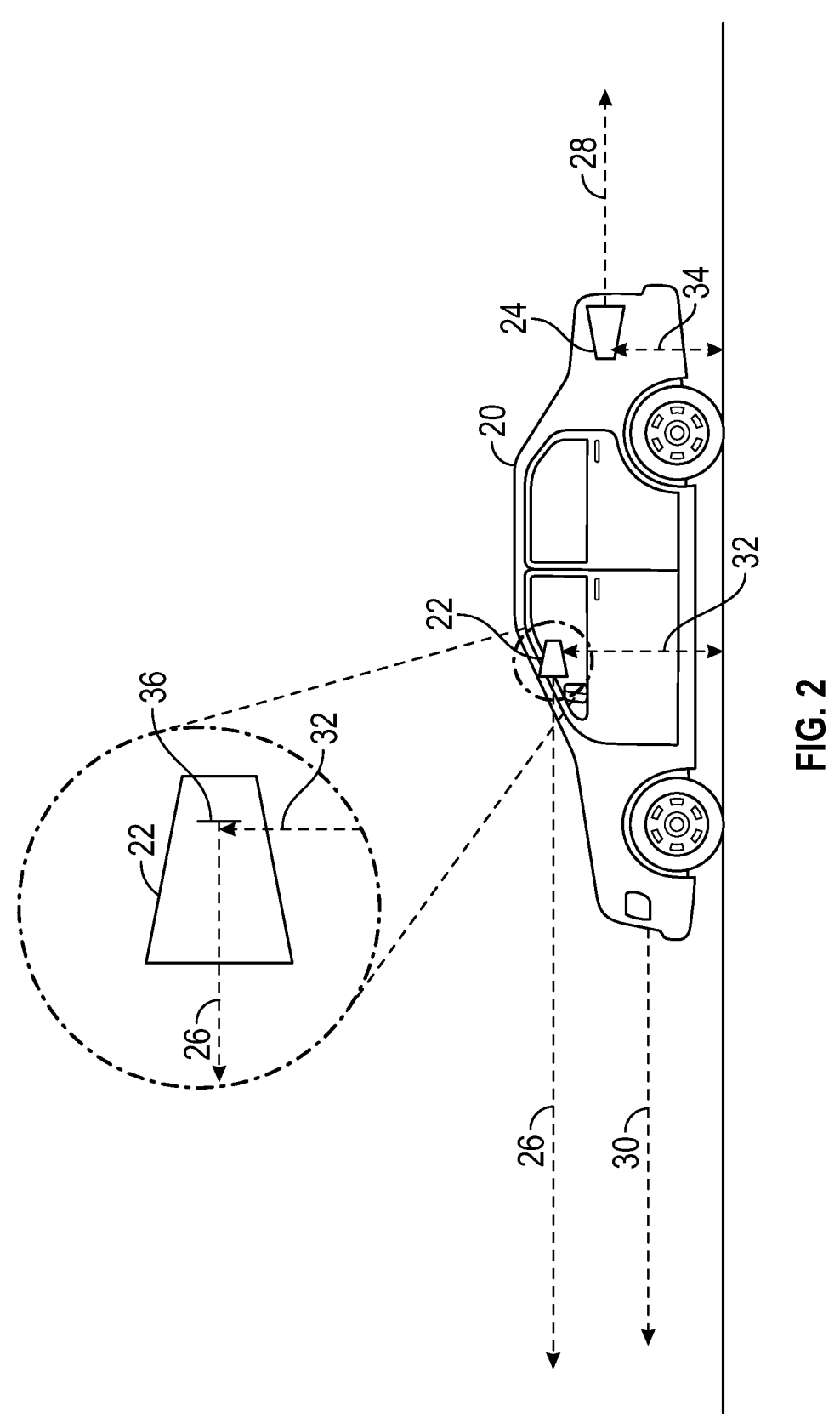
FIG. 2 illustrates an embodiment of a forward-facing imaging sensor and a rear-facing imaging sensor on board a vehicle utilizing boresight calibration.

FIG. 2 illustrates a vehicle 20 with a forward-facing imaging sensor 22, the vehicle 20 having a forward axis of travel 30. In various embodiments, the forward-facing imaging sensor 22 is provided with a boresight angle 26 that is calibrated to be parallel to the forward axis of travel 30 of the vehicle 20. The optical center of the imaging plane 36 of an array of photodetector elements (e.g., pixels) of the forward-facing sensor 22 is defined by a height 32 above a roadway. The rear-facing imaging sensor 24 is provided with a boresight angle 28 that is also calibrated to be parallel to and in the opposite direction of the forward axis of travel 30. The optical center of the imaging plane of an array of photodetector elements (e.g., pixels) of the rear-facing imaging sensor 24 is defined by a height 34 above a roadway.

In embodiments, sensor boresight angles for an imaging sensor array are established via measurement, either dynamic or predetermined, or via calibration, either dynamic or predetermined. For example, the heights 32, 34 can be predetermined at the installation of the imaging sensors 22, 24. Alternatively, the heights 32, 34 can be calibrated based on a dynamic determination of an actual height above the roadway of the vehicle by a distance sensor (e.g., a sensor mounted to the bottom of the vehicle) together with a fixed height of the optical center of the imaging sensor arrays 22, 24 in relation to the distance sensor. The heights 32, 34 can alternatively be based on 6 DOF determinations of the vehicle in accordance with other embodiments as described herein.

Figure 3:
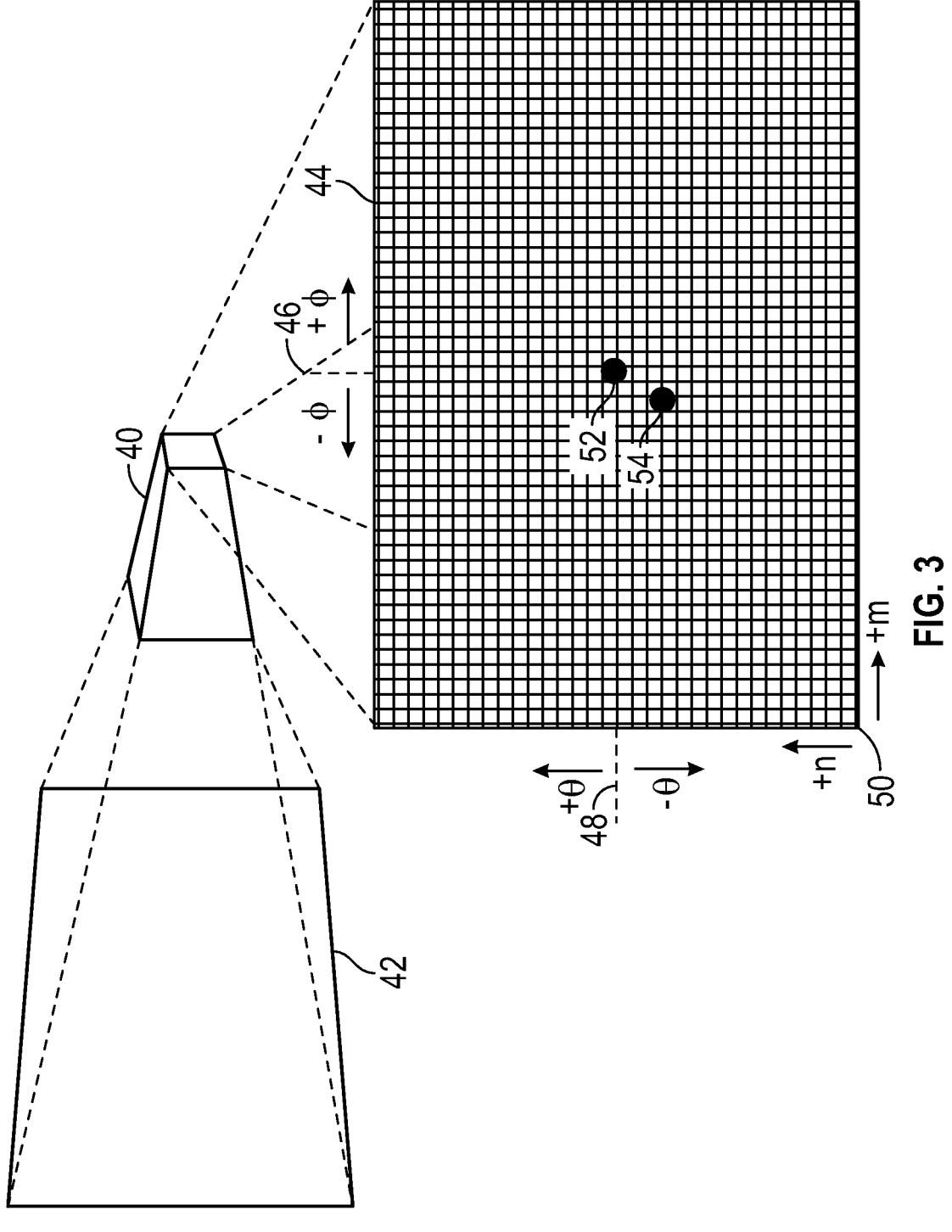
FIG. 3 illustrates an embodiment for determining calibration parameters for a multi-pixel array of photodetector elements of an imaging sensor.

FIG. 3 shows an optical configuration of an embodiment of a vehicle vision system that illustrates calibration parameters for a multi-pixel imaging sensor 40 with a field of view 42. The imaging sensor 40 imaging plane 44 is defined by M columns and N rows of pixels, with the origin 50 in the lower left and defined as pixel [0,0] in row/column nomenclature. The optical center 52 of the imaging plane 44 is defined by a vertical axis 46 that bifurcates the imaging plane 44 into columns and by a horizontal axis 48 that bifurcates the imaging plane 44 into rows. The optical center 52 is defined using row/column nomenclature. For a rectangular imaging plane 44, the optical center 52 is defined as:

$$\text{Optical Center} = [(M-1)/2, (N-1)/2] \qquad \text{Eq. 1}$$

Where M is the number of columns in the imaging plane
N is the number of rows in the imaging plane
For an imaging plane with an origin of [0,0]
For vehicle vision systems 40 with in-focus optics, each pixel will represent a defined optical portion of the field of view 42. The individual fields of view of the imaging plane 44 pixels combine to define the lensed vision system 40 field of view 42. Each pixel in the imaging plane 44 is defined by its angular offset from the imaging plane 44 optical center 52, where the angular offset is measured from the optical center of each individual pixel field of view. In embodiments, spherical coordinates are used with $\varphi$ (phi) defining horizontal or azimuth angles and $\theta$ (theta) defining vertical or elevation angles. In embodiments, positive values of $\varphi$ define horizontal pixel offsets to the right of the vertical optical axis 46 and negative values of $\varphi$ define horizontal pixel offsets to the left of the vertical optical axis 46. In embodiments, positive values of $\theta$ define vertical pixel offsets above the horizontal optical axis 48 and negative values of $\theta$ define vertical pixel offsets below the horizontal optical axis 48.

In embodiments, a calibration procedure populates values in a look-up table (LUT) that is used to map each pixel to its angular offset from the optical center 52. An angular offset LUT may take the form:

| Pixel | Angular Offset from Optical Center |
|---|---|
| [0,0] | $[\varphi_{[0,0]}, \theta_{[0,0]}]$ |
| . . . | |
| [M-1,0] | $[\varphi_{[M-1,0]}, \theta_{[M-1,0]}]$ |
| . . . | |
| [0,N-1] | $[\varphi_{[0,N-1]}, \theta_{[0,N-1]}]$ |
| . . . | |
| [M-1,N-1] | $[\varphi_{[M-1,N-1]}, \theta_{[M-1,N-1]}]$ |

In embodiments, a boresight angle is defined as the angular orientation of a sensor axis 40 for an imaging sensor having an array of photodetector elements corresponding to pixels in the imaging sensor installed on board a vehicle wherein the sensor axis 40 is parallel to the forward axis of travel of a vehicle as determined by a calibration procedure. A boresight pixel 54 is the location within the imaging plane 44 that equates to a boresight angle that is calibrated for a sensor installed on or in a vehicle. In embodiments, the row and column designation of the boresight pixel are floating point values.

Intensity-to-radiance conversion is the process by which intensity values are converted to radiance values for elements in a photodetector system. In embodiments, for photodetector elements that are linearized, normalized, and have equivalent-sized fields of view, intensity-to-radiance conversion is expressed as:

$$L_{[m,n]}=C*I_{[m,n]} \qquad \text{Eq. 2}$$

Where $L_{[m,n]}$ is a pixel radiance
$I_{[m,n]}$ is a pixel intensity
C is a global conversion constant In practice, the individual fields of view of the elements of a photodetector system are not equivalent. More specifically, photodetector elements typically do not specify a constant surface per unit projected area. Because radiance is specified as a surface per unit projected area, intensity values for photodetectors will not have a constant-driven relationship between radiance and intensity.

In embodiments, intensity-to-radiance conversion for normalized and linearized photodetector elements of a vision system is expressed as:

$$L_{[m,n]}=C_{[m,n]}*I_{[m,n]} \qquad \text{Eq. 3}$$

Where $L_{[m,n]}$ is a pixel radiance
$I_{[m,n]}$ is a pixel intensity
$C_{[m,n]}$ is a pixel radiance conversion constant In embodiments, a radiance conversion constant LUT for a vision system is used and takes a form similar to:

| Pixel | Radiance Conversion Constant |
|---|---|
| [0,0] | $C_{[0,0]}$ |
| . . . | |
| [M-1,0] | $C_{[M-1,0]}$ |
| . . . | |
| [0,N-1] | $C_{[0,N-1]}$ |
| . . . | |
| [M-1,N-1] | $C_{[M-1,N-1]}$ |

In embodiments for non-normalized photodetector elements for a vision system, a radiance conversion function is used for each pixel. A LUT used for pixel-level radiance conversion functions for normalization takes a form similar to:

| Pixel | Radiance Conversion Function for Normalization |
|---|---|
| [0,0] | $f_C(0,0)$ |
| . . . | |
| [M-1,0] | $f_C(M-1,0)$ |
| . . . | |
| [0,N-1] | $f_C(0,N-1)$ |
| . . . | |
| [M-1,N-1] | $f_C(M-1,N-1)$ |

In embodiments for non-linearized photodetector elements for a vision system, a radiance conversion function is used for each pixel. A LUT used for pixel-level radiance conversion functions for linearization takes a form similar to:

| Pixel | Radiance Conversion Function for Linearization |
|---|---|
| [0,0] | $f_C(0,0)$ |
| . . . | |
| [M-1,0] | $f_C(M-1,0)$ |
| . . . | |
| [0,N-1] | $f_C(0,N-1)$ |
| . . . | |
| [M-1,N-1] | $f_C(M-1,N-1)$ |

In its simplest form, flux determination for an active sensor system on a per-pixel basis is defined as:

$$\Phi_{[m,n]}=P_O/(M*N) \qquad \text{Eq. 4}$$

Where $P_O$ is the optical power output of the sensor illumination source
M is the number of columns in the optical detector
N is the number of rows in the optical detector An ideal configuration for an active imaging sensor includes a field of view that is perfectly aligned with a field of illumination, with the field of illumination displaying uniform illumination throughout the field of illumination at all distances within the field of view. In practice, an ideal active sensor configuration for vehicle vision systems is neither practical nor sustainable, especially when there are multiple visions systems in multiple vehicles operating simultaneously along an area of a roadway.

Figure 4:
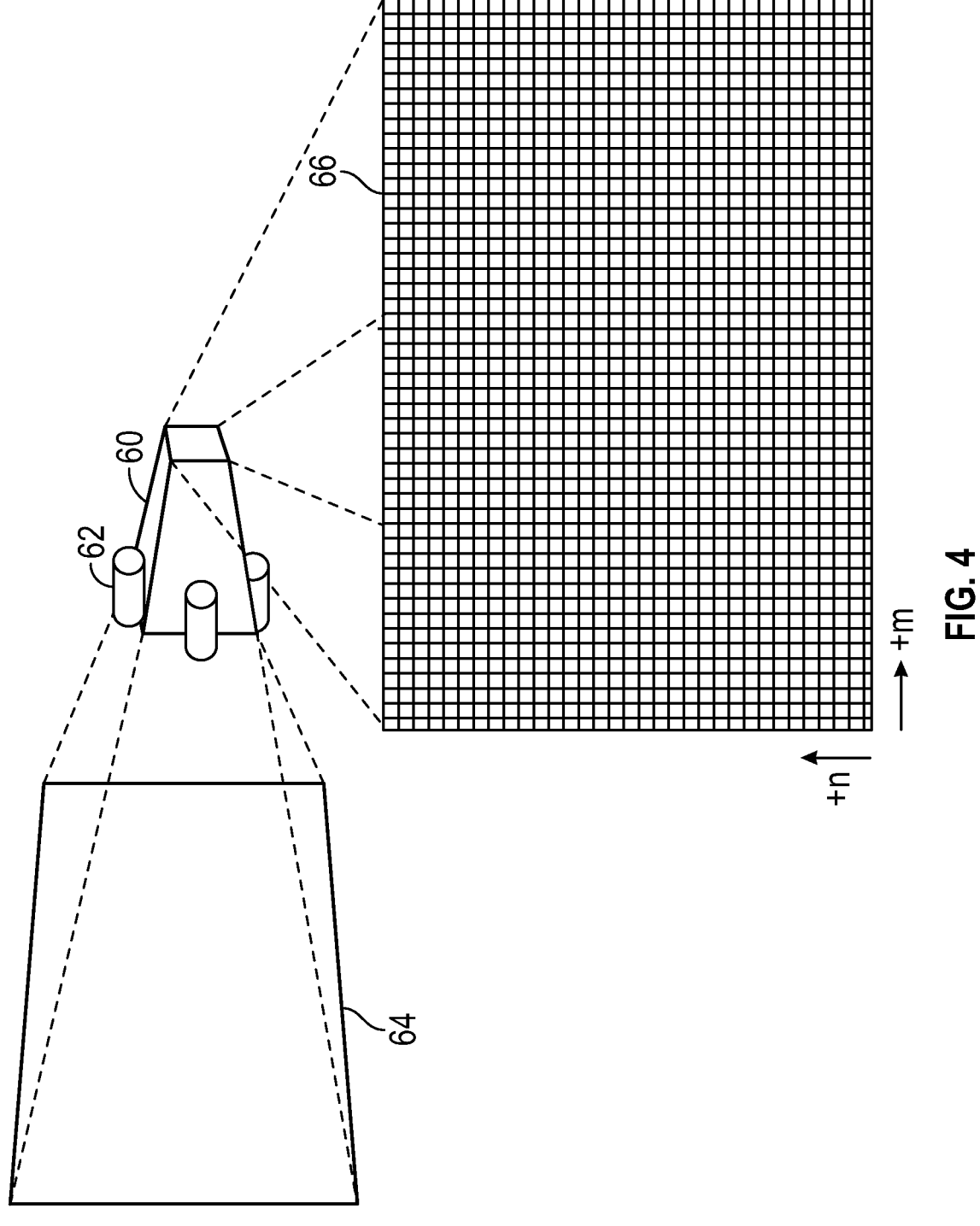
FIG. 4 illustrates an embodiment of an optical configuration for an active imaging sensor with an axis of a field of view aligned with an axis of a field of illumination.

FIG. 4 illustrates an optical configuration for an active imaging sensor in accordance with an embodiment of a vision system. The active imaging sensor includes an imager 60 and one or more illuminants 62. The optical axis of the field of view 64 of the imager 60 is operably aligned with the optical axis of the field of illumination of the one or more illuminants 62.

In embodiments, a calibration procedure is used to determine values for a flux LUT 66 that is used for determining reflectivity values of objects or points on objects within scenes. For each pixel [m,n] the as-determined flux value is stored for subsequent lookup and reflectivity determination for embodiments whereby the optical axis of the imager 60 is aligned with the optical axis of the illuminants 62. A flux LUT 66 may take the form:

| Pixel | Flux |
|---|---|
| [0,0] | $\Phi_{[0,0]}$ |
| . . . | |
| [M-1,0] | $\Phi_{[M-1,0]}$ |
| . . . | |
| [0,N-1] | $\Phi_{[0,N-1]}$ |
| . . . | |
| [M-1,N-1] | $\Phi_{[M-1,0-N-1]}$ |

It should be noted that while FIG. 4 includes a plurality of illuminants 62 and a single, planar imager 62, in alternative embodiments there could be various numbers and types of both the emitters and receivers. With respect to emitters, illuminants 62 could be replaced by a single, variable light source which can physically move (such as on a track) or can have various components thereof lit at various times. Likewise, imager 62 could be replaced in various embodiments with different photodetector sensors that detects along the boresight angle from various positions, either by being moved, angled, or activated at different portions to detect different portions of the incoming light. In embodiment, even a single emitter or receiver of light could be redirected using mirrors, lenses, or the like, to provide different data sets that can be combined as described herein to corroborate one another or to form a more complete representation of the physical surroundings of a vehicle.

Figure 5:
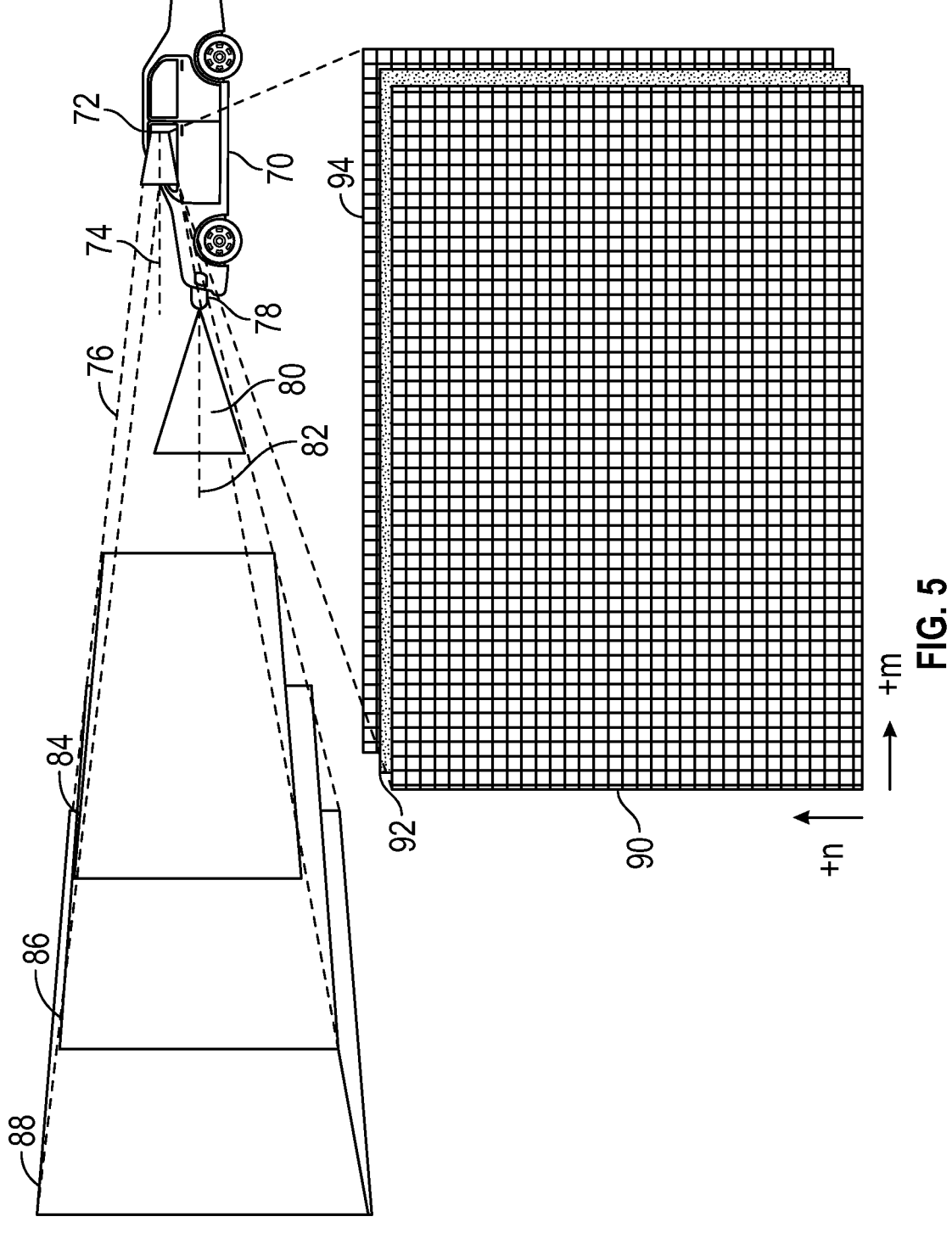
FIG. 5 illustrates an embodiment of an optical configuration for an active imaging sensor with an axis of a field of view that is not aligned with an axis of a field of illumination.

FIG. 5 illustrates an optical configuration for an active imaging sensor on a vehicle 70. The active imaging sensor includes an imager 72 with an optical axis 74 for a field of view 76 and one or more illuminants 78 with an optical axis 82 for a field of illumination 80. The optical axis 74 of the field of view 76 of the imager 72 may or may not be operably aligned with the optical axis 82 of the field of illumination 80 of the one or more illuminants 78. Due to the non-aligned or unknown alignment of the optical axes 74, 82, the flux for a given pixel will be different at various distances throughout the field of view 76. In embodiments, accounting for varying pixel flux at varying distances employs the use of multiple LUTs consisting of pixel flux values at predefined distances from the vision system.

In embodiments, a calibration procedure is used to determine values for a plurality of flux density LUTs 90, 92, 94 that are utilized for determining reflectivity values for objects or points on objects within scenes. The number of flux density LUTs depends on the desired depth of field for which reflectivity measurements are desired and the specified depth granularity within the depth of field. For each pixel [m,n] in each flux density LUT, the as-determined flux density value is stored for subsequent lookup and reflectivity determination for embodiments whereby the optical axis of the imager 72 may not be optically aligned with the optical axis of the illuminants 78. Flux density LUTs 90, 92, 94 for three different surfaces 84, 86, 88 at three distances $d_1$, $d_2$, and $d_3$ from the imager 72 may take the form:

| Pixel | Flux Density at $d_1$ |
| --- | --- |
| [0,0] | $E(d_1)_{[0,0]}$ |
| . . . | |
| [M-1,0] | $E(d_1)_{[M-1,0]}$ |
| . . . | |
| [0,N-1] | $E(d_1)_{[0,N-1]}$ |
| . . . | |
| [M-1,N-1] | $E(d_1)_{[M-1,0=N-1]}$ |

| Pixel | Flux Density at $d_2$ |
| --- | --- |
| [0,0] | $E(d_2)_{[0,0]}$ |
| . . . | |
| [M-1,0] | $E(d_2)_{[M-1,0]}$ |
| . . . | |
| [0,N-1] | $E(d_2)_{[0,N-1]}$ |
| . . . | |
| [M-1,N-1] | $E(d_2)_{[M-1,0=N-1]}$ |

| Pixel | Flux Density at $d_3$ |
| --- | --- |
| [0,0] | $E(d_3)_{[0,0]}$ |
| . . . | |
| [M-1,0] | $E(d_3)_{[M-1,0]}$ |
| . . . | |
| [0,N-1] | $E(d_3)_{[0,N-1]}$ |
| . . . | |
| [M-1,N-1] | $E(d_3)_{[M-1,0=N-1]}$ |

Figure 6:
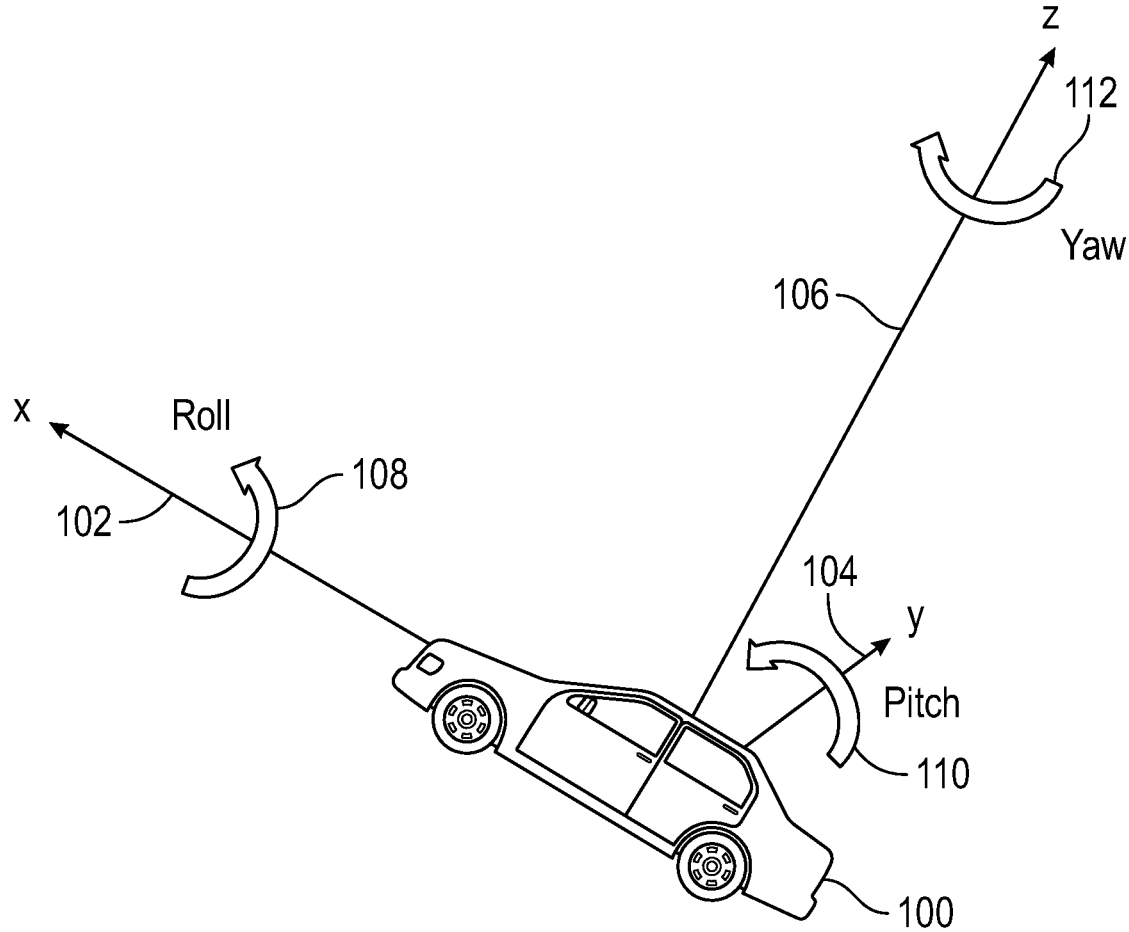
FIG. 6 illustrates an embodiment of photodetector-only determination system for six degree-of-freedom information for a vehicle.

FIG. 6 illustrates a six degree of freedom (6 DOF) photodetector-only orientation determination system for a vehicle 100. Directional vectors 102, 104, 106 generally conform to a right-hand rule orientation with the x-axis 102 denoting forward/backward movement, the y-axis 104 denoting left/right movement, and the z-axis 106 denoting up/down movement. Positive values of x 102 denote forward movement and negative values of x 102 denote rearward movement. Positive values of y 104 denote rightward movement and negative values of y 104 denote leftward movement. Positive values of z 106 denote upward movement and negative values of z 106 denote downward movement. Pitch 110 designates rotation about the y-axis 104, roll 108 designates rotation about the x-axis 102, and yaw 112 designates rotation about the z-axis 106.

Figure 7:
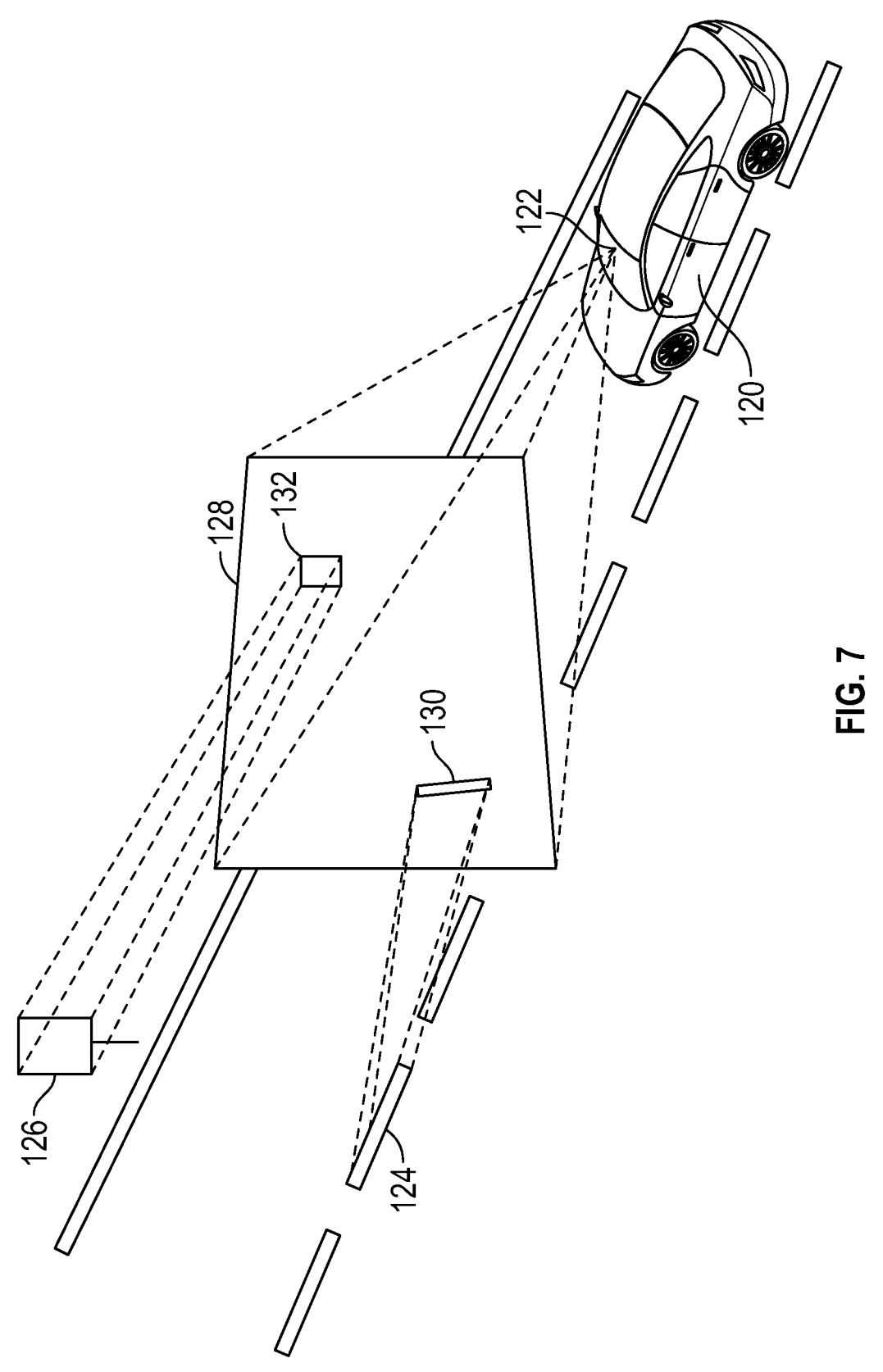
FIG. 7 illustrates an embodiment of a representation of objects in image space for an imaging sensor.

FIG. 7 illustrates data element definitions utilized for distance, motion and 6 DOF determination. An image 128 is captured with an imaging sensor 122 on board a vehicle 120 traversing a roadway. A sign 126 from the scene is represented in image space 128 as a two-dimensional (2D) projection 132. A pavement marking 124 on the roadway surface is represented in image space 128 as a 2D projection 130. In embodiments, features in image space 128 are converted to image vectors represented by polygons with a number (K) vertices. In embodiments, associated scene vectors are produced in scene space and are described by polygons with K vertices.

In embodiments, an image vector definition for an n-point polygon is:

$$I(type, i, j) = \begin{matrix} m_0 & n_0 \\ m_1 & n_1 \\ m_2 & n_2 \\ \cdots \\ m_K & n_K \end{matrix} \qquad \text{Eq. 5}$$

Where
  i is the image number
  j is the vector number in the image
  $(m_0, n_0)$ is the pixel location of a polygon midpoint
  $(m_1, n_1)$ through $(m_K, n_K)$ are vertices of a polygon
  type is the type of image vector In embodiments, options for image vector type corresponding to each individual polygon can be IMPK, ISPK, where I signifies an image vector, M signifies points are in pixel coordinates, S signifies the points are in spherical coordinates, P signifies that the vector describes a polygon, and K signifies the number of vertices in that polygon.

Figure 8:
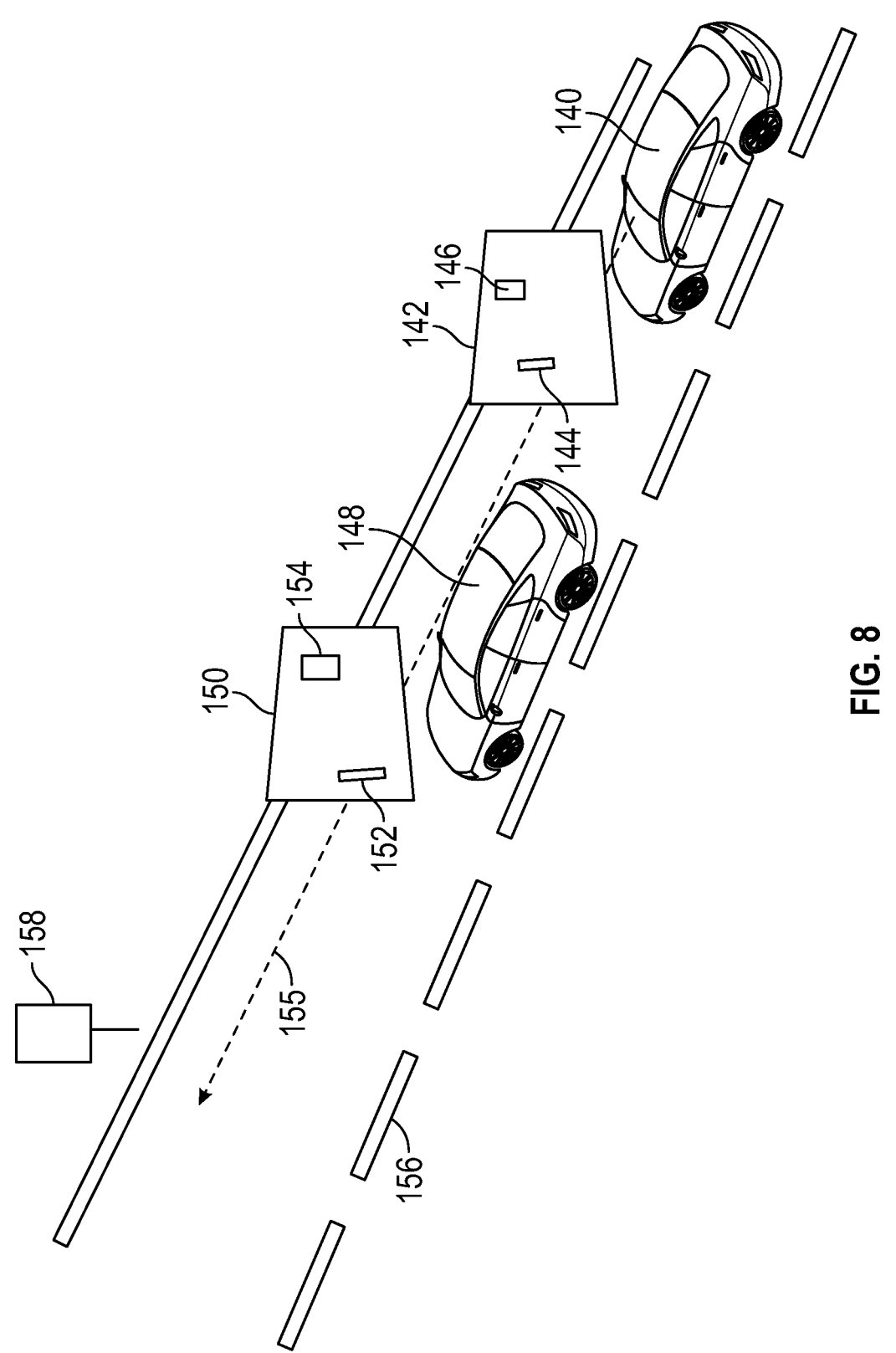
FIG. 8 illustrates an embodiment of a representation of objects in image space for images collected at two imaging sensor locations.

FIG. 8 illustrates a roadway scene displaying the imaging of roadway elements by an imaging sensor on board a vehicle. A sign 158 and a pavement marking 156 are projected into image space 142 as image elements 146, 144 for a vehicle at a first location 140 on a roadway. The same sign 158 and pavement marking 156 are projected into image space 150 as image elements 154, 152 for the same vehicle at a second location 148 on a roadway. The vehicle at a first location 140 and a second location 148 travels along a movement axis 155.

Figure 9:
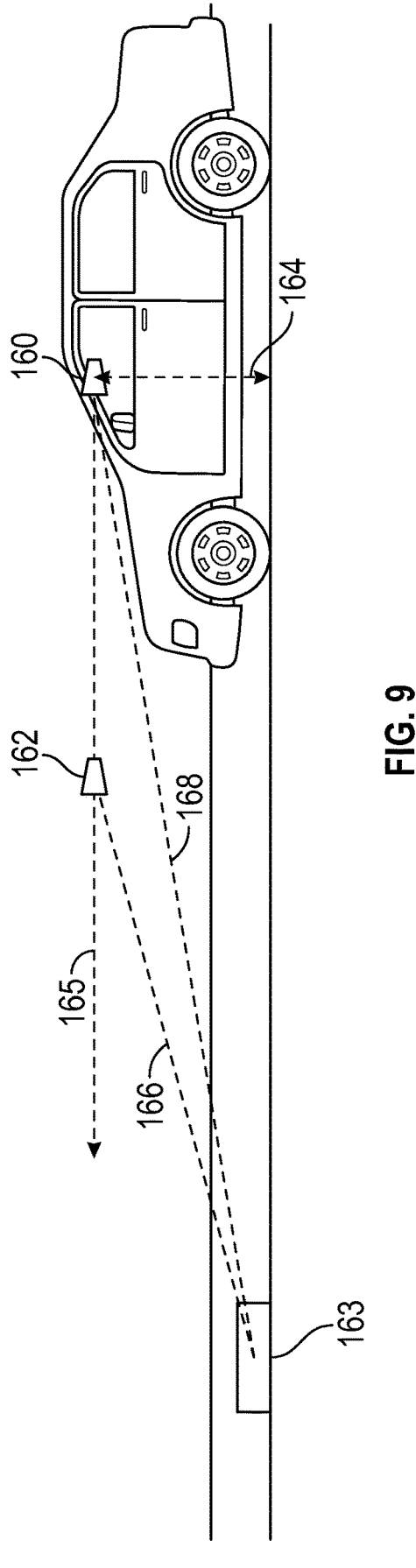
FIG. 9 illustrates an embodiment of a scene geometry for an object imaged by an imaging sensor at two locations.

FIG. 9 illustrates a side view of two imaging sensor locations 160, 162 on a vehicle traversing a roadway along a movement axis 165. Movement axis 165 is linear in the embodiment shown in FIG. 9, though it should be understood that vehicles may travel in non-linear paths and the simplified description for the linear case will continue to apply. The consecutive images collected at the imaging sensor locations 160, 162 are at a first distance 168 and a second distance 166 from a pavement marking 163. The projection of a roadway scene element 163 into multiple image spaces allows for a computation of the amount of forward movement of a vehicle along a movement axis 165 by utilizing projection areas and dihedral angles between scene vectors and image vectors. Planar area calculations are performed for planar polygon image vector surfaces at defined radial distances from the image plane. The normal direction for the polygonal vector elements are described at the midpoint of the polygonal element. For non-planar objects, the normal angle of a vector is the normal to the surface at the vector midpoint. Non-planar vector objects are projected into planar elements for distance determination.

At each imaging sensor location along the roadway, image vectors are projected into two planes—the first plane projects polygon points onto a spherical surface of known distance from the imaging sensor, and the second plane is defined by the polygon points in the scene vector. The areas for the two projected scene vectors for the common scene object are:

$$\text{Projected scene vector area } 1 = \cos(N_1 - N_s) * (d_1/d_3)^2 * A_1 \qquad \text{Eq. 6}$$

Where $(N_1 - N_s)$ is the dihedral angle between the normal angle of the scene polygon and the normal angle of the projected image polygon 1

$d_1$ is the distance from the imaging sensor to the scene vector midpoint at vehicle location 1

$d_3$ is the distance from the imaging sensor to the projected image vector midpoint $A_1$ is the computed area of the projected image polygon 1

Where the $A_1$ vertex points = $(d_3, \theta_{m1}(i,j), \varphi_{n1}(i,j))$
$(d_3, \theta_{m2}(i,j), \varphi_{n2}(i,j))$
$(d_3, \theta_{m3}(i,j), \varphi_{n3}(i,j))$
$(d_3, \theta_{m4}(i,j), \varphi_{n4}(i,j))$
$A_1$ midpoint = $(d_3, \theta_{m0}(i,j), \varphi_{n0}(i,j))$
$N_1 = (\theta_{m0}(i,j), \varphi_{n0}(i,j))$ $$\text{Projected scene vector area } 2 = \cos(N_2 - N_s) * (d_2/d_3)^2 * A_2 \qquad \text{Eq. 7}$$

Where $(N_1 - N_s)$ is the dihedral angle between the normal vector of the scene polygon and the normal vector of the projected image polygon 2

$d_2$ is the distance from the imaging sensor to the scene vector midpoint at vehicle location 2

$d_3$ is the distance from the imaging sensor to the projected image vector midpoint $A_2$ is the computed area of the projected image polygon 2

Where $A_2$ vertex points = $(d_3, \theta_{m1}(i+1,j), \varphi_{n1}(i+1,j))$
$(d_3, \theta_{m2}(i+1,j), \varphi_{n2}(i+1,j))$
$(d_3, \theta_{m3}(i+1,j), \varphi_{n3}(i+1,j))$
$(d_3, \theta_{m4}(i+1,j), \varphi_{n4}(i+1,j))$
$A_2$ midpoint = $(d_3, \theta_{m0}(i+1,j), \varphi_{n0}(i,j))$
$N_2 = (\theta_{m0}(i+1,j), \varphi_{n0}(i,j))$ In embodiments, $A_1$, $N_1$, $A_2$ and $N_2$ are computed for the projected image vectors at a known $(d_3)$ distance.

All scene vectors are tested to determine if they are road surface vectors. Possible road surface scene vectors to be tested are assigned a normal angle $(N_s)$ value of $\varphi = 0°$ and $\theta = 90°$. For scene vectors, the projected polygon areas are unknown but identical. However, the areas of polygons on the road surface can be computed by utilizing the known imaging sensor height 164 above the roadway. In addition, the normal angle of the scene polygon on the road surface is known, and the first distance 168 $(d_1)$ and the second distance 166 $(d_2)$ is computed.

The distances from the sensor to the scene vectors are computed according to:

$$d_1 = h/\cos(N_1 - N_s) \qquad \text{Eq. 8}$$

Where h is the height of the imaging sensor above the roadway $N_1$ is the normal angle for the projected image polygon for the first image $N_s$ is the normal angle for the scene vector $$d_2 = h/\cos(N_2 - N_s) \qquad \text{Eq. 9}$$

Where h is the height of the imaging sensor above the roadway $N_2$ is the normal angle for the projected image polygon for the second image $N_s$ is the normal angle for the scene vector Inserting known imaging sensor distance values, known scene vector normal angles, and known image vector normal angles into Eq. 6 and Eq. 7 allows for the computation of the areas of the projected scene vectors. The test for whether a scene vector is a road surface vector is:

$$\text{Absolute Value (Projected scene vector area 2 - projected scene vector area 1)} < \text{roadway test threshold} \qquad \text{Eq. 10}$$

In embodiments, the identification of a scene vector on a roadway surface enables the determination of the amount of forward movement of a vehicle. The midpoints of scene vectors for a road-based object are:

$$\text{Scene Vector 1 (SV}_1) \text{ midpoint} = (d_1, \theta_{m0}(i,j), \varphi_{n0}(i,j))$$

$$\text{Scene Vector 2 (SV}_2) \text{ midpoint} = (d_2, \theta_{m0}(i+1,j), \varphi_{n0}(i+1,j))$$

The distance moved along the travel axis is determined by computing the difference between the x-component of the scene vector midpoints in relative Cartesian coordinates:

$$\Delta x = d_1 * \sin(\theta_{m0}(i,j)) * \sin(\varphi_{n0}(i,j)) - d_2 * \sin(\theta_{m0}(i+1,j)) * \sin(\varphi_{n0}(i+1,j)) \qquad \text{Eq. 11}$$

Exemplary methods may be used to determine the distance traveled along a path in lieu of the vectorization for image vectors and scene vectors, including, but not limited to: 1) utilizing vehicle velocity multiplied by time elapsed between successive images, 2) utilizing a difference for on-angle (those aligned with a travel path) distance measurements from an on-board imaging sensor, and 3) utilizing a difference in off-angle distance measurements from an on-board imaging sensor traversing a travel path.

Figure 10:
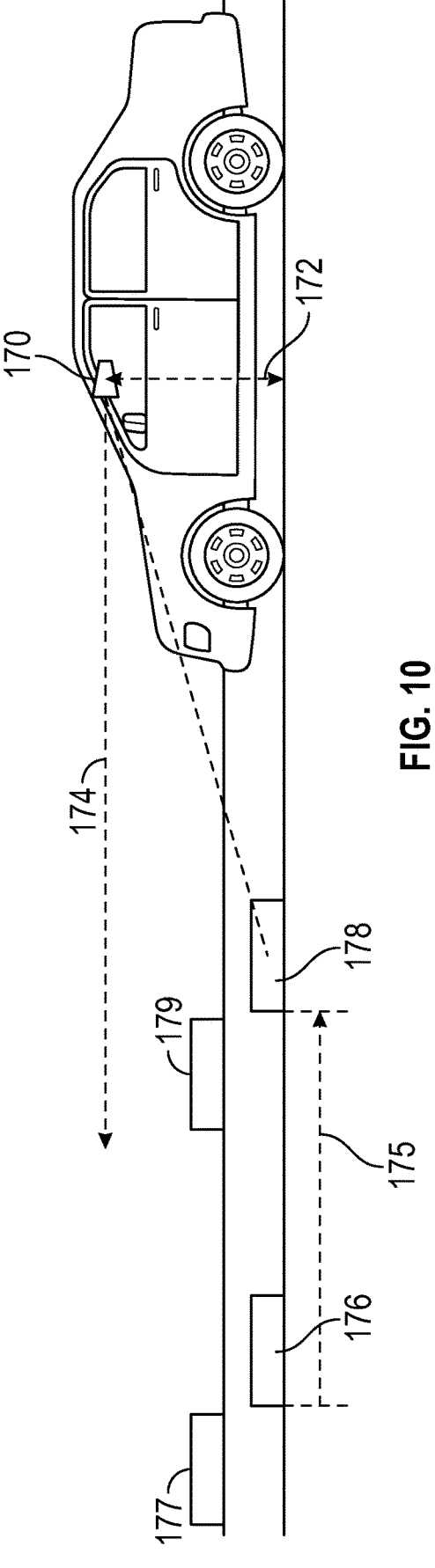
FIG. 10 illustrates an embodiment of the projection of objects from a sensor image into spatial locations within a sensor image collected at a separate location.

FIG. 10 illustrates a vehicle 170 at a location on a roadway at which the second image of a two-image sequence is captured. The vehicle 170 travels along an axis 174, with an imaging sensor 170 at a height 172 above a roadway. A pavement marking 176 is shown at a Cartesian coordinate location $(x_1, y_1, -h)$ as determined from the first image in a two-image sequence. An x-translated pavement marking 178 is shown that represents a virtual location of the actual pavement marking with a Cartesian coordinate location $(x_1 - \Delta x, y_1, -h)$. The x-translated distance 175 along the x-axis represents the forward movement of the vehicle 170 along an axis 174 between successive image events. The midpoint for the translated virtual scene vector $(T_1(x))$ 178 location is produced by converting the Cartesian coordinate midpoint to spherical coordinates and is expressed as a midpoint mapped into translated image vector space:

$$T_1(x)\text{midpoint} = (\cos^{-1}[-h/\text{SQRT}((x_1 - \Delta x)^2 + y_1^2 + h^2)],$$
$$\tan^{-1}[(x_1 - \Delta x)/y_1]) \qquad \text{Eq. 12}$$

FIG. 10 also illustrates a second pavement marking 177 on a road surface for which an x-translated virtual scene vector ($T_2(x)$) 179 is produced. In embodiments, two image vector midpoints and their two associated x-translated virtual scene midpoints are sufficient information for producing photodetector-only 6 DOF determination information for the vision system.

Figure 11:
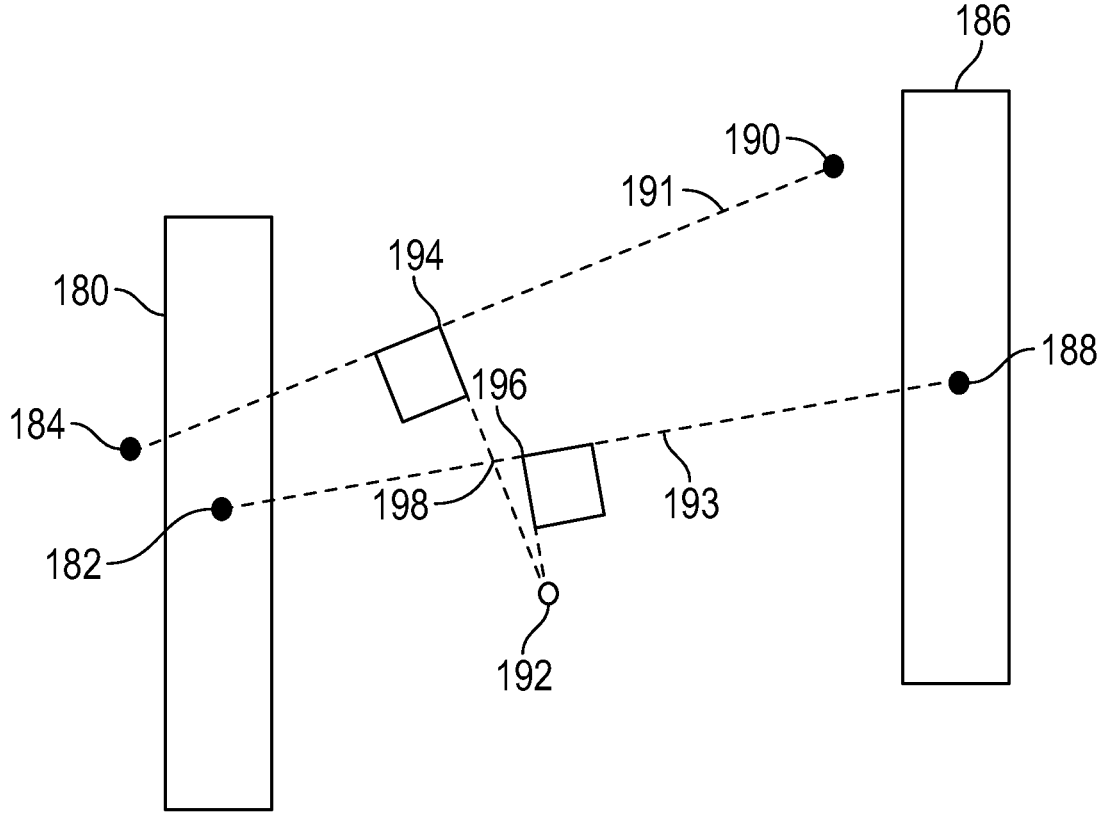
FIG. 11 illustrates an embodiment of a geometry for determining sensor roll with images collected from two locations along a travel path.

FIG. 11 shows a second-sensor-location image view of the scene illustrated in FIG. 10. An image vector 180 for a first pavement marking corresponding to a second sensor location is shown with four polygon vertices V and a midpoint 182. A midpoint 184 is shown for a virtual scene vector corresponding to a first pavement marking at a first sensor location scene vector that has been x-translated to second sensor location coordinates and back-projected into second sensor location image space. An image vector 186 for a second pavement marking corresponding to a second sensor location is shown with four polygon vertices and a midpoint 188. A midpoint 190 is shown for a virtual scene vector corresponding to a second pavement marking at a first sensor location scene vector that has been x-translated to second sensor location coordinates and back-projected into second sensor location image space. A segment 191 connecting the x-translated first-sensor-location vector midpoints is shown along with a segment 193 connecting the second-sensor-location image vector midpoints. A segment perpendicular to the x-translated-midpoints segment 191 is shown with one endpoint 192 at the boresight pixel location and a second endpoint 194 located on the x-translated-midpoints segment 191. A segment perpendicular to the image-vector-midpoints segment 193 is shown with one endpoint 192 at the boresight pixel location and a second endpoint 196 located on the x-translated-midpoints segment 191. An intersection point 198 is defined by the intersection of the boresight-to-x-translated-midpoints segment and the image-vector-midpoints segment 193. Delta-roll or $\Delta$-roll defines the difference in the 6 DOF roll parameter between the first sensor location and the second sensor location. $\Delta$-roll is defined relative to the boresight axis and is computed by:

$$\Delta\text{-roll}=(\theta[\text{point196}]-\theta[\text{point198}],\varphi[\text{point196}]-\varphi[\text{point198}]) \qquad \text{Eq. 13}$$

Figure 12:
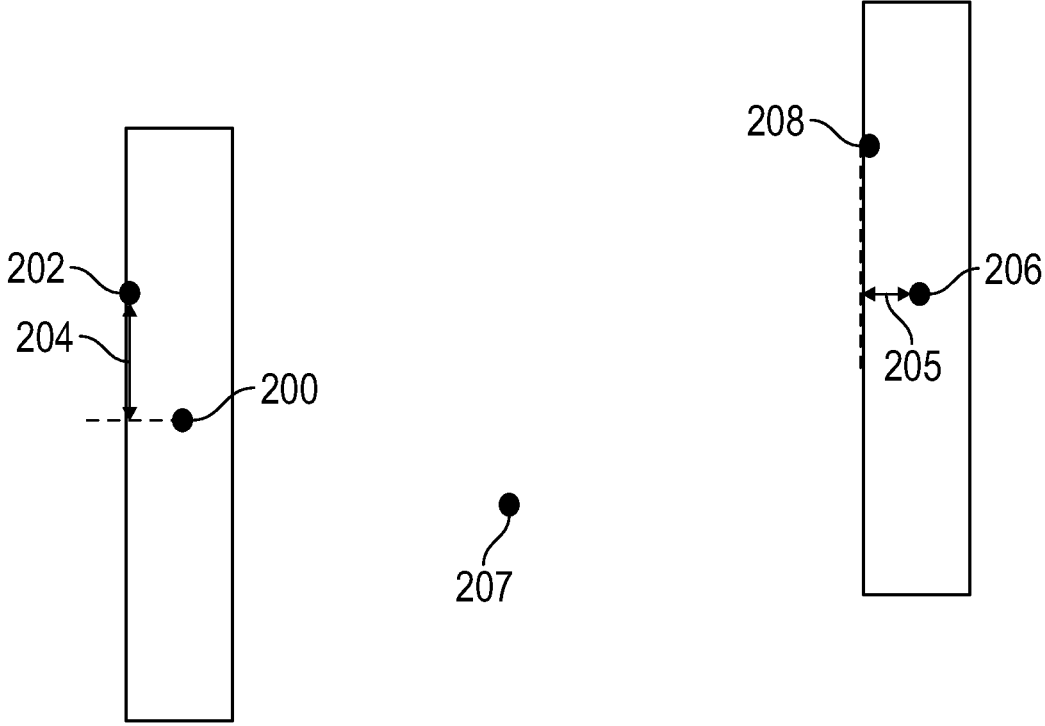
FIG. 12 illustrates an embodiment of a geometry for determining sensor pitch and sensor yaw with images collected with a single sensor from two locations along a travel path.

FIG. 12 illustrates the image space components from FIG. 11. An image vector for a first pavement marking corresponding to a second sensor location is shown with four polygon vertices and a midpoint 200. A midpoint 202 is shown for a virtual scene vector corresponding to a first pavement marking at a first sensor location scene vector that has been x-translated to second sensor location coordinates and back-projected into second sensor location image space, whereby the location of the midpoint 202 is the previously-x-translated virtual scene vector midpoint rotated about the boresight 207 pixel axis by an angular rotation equal to $\Delta$-roll from Eq. 13. An image vector for a second pavement marking corresponding to a second location is shown with four polygon vertices and a midpoint 206. A midpoint 208 is shown for a virtual scene vector corresponding to a second pavement marking at a first sensor location that has been x-translated to second sensor location coordinates and back-projected into second sensor location image space, whereby the location of the midpoint 208 is the previously-translated virtual scene vector midpoint rotated about the boresight 207 pixel axis by an angular rotation equal to $\Delta$-roll from Eq. 13. A vertical pixel offset 204 defines the vertical movement of an imaging sensor between a first location and a second location. The vertical offset 204 consists of components relating to changes in z-axis location and changes in pitch for a 6 DOF movement. For a forward-moving imaging sensor on board a vehicle, changes in pitch will typically far exceed changes in z location. Because of this relationship, the changes for z-axis and pitch values are computed as:

$$\Delta\text{-}z=0 \qquad \text{Eq. 14}$$

$$\Delta\text{-pitch}=(\theta[\text{point200}]-\theta[\text{point202}]) \qquad \text{Eq. 15}$$

In embodiments, an imaging sensor with an integrated accelerometer that detects z-axis movement may be used to enhance the information received by an photodetector-only IMU system. In instances whereby an integrated accelerometer is used for z-axis sensing, the accelerometer value replaces the zero value in Eq. 14 and the pitch component for Eq. 15 is modified in accordance with the accelerometer-supplied z-axis movement. Alternatively, a distance sensor such as an ultrasonic sensor may be used to dynamically detect changes in z-axis values to be used in the calibration or the known height of the vision sensor.

A horizontal pixel offset 205 defines the horizontal movement of an imaging sensor between a first location and a second location. The horizontal offset 205 consists of components relating to changes in y-axis location and changes in yaw for a 6 DOF movement. For a forward-moving imaging sensor on a vehicle, changes in yaw will typically far exceed changes in y location. Because of this relationship, the changes for y-axis and yaw values are computed as:

$$\Delta\text{-}y\approx0 \qquad \text{Eq. 16}$$

$$\Delta\text{-yaw}=((\varphi[\text{point206}]-(\varphi[\text{point208}]) \qquad \text{Eq. 17}$$

In embodiments, an imaging sensor with an integrated accelerometer that detects y-axis movement may be used to enhance the information received by a photodetector-only IMU system. In instances whereby an integrated accelerometer is used for y-axis sensing, the accelerometer value replaces the zero value in Eq. 16 and the yaw component for Eq. 15 is modified in accordance with the accelerometer-supplied y-axis movement.

Figure 13:
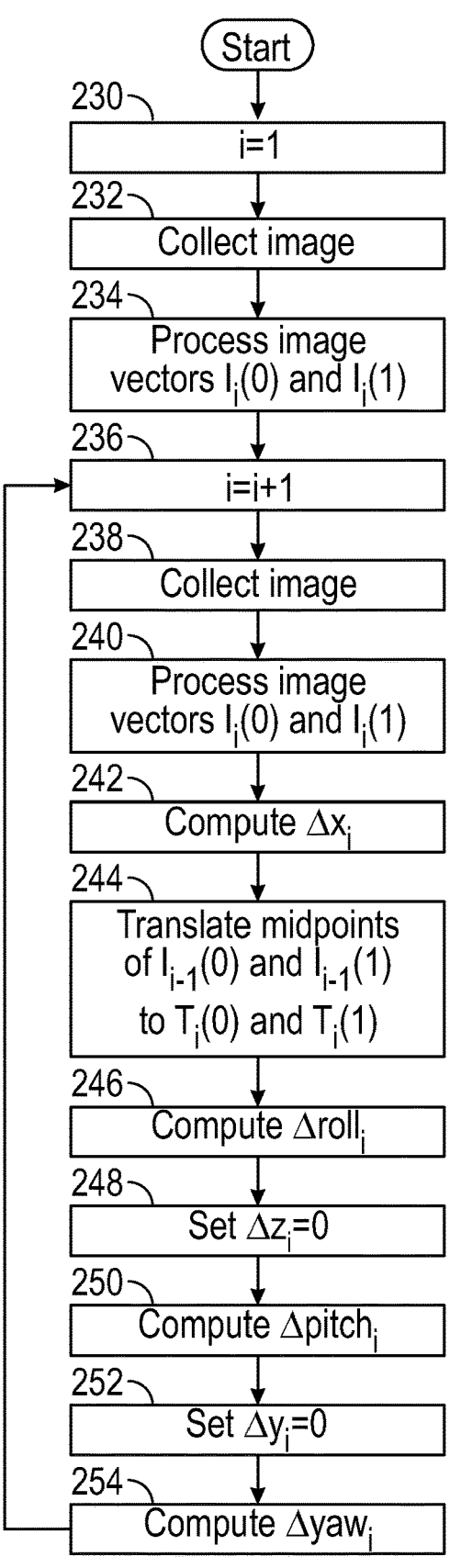
FIG. 13 illustrates an embodiment of steps in a procedure to determine six degree-of-freedom information from a single imaging sensor.

FIG. 13 illustrates a flowchart for a procedure for determining 6 DOF information with a single-sensor system. The single imaging sensor collects multiple images in a sequence and determines changes in 6 DOF parameters between successive images. Multiple images in a sequence are tracked by an image counter. After the start of a 6 DOF procedure, an image counter is initialized at 230 and the first image is collected at 232. At 234, collected image 1 is processed to determine the attributes for two image vectors $I_1(0)$ and $I_1(1)$, where the image vector subscript denotes the image number and the number in parenthesis denotes the vector number identified in the image. Upon identification of image vectors for image 1, the 6 DOF system increments the image counter at 236, collects the next image from the imaging sensor at 238, and determines image vectors at 240 that are associated with image vectors identified for the previous image. Upon identifying matched image vectors for images i and i–1, Eqs. 6 through 11 are used to compute $\Delta x_i$ at step 242, where $\Delta x_i$ represents the imaging sensor movement along a boresight axis between capture point i–1 and capture point i. At 244 x-dimension-translated midpoints $T_{x,i}(0)$ and $T_{x,i}(1)$ are created from midpoints of image vectors $I_{i-1}(0)$ and $I_{i-1}(1)$ by using Eq. 12. At 246 $\Delta\text{roll}_i$ is computed by using Eq. 13. Vertical sensor movement $\Delta z_i$ is set to zero at 248. At 250 the vertical offsets between image vectors and x-translated image vectors are used to determine $\Delta\text{pitch}_i$ by using Eq. 15. Horizontal sensor movement $\Delta y_i$ is set to zero at 252. At 254 the horizontal offsets between image vectors and x-translated image vectors are used to determine $\Delta yaw_i$ by using Eq. 17. Upon completion of the 6 DOF computations, the procedure increments the image counter at 236 and resumes the process for the new image number.

Figure 14:
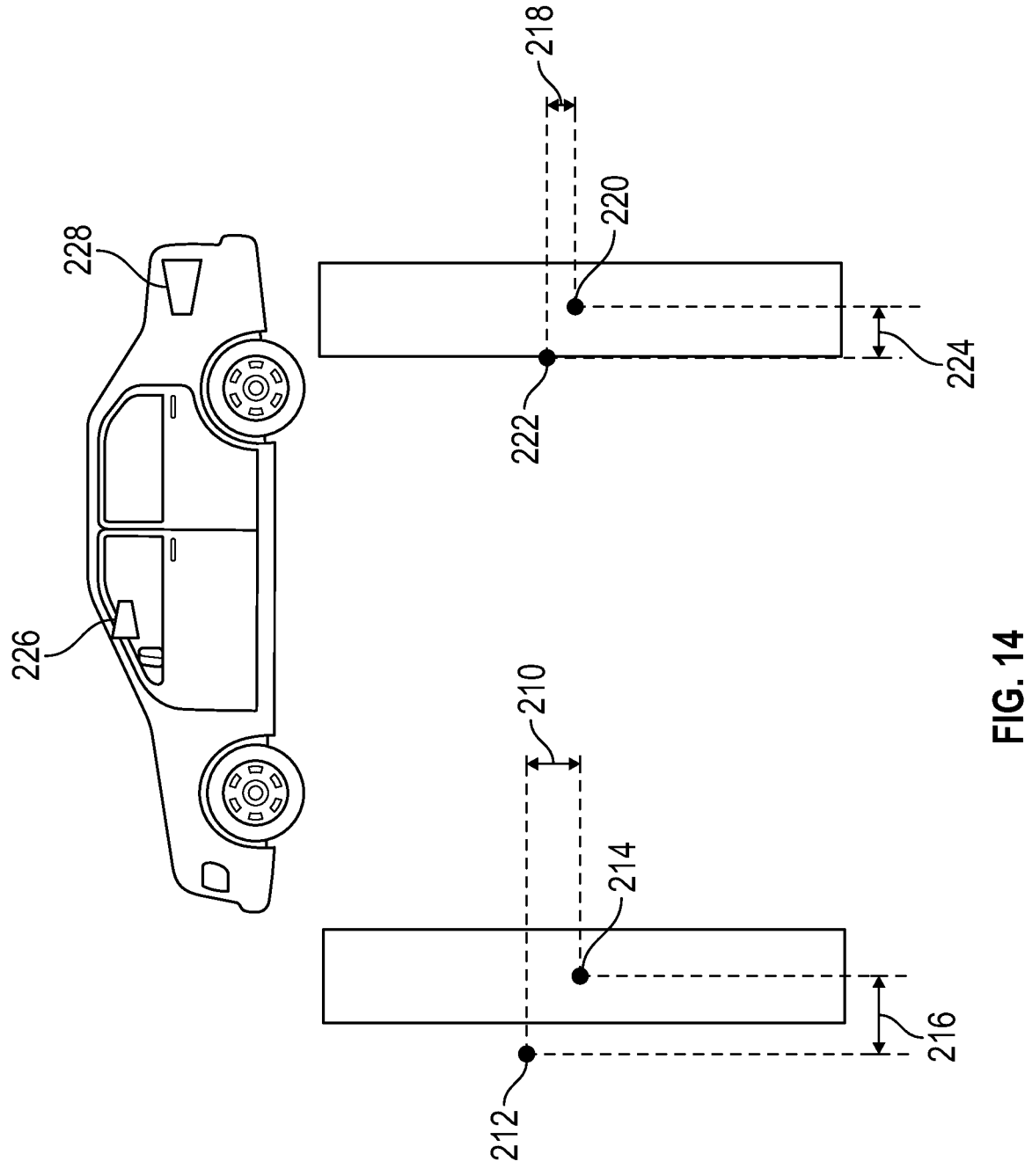
FIG. 14 illustrates an embodiment of a geometry for determining sensor pitch and sensor yaw with images collected from two imaging sensors.

In embodiments, single-sensor systems produce non-zero change values for four ($\Delta$-x, $\Delta$-roll, $\Delta$-pitch, and $\Delta$-yaw) of the six elements for a 6 DOF system. In embodiments, dual-sensor systems are able to produce non-zero change values for all six elements for a photodetector-only 6 DOF determination system. FIG. 14 illustrates a vehicle with a forward-facing imaging sensor 226 and a rear-facing imaging sensor 228. A front imaging sensor image space representation of a roll-adjusted, first-location x-translated midpoint 212 is shown next to an image vector and associated second-location midpoint 214. A rear imaging sensor image space representation of a roll-adjusted, first-location x-translated midpoint 222 is shown next to an image vector and associated second-location midpoint 220. Based on front and rear sensor image vectors and x-translated scene vectors, vertical offsets 210, 218 are used to compute $\Delta$-pitch and $\Delta$-z for the front imaging sensor according to:

$$(\theta[\text{point}214] - \theta[\text{point}212]) = \Delta - z + \Delta\text{-pitch} \qquad \text{Eq. 18}$$

$$(\theta[\text{point}220] - \theta[\text{point}212]) = \Delta - z - \Delta\text{-pitch}/C_{LeverArmPitch} \qquad \text{Eq. 19}$$

Where $C_{LeverArmPitch}$ is a constant

Based on front and rear sensor image vectors and x-translated scene vectors, horizontal offsets 216, 224 are used to compute $\Delta$-yaw and $\Delta$-y for the front imaging sensor according to:

$$(\varphi[\text{point}214] - \varphi[\text{point}212]) = \Delta - y + \Delta\text{-yaw} \qquad \text{Eq. 20}$$

$$(\varphi[\text{point}220] - \varphi[\text{point}212]) = \Delta - y - \Delta\text{-yaw}/C_{LeverArmYaw} \qquad \text{Eq. 21}$$

Where $C_{LeverArmYaw}$ is a constant

Figure 15:
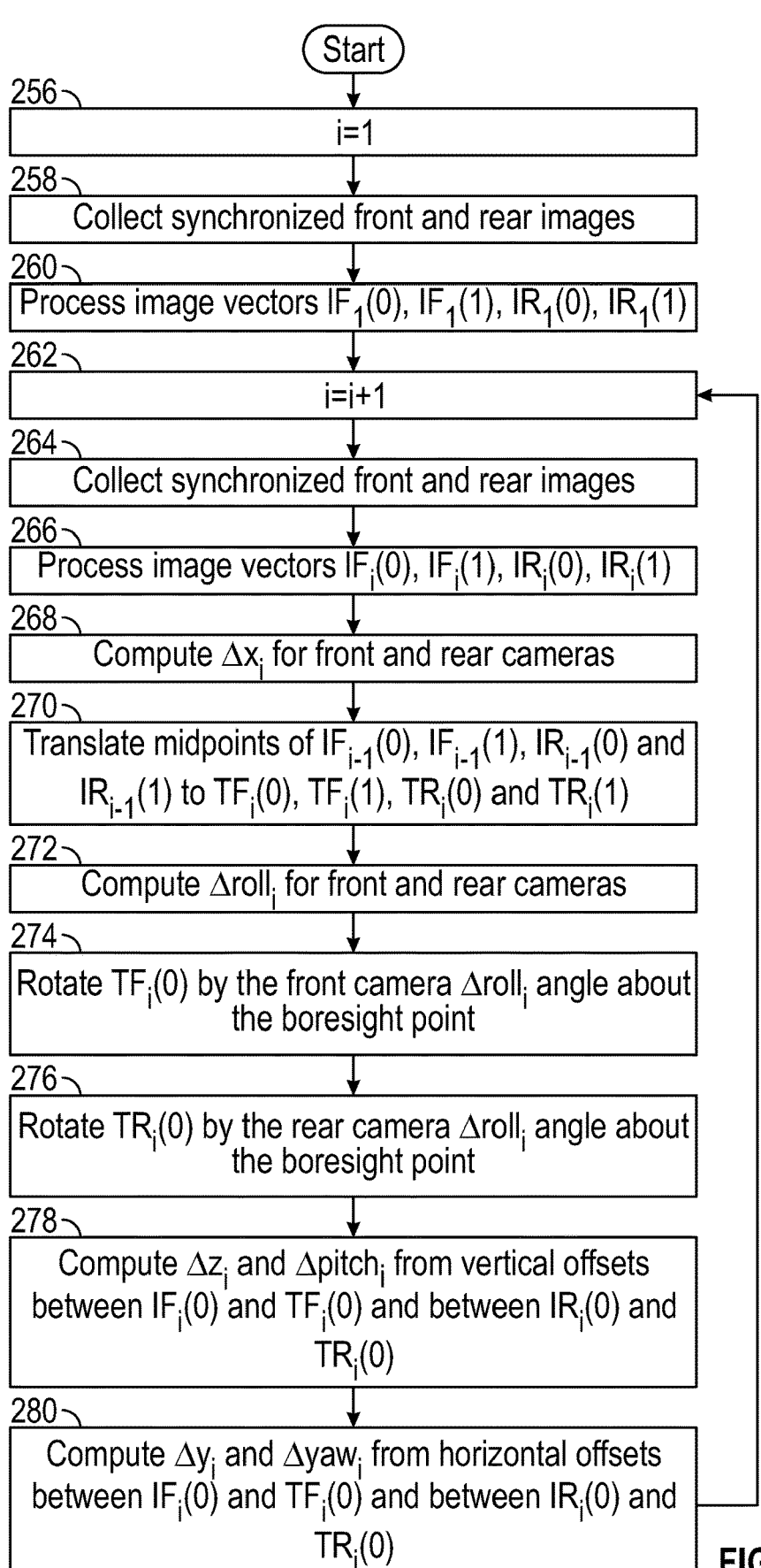
FIG. 15 illustrates an embodiment of a procedure to determine six degree-of-freedom information from only two imaging sensors.

FIG. 15 illustrates a flowchart for a procedure for determining photodetector-only 6 DOF information with a dual-sensor system with a forward-facing imaging sensor and a rear-facing imaging sensor. Front and rear imaging sensors may be either passive or active systems and are synchronized such that images collected for common 6 DOF parameters are operably collected at the same time or with a very short offset between one sensor and another. Imaging sensors collect multiple images in sequences and determine changes in 6 DOF parameters between successive images. Multiple images in sequences are tracked by an image counter. After the start of a 6 DOF procedure, an image counter is initialized at 256 and the first images are collected at 258. At 260 front and rear collected images number 1 are processed to determine the attributes for four image vectors $IF_1(0)$, $IF_1(1)$, $IR_1(0)$ and $IR_1(1)$, where F denotes front sensor image, R denotes rear sensor image, the image vector subscript denotes the image number and the number in parenthesis denotes the vector number identified in the image. Upon identification of image vectors for image 1, the 6 DOF system increments the image counter at 262, collects the next images from the imaging sensors at 264, and determines image vectors at 266 that are associated with image vectors identified for the previous images. Upon identifying matched image vectors for images i and i−1, Eqs. 6 through 11 are used to separately compute $\Delta x_i$ for each imaging sensor at 268, where $\Delta x_i$ represents imaging sensor movement along a boresight axis between capture point i−1 and capture point i. At 270 x-dimension-translated midpoints $TF_i(0)$, $TF_i(1)$, $TR_i(0)$ and $TR_i(1)$ are created from midpoints of image vectors $IF_{i-1}(0)$, $IF_{i-1}(1)$, $IR_{i-1}(0)$ and $IR_{i-1}(1)$ by using Eq. 12. At 272 $\Delta roll_i$ is computed for front and rear imaging sensors by using Eq. 13. At 274 $TF_i(0)$ is rotated in front sensor image space about the front sensor boresight point by an angle equal to $\Delta roll_i$ for the front imaging sensor. At 276 $TR_i(0)$ is rotated in rear sensor image space about the rear sensor boresight point by an angle equal to $\Delta roll_i$ for the rear imaging sensor. At 278 the vertical offsets between image vectors and translated image vectors are used to determine $\Delta z_i$ and $\Delta pitch_i$ for the front imaging sensor by using Eq. 18 and Eq. 19. At 280 the horizontal offsets between image vectors and x-translated image vectors are used to determine $\Delta y_i$ and $\Delta yaw_i$ for the front imaging sensor by using Eq. 20 and Eq. 21. Upon completion of the 6 DOF computations, the procedure increments the image counter at 262 and resumes the process for the new image number.

Dual-sensor, photodetector-only 6 DOF determination processes may utilize operably synchronized image capture. Non-synchronized image capture may be utilized with imaging sensor trajectory interpolation as a method to establish front or rear sensor parameters. Interpolated imaging sensor trajectories utilize time stamps for front and rear image capture. Photodetector-only 6 DOF determination information in a time-stamped, non-synchronized system may utilize the procedure illustrated in FIG. 15 with one or both of the image vector sets produced using interpolated sensor trajectories.

In embodiments, a lever arm constant for a front and a rear imaging sensor is defined as the ratio of the length of the lever arm for a front imaging sensor to the length of the lever arm for a rear imaging sensor. In embodiments, pitch and yaw lever arms are defined as:

$$C_{LeverArmPitch} = L_{FrontSensorLeverArmPitch} / L_{RearSensorLeverArmPitch} \qquad \text{Eq. 22}$$

$$C_{LeverArmYaw} = L_{FrontSensorLeverArmYaw} / L_{RearSensorLeverArmYaw} \qquad \text{Eq. 23}$$

Because pitch defines rotation about the y-axis of a vehicle, pitch lever arms are determined by the x-axis and z-axis offsets between imaging sensors and a vehicle center of mass (COM). In embodiments, pitch lever arm lengths are defined as:

$$L_{FrontSensorLeverArmPitch} = \sqrt{([x_{FrontSensor} - x_{COM}]^2 + [z_{FrontSensor} - z_{COM}]^2)} \qquad \text{Eq. 24}$$

$$L_{RearSensorLeverArmPitch} = \sqrt{([x_{RearSensor} - x_{COM}]^2 + [z_{RearSensor} - z_{COM}]^2)} \qquad \text{Eq. 25}$$

Because yaw defines rotation about the z-axis of a vehicle, yaw lever arms are determined by the x-axis and y-axis offsets between imaging sensors and a vehicle COM.

In embodiments, yaw lever arm lengths are defined as:

$$L_{FrontSensorLeverArmYaw} = \sqrt{([x_{FrontSensor} - x_{COM}]^2 + [y_{FrontSensor} - y_{COM}]^2)} \qquad \text{Eq. 26}$$

$$L_{RearSensorLeverArmYaw} = \sqrt{([x_{RearSensor} - x_{COM}]^2 + [y_{RearSensor} - y_{COM}]^2)} \qquad \text{Eq. 27}$$

In embodiments a pitch lever arm constant and a yaw lever arm constant can be computed from measurements between an imaging sensor and the vehicle COM. The COM of an empty vehicle will be different than that of a partially-loaded or fully-loaded vehicle. Due to an inconsistent COM for a vehicle, determining lever arm constants for a front/rear imaging sensor pair through the use of a calibration procedure or an on-the-fly procedure typically yield more accurate results than COM determination via lever arm measurements.

Figure 16:
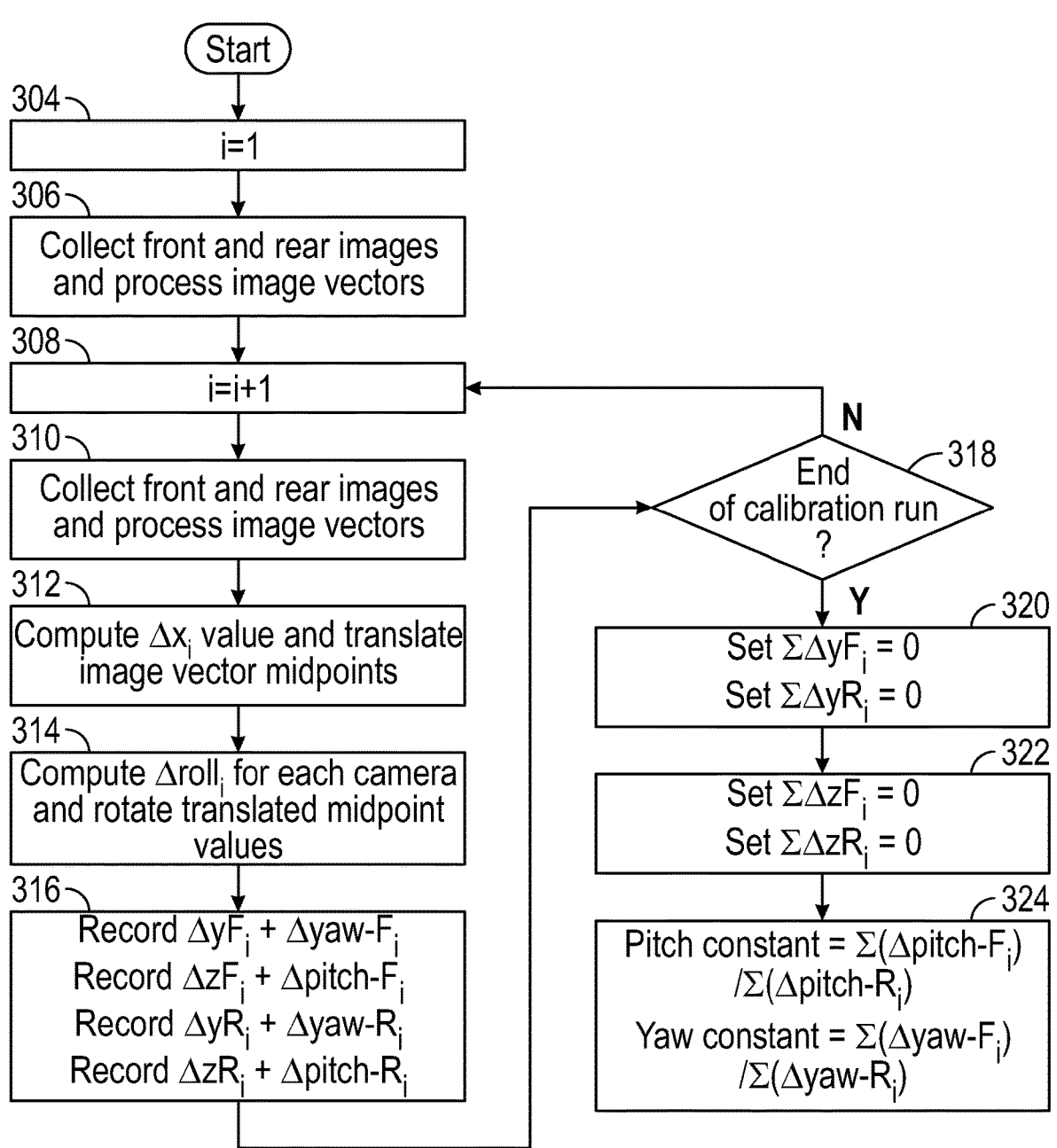
FIG. 16 illustrates an embodiment of a procedure for determining pitch lever arm and yaw lever arm constants for a pair of imaging sensors on board a vehicle.

FIG. 16 illustrates a flowchart for a procedure to determine pitch and yaw lever arm constants for an imaging sensor pair on board a vehicle. The procedure is performed using image data collected on a roadway or other surface that is operably straight. Front and rear imaging sensors are synchronized such that images collected for common 6 DOF parameters are operably collected at the same time or with a very short offset between one imaging sensor and another. Imaging sensors collect multiple images in sequences and determine changes in 6 DOF parameters between successive images. Multiple images in sequences are tracked by an image counter. After the start of a pitch and yaw constant calibration procedure, an image counter is initialized at 304. At 306 front and rear collected images number 1 are processed to determine the attributes for four image vectors. Upon identification of image vectors for image 1, the 6 DOF system increments the image counter at 308, collects the next images from the imaging sensors at 310, and determines image vectors that are associated with image vectors identified for the previous images. Upon identifying matched image vectors for images i and i–1, Eqs. 6 through 11 are used to separately compute $\Delta x_i$ for each imaging sensor at 312, where $\Delta x_i$ represents imaging sensor movement along a boresight axis between capture point i–1 and capture point i. At 314 x-dimension-translated midpoints are created from midpoints of image vectors by using Eq. 12, $\Delta roll_i$ is computed for front and rear imaging sensors by using Eq. 13 and translated midpoint values are rotated about their respective boresight points. At 316 the values for $\Delta yF_i+\Delta yaw–F_i$, $\Delta zF_i+\Delta pitch–F_i$, $\Delta yR_i+\Delta yaw–R_i$, and $\Delta zR_i+\Delta pitch–R_i$ are recorded for the present image number. At 318, the system performs a test to determine if sufficient information exists for the calibration run. If the run is not complete, the image counter is incremented at 308, and 310, 312, 314, and 316 are performed for the new image number. When sufficient information is collected for a calibration run, 6 DOF information is reduced based on the parameters of the route used for the calibration run. Because the calibration route is operably straight, 320 sets y-axis parameter summations to zero. Because the vehicle remains at a constant height above the road during calibration, 322 sets z-axis parameter summations to zero. At 324, pitch and yaw constants are defined as:

$$C_{LeverArmPitch}=\Sigma(\Delta pitch–F_i)/\Sigma(\Delta pitch–R_i) \qquad \text{Eq. 28}$$

$$C_{LeverArmYaw}=\Sigma(\Delta yaw–F_i)/\Sigma(\Delta yaw–R_i) \qquad \text{Eq. 29}$$

Figure 17:
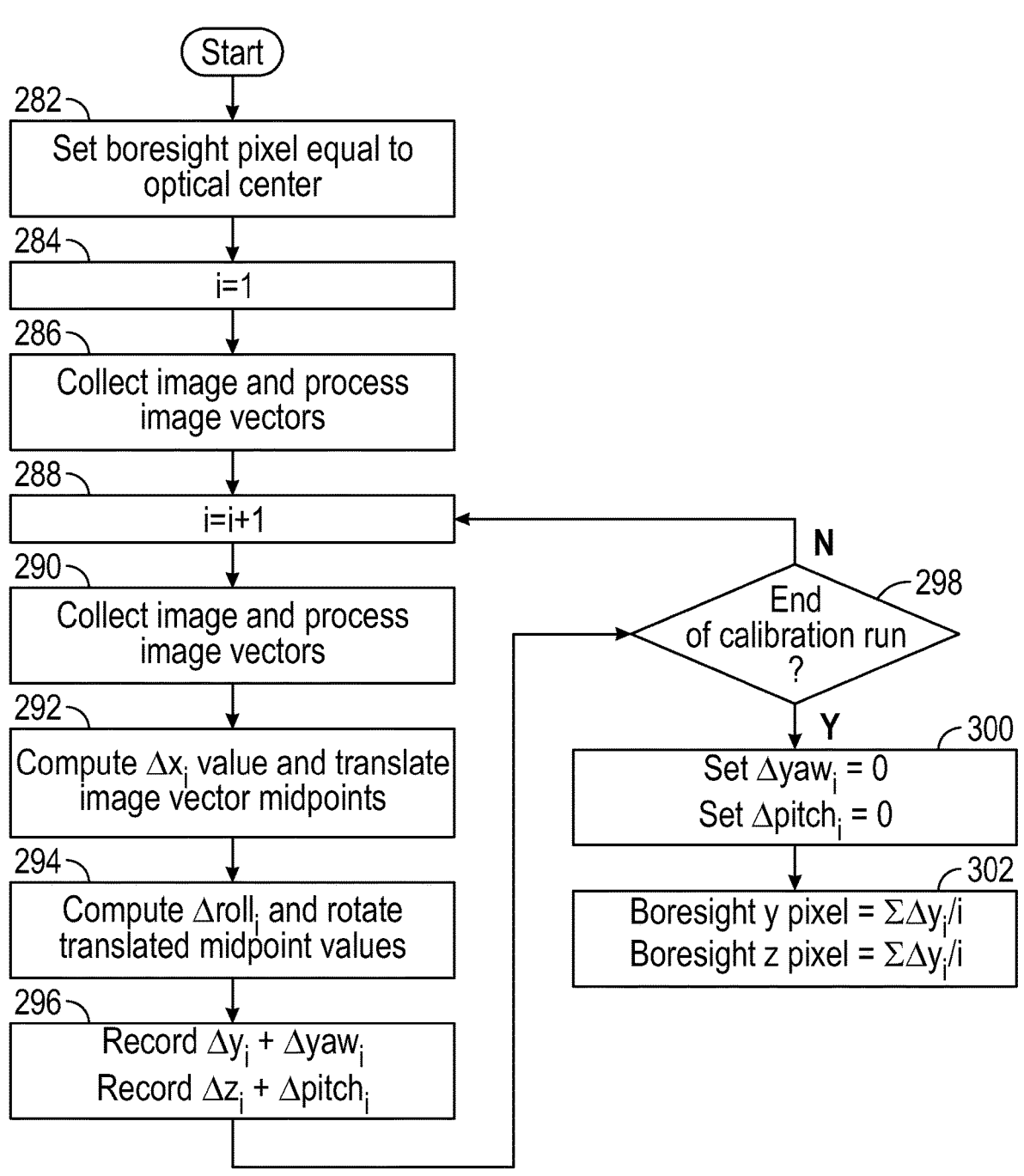
FIG. 17 illustrates an embodiment of a procedure for determining boresight information for an imaging sensor on board a vehicle.

In photodetector-only 6 DOF calculations, translated image vector midpoints are rotated about a boresight pixel for an imaging sensor. FIG. 17 illustrates a flowchart for a procedure to determine a boresight pixel location for an imaging sensor on board a vehicle. The procedure is performed using image data collected on a roadway or other surface that is operably straight. An imaging sensor collects multiple images in a sequence and determines changes in 6 DOF parameters between successive images. Multiple images in a sequence are tracked by an image counter. After the start of a boresight calibration procedure, a boresight pixel is initialized to equal the optical center of an imaging sensor at 282. After the start of a boresight calibration procedure, an image counter is initialized at 284. At 286 a first image, referred to as image number 1 herein, is processed to determine the attributes for two image vectors. Upon identification of image vectors for image 1, the boresight calibration procedure increments the image counter at 288, collects the next image from the imaging sensor at 290, and determines image vectors that are associated with image vectors identified for the previous image. Upon identifying matched image vectors for images i and i–1, Eqs. 4 through 9 are used to compute $\Delta x_i$ at 292, where $\Delta x_i$ represents imaging sensor movement along a boresight axis between capture point i–1 and capture point i. At 292, x-dimension-translated midpoints are created from midpoints of image vectors by using Eq. 12. At 294, $\Delta roll_i$ is computed for an imaging sensor by using Eq. 13 and translated midpoint values are rotated about the boresight point. At 296, the values for $\Delta y_i+\Delta yaw_i$ and $\Delta z_i+\Delta pitch_i$ are recorded for the present image number. At 298, the system performs a test to determine if sufficient information exists for a boresight calibration run. If a run is not complete, the image counter is incremented at 288 and then 290, 292, 294, and 296 are performed for the new image number. When sufficient information is collected for a calibration run, 6 DOF information is reduced based on the parameters of the route used for the calibration run. Because the calibration route is operably straight, at 300 yaw and pitch parameter are set with summations of zero. The remaining summed parameters from $\Delta y_i+\Delta yaw_i$ and $\Delta z_i+\Delta pitch_i$ with yaw and pitch set to zero become the boresight pixel values. Step 302 establishes a calibrated boresight pixel, and are defined as:

$$y_{boresight}=\Sigma\Delta y_i/i \qquad \text{Eq. 30}$$

$$z_{boresight}=\Sigma\Delta z_i/i \qquad \text{Eq. 31}$$

Figure 18:
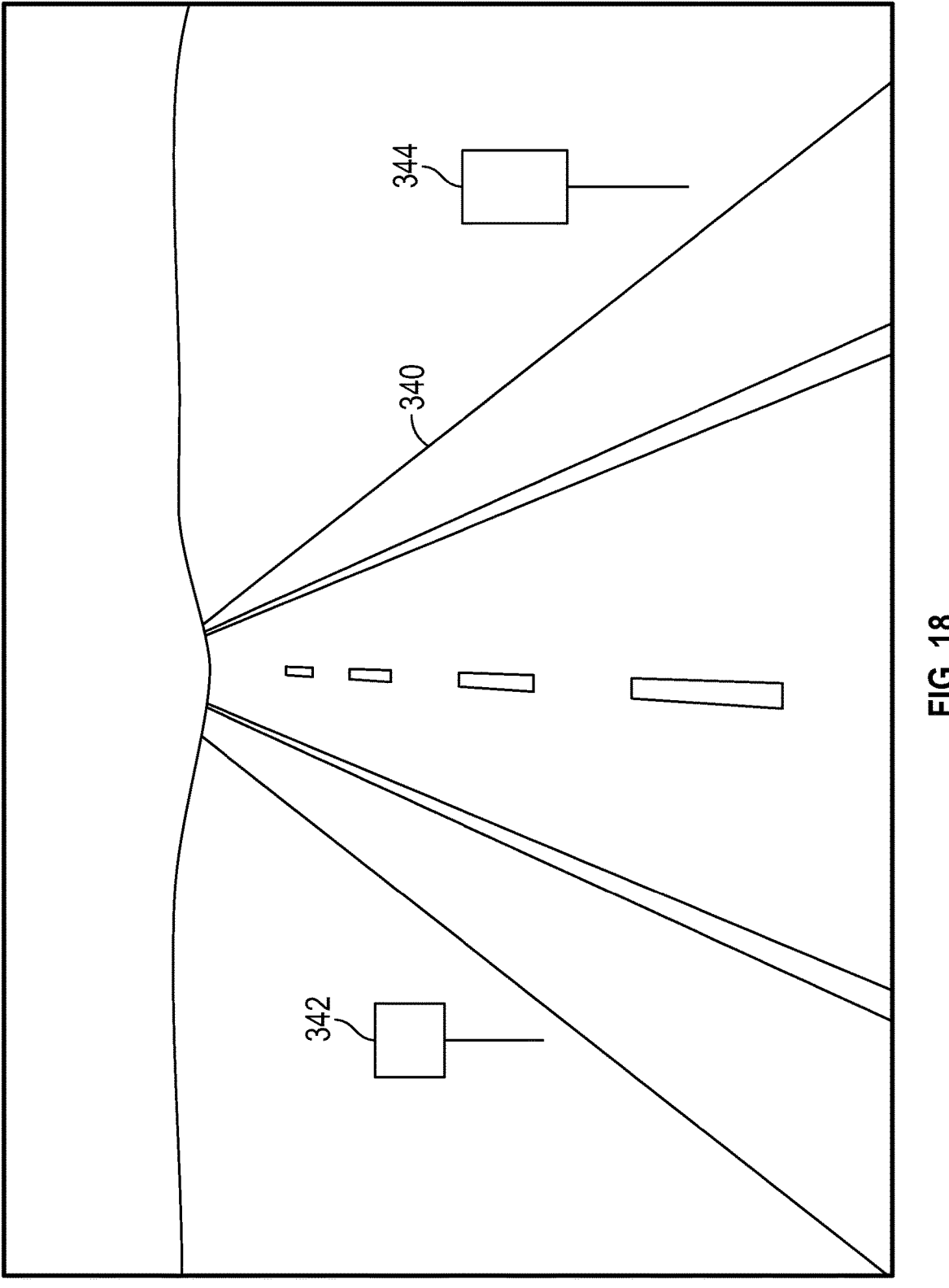
FIG. 18 illustrates an embodiment of a sensor view of a roadway scene.

FIG. 18 illustrates a view of a roadway 340 from a forward-facing imaging sensor on board a vehicle. Linear and polygonal elements are displayed on the roadway 340 surface with a first roughly-vertical element in the form of a left-side sign 342 and a second roughly-vertical element in the form of a right-side sign 344. The roadway 340 view represents an image within an image sequence whereby a view shown in FIG. 18 is designated as image number j, while subsequent frames are shown and described in other figures and described in more detail below.

Figure 19:
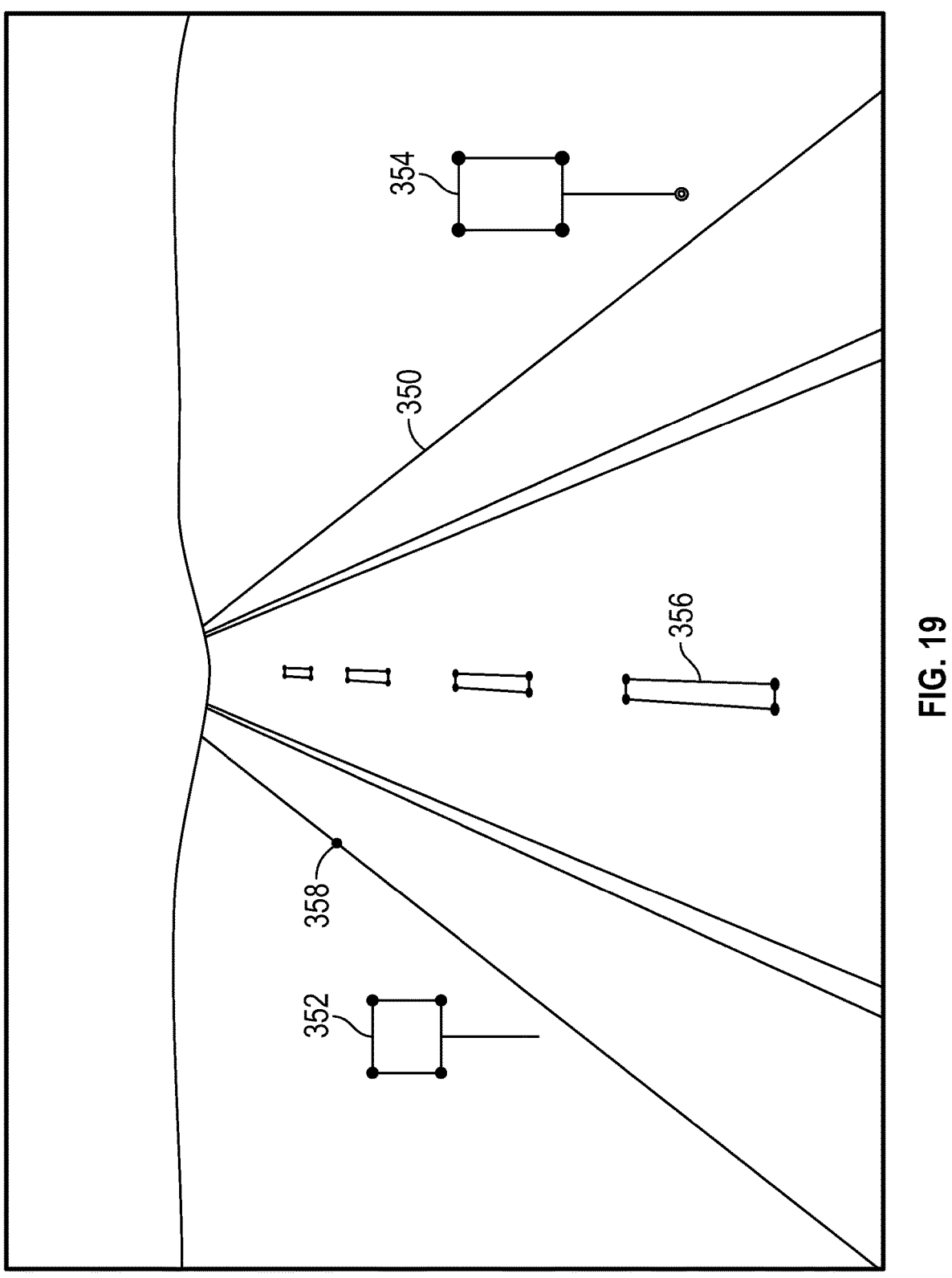
FIG. 19 illustrates an embodiment of a corner feature identification in an image collected of a roadway scene.

In typical image processing and structure from motion systems, image features are identified by techniques such as SIFT (scale-invariant feature transform), SURF (speeded-up robust features) or other corner-feature detectors. To find correspondence between images, features such as corner points (edges with gradients in multiple directions) are tracked from one image to the next. FIG. 19 illustrates an image j view with image points identified by a corner-feature detector. Corner points from the left-side sign 352, right-side sign 354 and nearest complete pavement marking 356 are illustrated. One errant point 358 on the roadway is illustrated.

Figure 20:
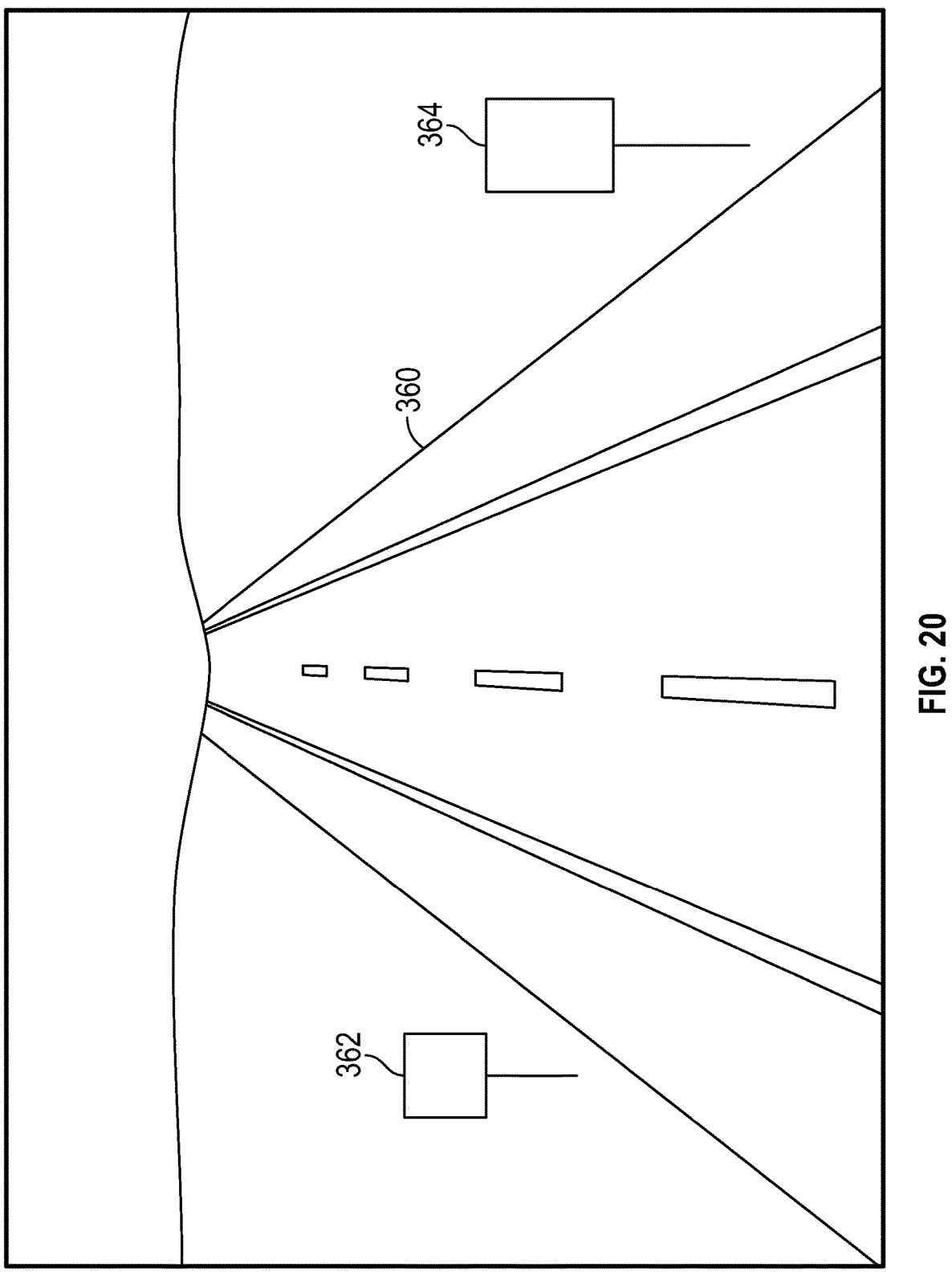
FIG. 20 illustrates an embodiment of a sensor view at a subsequent location along a travel path of a roadway scene.

FIG. 20 illustrates a view of a roadway 360 as represented in image number j+1. The roadway 360 view is achieved by forward movement of a vehicle with an imaging sensor, whereby the forward movement is presently unknown and assumed to be non-zero. In embodiments, there is a test for non-zero movement and to quantify the amount of movement of the vehicle. A left-side sign 362 and right-side sign 364 are shown along with polygonal and linear road feature elements.

Figure 21:
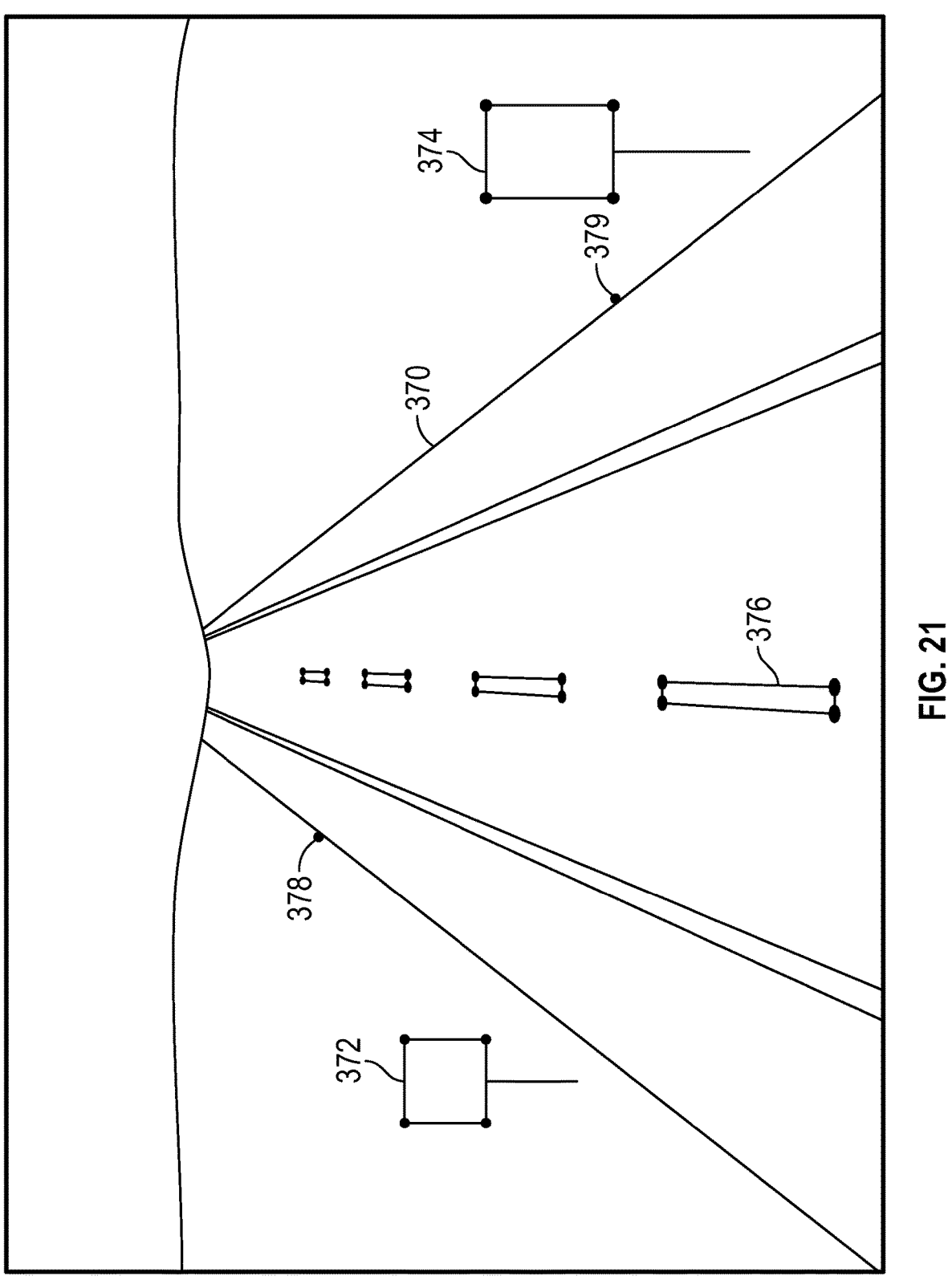
FIG. 21 illustrates an embodiment of a corner feature identification in an image collected at a sensor view at a subsequent location along a travel path of a roadway scene.

FIG. 21 illustrates image view j+1 with image points identified by a corner-feature detector. Corner points from the left-side sign 372, right-side sign 374 and nearest complete pavement marking 376 are illustrated. Two errant points 378, 379 on the roadway 370 are illustrated.

Figure 22:
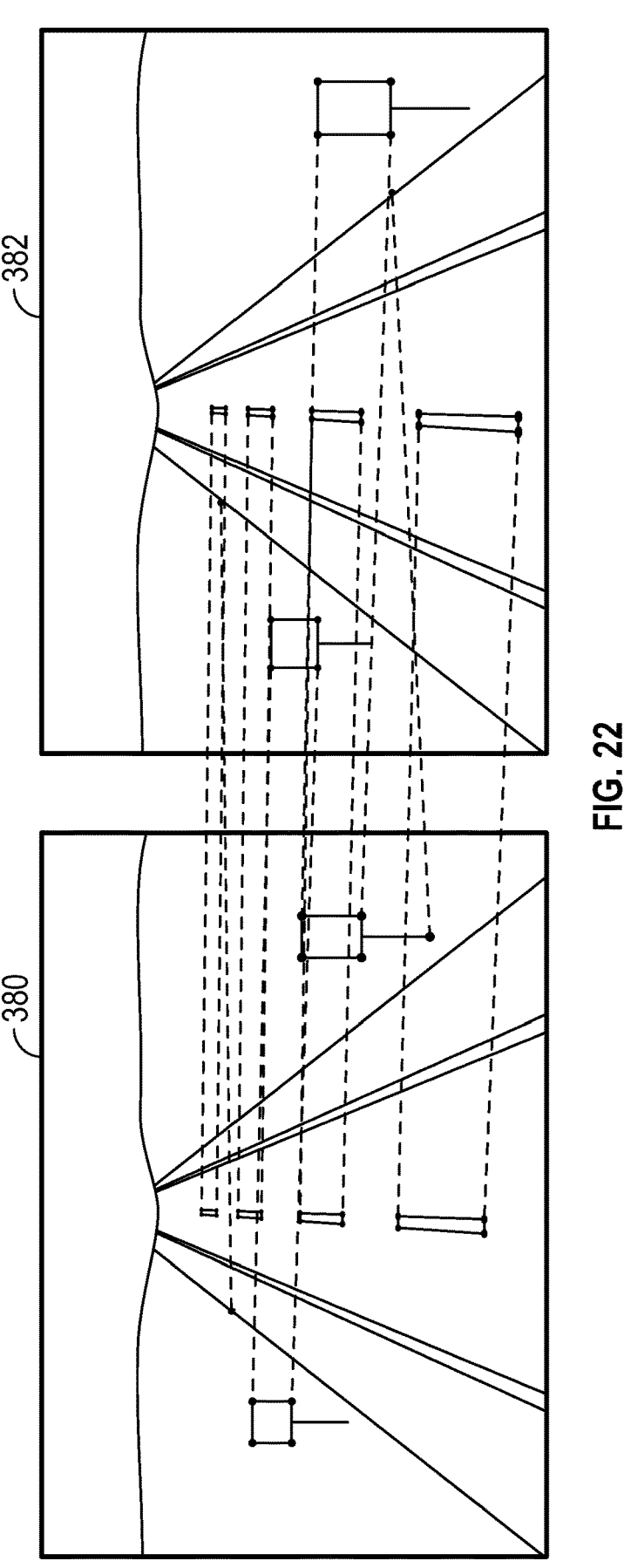
FIG. 22 illustrates an embodiment showing common point identification between two images of a scene.

In addition to identifying corner points in pairs of images, corner-identification algorithms associate common points in image pairs. FIG. 22 illustrates images j 380 and j+1 382 with dashed line segments shown between matched points from a corner-identification algorithm. Image j 380 points and image j+1 382 points are stored in a temporary association table or other data structure that identifies point locations in each image 380, 382 and identifies associations.

Figure 23:
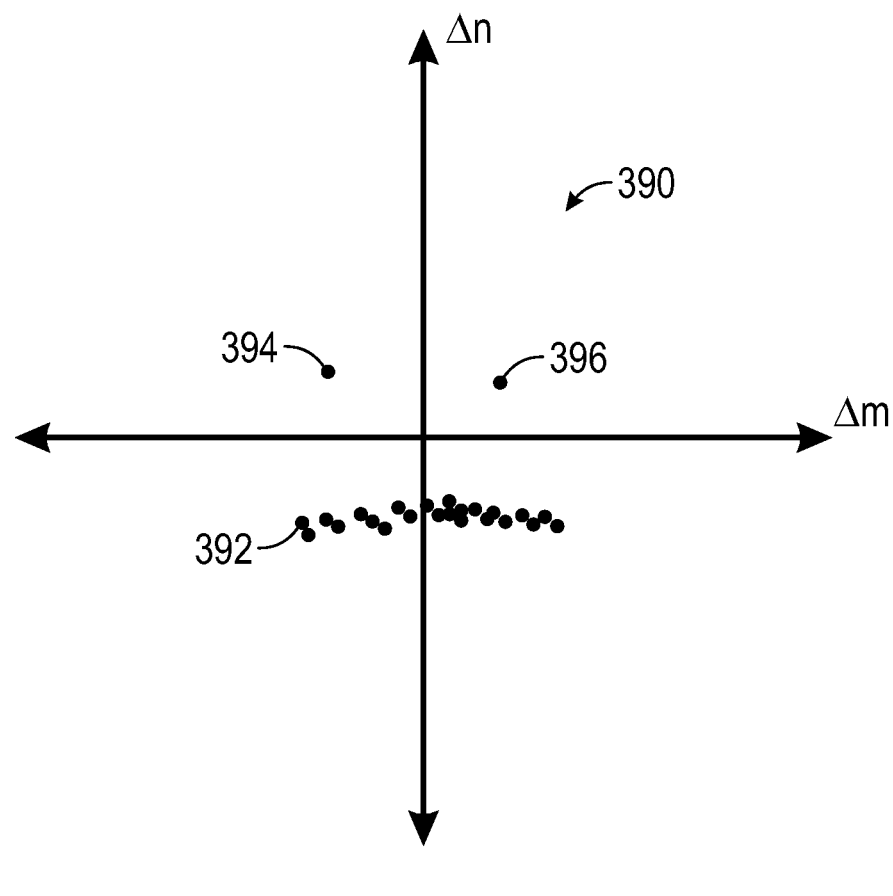
FIG. 23 illustrates an embodiment of filtering of non-matching points between two images of a scene.

Most matched-pair corner-identification algorithms require some sort of point filtering to eliminate errant points, improperly matched points, and single points with no matched-image point. Some common methods for point filtering include, but are not limited to, Lukas-Kanade and RANSAC (random sample consensus). In embodiments, FIG. 23 graphically illustrates a method for point filtering for in-motion vehicle imaging sensor applications. Two-dimensional plot 390 axes are $\Delta m$ and $\Delta n$. Points in the plot 390 are determined by the horizontal ($\Delta m$) and vertical ($\Delta n$) offsets between matched points. Offset plot point determination is illustrated in the following table:

| Image j pts | Image j + 1 pts | $\Delta m$ | $\Delta n$ |
|---|---|---|---|
| [$m_j$(k), $n_j$(k)] | [$m_{j+1}$(k), $n_{j+1}$(k)] | $m_j$(k) − $m_{j+1}$(k) | $n_j$(k) − $n_{j+1}$(k) |
| [$m_j$(k), $n_j$(k)] | [$m_{j+1}$(k), $n_{j+1}$(k)] | $m_j$(k + 1) − $m_{j+1}$(k + 1) | $n_j$(k + 1) − $n_{j+1}$(k + 1) |
| [$m_j$(k), $n_j$(k)] | [$m_{j+1}$(k), $n_{j+1}$(k)] | $m_j$(k + 2) − $m_{j+1}$(k + 2) | $n_j$(k + 2) − $n_{j+1}$(k + 2) |

Point 392 is associated with a clustering of points that are typical for in-motion vehicle applications. The negative $\Delta m$ values indicate points for non-moving objects in a scene that are imaged from a moving vehicle. Point 394 represents a point that is filtered out for the final solution because it is a single point with a $\Delta m$ and/or $\Delta n$ that is sufficiently larger than other points in the plot 390. Point 396 represents a point that is filtered out for the final solution because it is not near any other points in the plot 390.

In passive imaging sensor systems, image segmentation and tessellation are typically performed using matched-pair vertices based on image intensity values. Scene glare, shadowing and poor weather conditions can cause problems with consistent tessellation between successive images and can cause problems with consistent tessellation between runs on a roadway at different points in time and with different vehicles. In embodiments, in order to achieve consistent tessellation with multiple vehicles in a multitude of imaging conditions, corner determination, point filtering, and tessellation are performed utilizing a standardized, lighting-invariant parameter like reflectivity.

Figure 24:
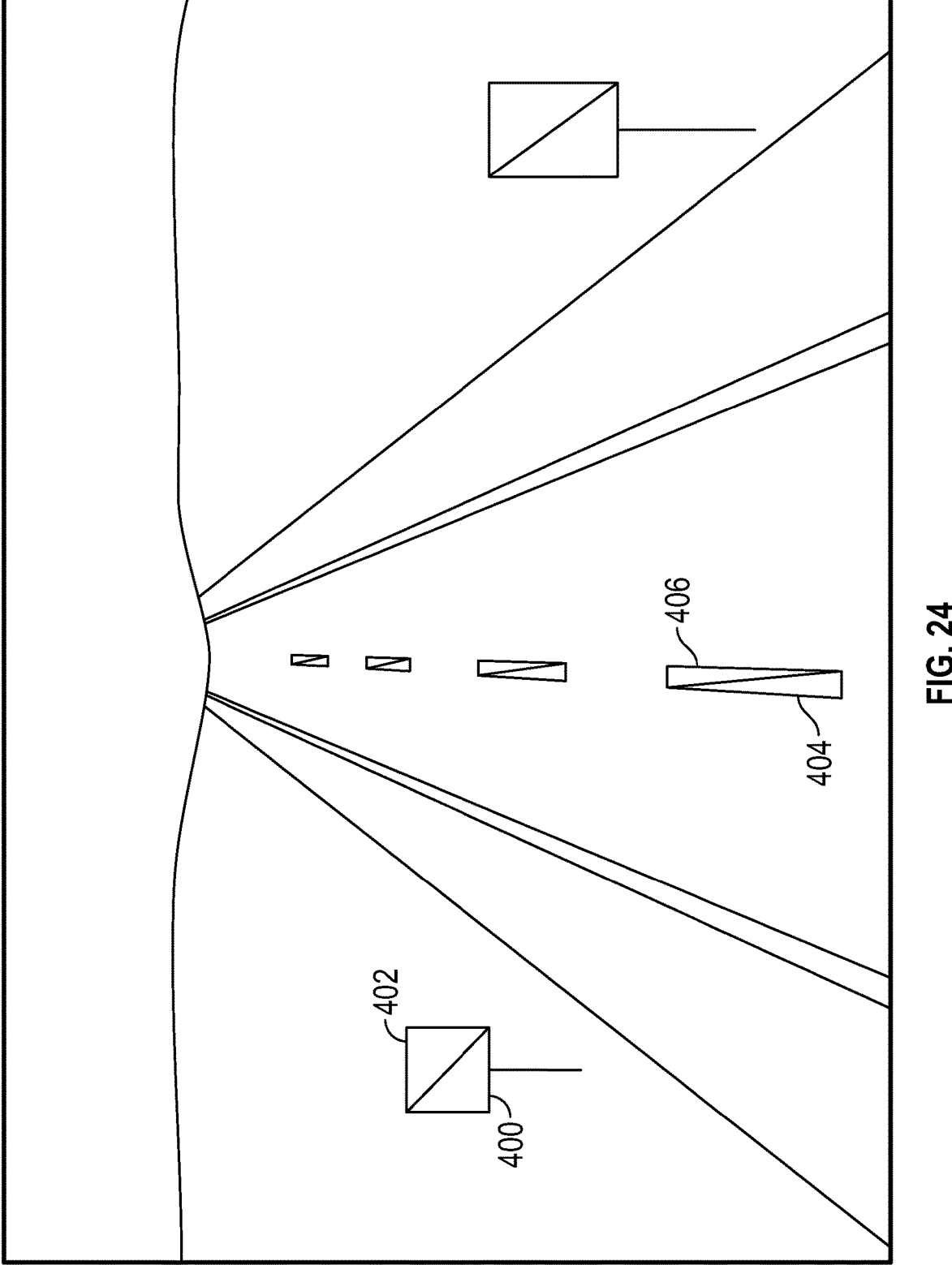
FIG. 24 illustrates an embodiment of image vector locations corresponding to corner feature objects.

FIG. 24 illustrates tessellated image vectors identified in image j+1. Image vectors utilize triangle-shaped polygons with vertices based on filtered matched-corner point pairs, wherein the corner location, point matching and tessellation are performed using reflectivity images. The utilization of filtered matched points enables image vector linking between successive images. Four match-pair points for a left-side sign are utilized to produce two image vectors 400, 402. Four additional matched-pair points for a near pavement marking are utilized to produce two image vectors 404, 406.

Figure 25:
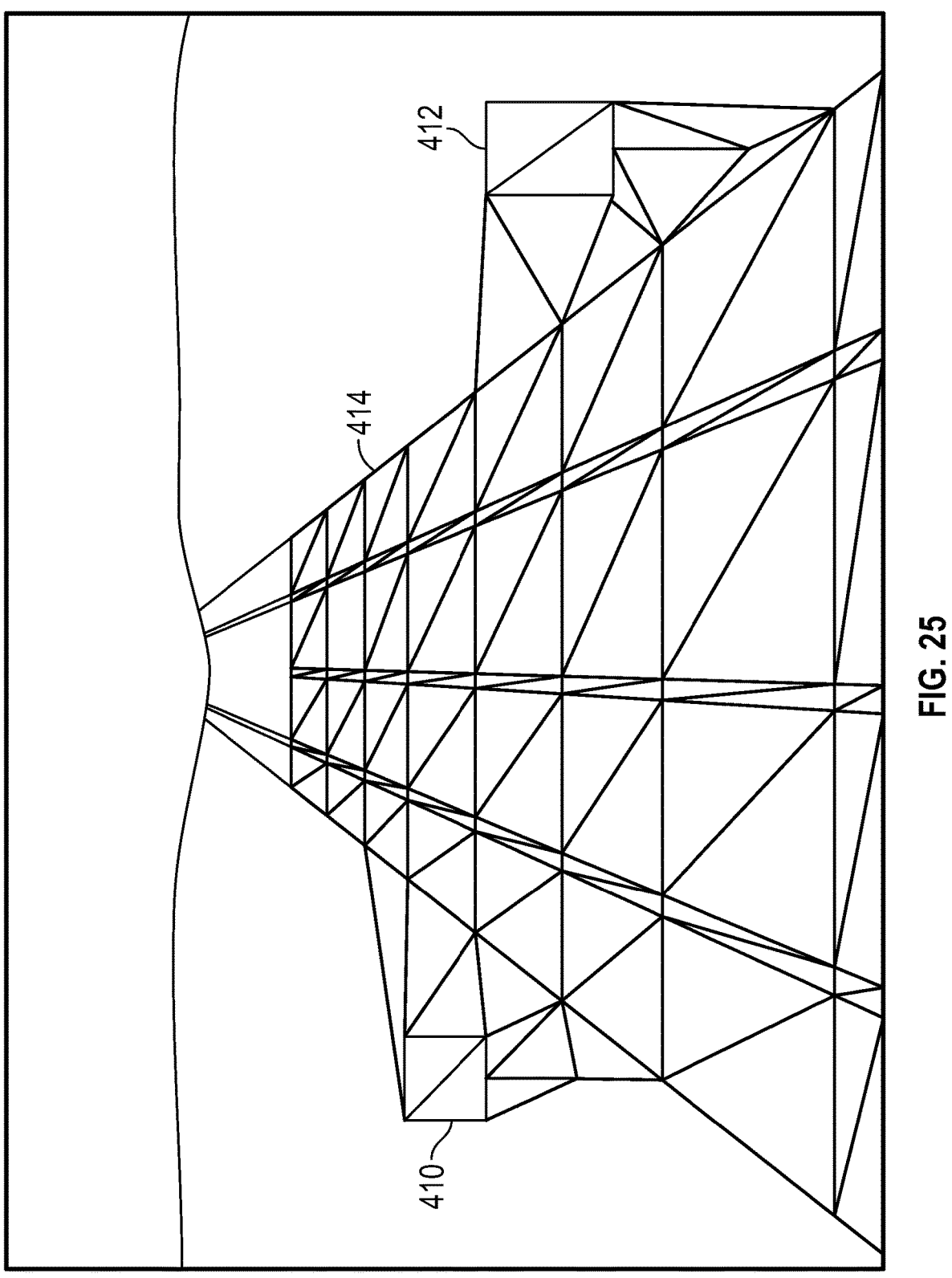
FIG. 25 illustrates an embodiment of image vector locations corresponding to corner feature objects and road surface objects.

Reflectivity-layer tessellation utilizing corner-detection techniques leaves significant gaps in image vector identification for roadway scenes. In embodiments, two-level tessellation is utilized to fill in image vector gaps on and near the roadway surface. FIG. 25 illustrates two-level tessellation for a roadway from FIG. 24. Additional image vector vertices are produced from transverse segments that align with road-based image vectors. Vertices are selected along transverse segments at the points at which a gradient in reflectivity space exceeds a certain threshold. Aligning transverse segments with image vectors on the roadway surface enables complete coverage of the roadway surface with image vectors and enables precise vertex matching between image vectors for successive images in a sequence.

Upon completion of two-level tessellation, image vector data structures are populated with single-image information and multi-image information. In embodiments, an image vector data structure for image j is of the form:

$$
\begin{array}{lll}
I(j, k) = \text{Vertex Count} & 3 & \text{Eq. 32} \\
\quad\text{Vertices} & Vertex0(m, n) & \\
& Vertex0(\varphi, \theta) & \\
& Vertex1(m, n) & \\
& Vertex1(\varphi, \theta) & \\
& Vertex2(m, n) & \\
& Vertex2(\varphi, \theta) & \\
\quad\text{Midpoint} & \text{Midpoint } (m, n) & \\
& \text{Midpoint } (\varphi, \theta) & \\
\quad\text{Previous Image Vector} & I(j - 1, e) & \\
\quad\text{Next Image Vector Link} & I(j + 1, f) &
\end{array}
$$

Image vector format uses N vertices for spatial representations, whereby N can be as small as three. In embodiments, image vectors are described as triangle features to enhance the object vector processing system throughput and to provide maximum flexibility for hierarchical vector approaches enabled herein. Triangle features are specified by setting each Vertex Count equal to three. Vertices utilize (m,n) nomenclature, signifying that they are expressed in image pixel coordinates. Integer or floating point values are allowable for Vertices. Image vector Midpoint is specified in both pixel (m,n) coordinates and spherical ($\varphi,\theta$) coordinates. Because pixel to spherical coordinate translation is typically performed with the use of a LUT, inserting both coordinate types in image vectors allows downstream processing to perform vector analysis without requiring access to a LUT and without the additional overhead of translating coordinate spaces. In embodiments, image vector linking enables the determination of attributes used for scene vectors, where image vector linking describes the association of image vectors in successive images whereby the linked vectors describe the same object or portion of an object. The Previous Image Vector Link field of an image vector is assigned a NULL value for the first image vector in a sequence of equivalent image vectors. The Next Image Vector Link field of an image vector is assigned a NULL value for the last image vector in a sequence of equivalent image vectors.

Scene vectors are formed from image vectors 2 through N of an N-image sequence of linked image vectors. Scene vector attributes are determined by information obtained from successive image vectors in a linked image vector chain. In embodiments, scene vector data structures for image j are of the form:

$$
\begin{aligned}
S(j,k) = \text{ Image Vector} \quad &I(j,k) \quad &\text{Eq. 33}\\
\text{Normal Angle} \quad &(\varphi, \theta)\\
\text{Distance} \quad &d\\
\text{Reflectivity} \quad &R\\
\text{Sensor Velocity} \quad &v\\
\text{Area} \quad &a\\
\text{Previous Scene Vector} \quad &S(j-1, e)\\
\text{Next Scene Vector Link} \quad &S(j+1, f)
\end{aligned}
$$

In embodiments, there exists a one-to-one relationship between image vector vertices and scene vector vertices. In embodiments, all scene vectors have an associated image vector, and no two scene vectors share an image vector. In contrast, not all image vectors are associated with scene vectors. Multi-image scene vector attributes are not produced for a first image vector in a linked sequence of image vectors. In embodiments, an essential scene vector attribute is an image vector identifier like I(j,k). A Normal Angle attribute is determined by utilizing Eqs. 4-7 and solving for $N_s$, the normal angle for a surface vector. Distance is determined by utilizing Eq. 9. Reflectivity is determined according to:

$$\text{Reflectivity} = \text{Radiance}(d)/\text{FluxDensity}(d) \qquad \text{Eq. 34}$$

Where, radiance(d) is the intensity-converted radiance at distance d

FluxDensity(d) is the incident flux density at a surface at distance d

Radiance is computed in accordance with Eq. 2 or Eq. 3. Flux density is computed by utilizing Eq. 4 to determine the flux per pixel at distance d, by utilizing a flux LUT to determine a flux per pixel at distance d, or by utilizing a flux density LUT at a distance d that is an interpolated value from multiple flux density LUT distance quanta. In typical systems, vehicle velocity is recorded from an on board system input or a system control module (not shown). Alternatively, in embodiments, imaging sensor velocity is determined by:

$$\text{Sensor Velocity} = \Delta x/(t_j - t_{j-1}) \qquad \text{Eq. 35}$$

Where $\Delta x$ is from Eq. 11

$t_j$ represents a timestamp for image j $t_{j-1}$ represents a timestamp for image j−1

Scene vector area refers to the area of the polygon in scene space and is computed by utilizing Eq. 7. In embodiments, Previous Scene Vector Link field of a scene vector is assigned a NULL value for the first scene vector in a sequence of equivalent scene vectors. The Next Scene Vector Link field of a scene vector is assigned a NULL value for the last scene vector in a sequence of equivalent scene vectors.

Scene vectors, while displaying spatial attributes relative to an imaging sensor location, typically do not wholly correspond to objects in a scene. In embodiments, a subsequent processing step involves combining scene vectors into groupings that represent objects with common features. Scene vector grouping may occur by combining a multitude of scene vectors with the same or similar attributes into higher-order representations of objects in a scene. As with image vectors and scene vectors, similar object vectors may be linked in vector chains to allow searching and tracking of objects in multi-image sequences.

Figure 26:
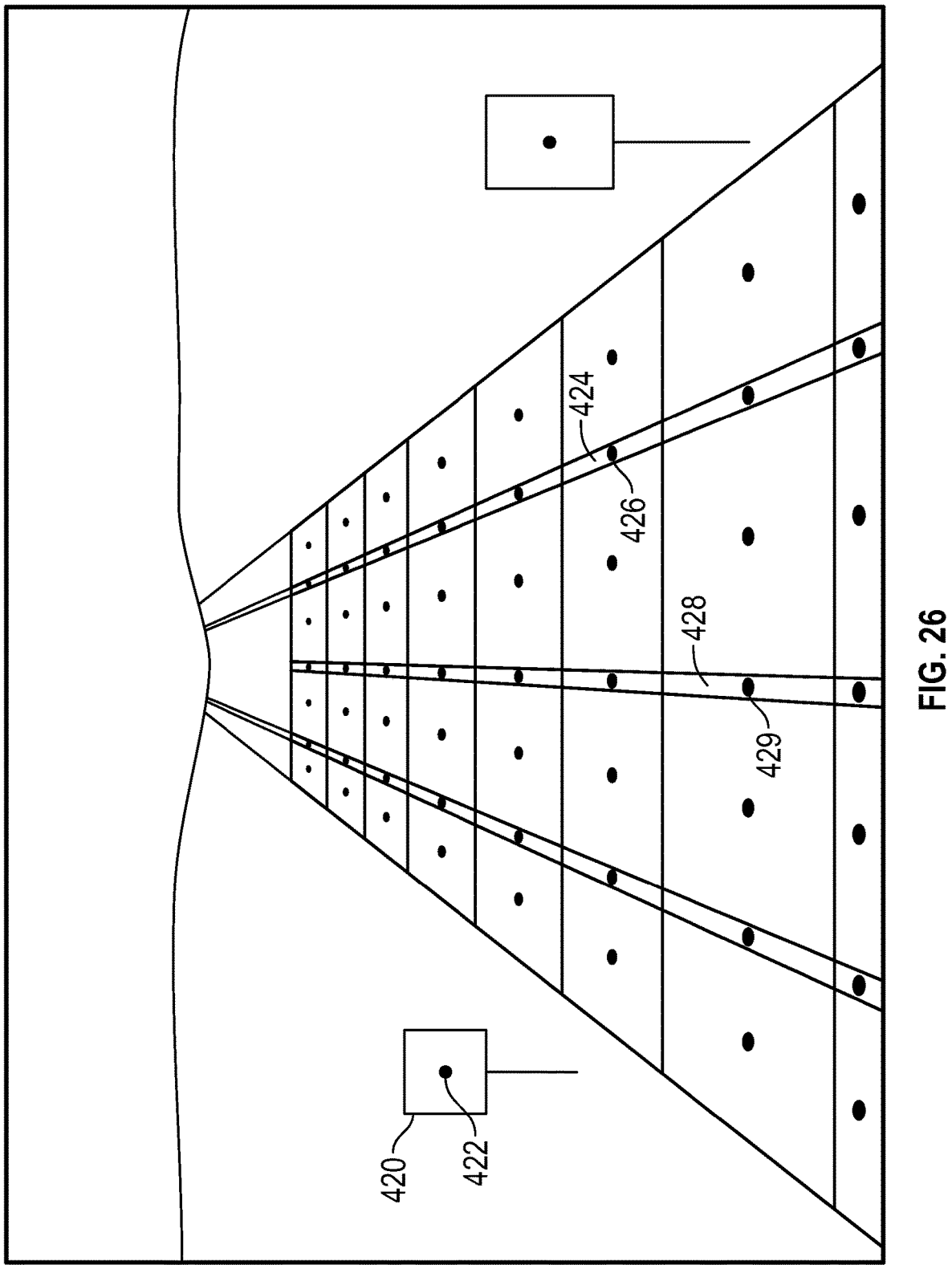
FIG. 26 illustrates an embodiment of a scene vector and object vector locations in a scene.

FIG. 26 illustrates locations of object vectors produced from scene vectors from FIG. 25. An object vector for a left-side sign 422 with a midpoint 422 is shown. An object vector for a dashed pavement marking 428 with a midpoint 429 is shown. An object vector for a pavement marking segment 424 with a midpoint 426 is shown. Other object vectors and associated midpoints are shown for road surface objects.

In embodiments, object vectors are formed from scene vectors 2 through N of an N-image sequence of linked scene vectors. Object vector attributes are determined by information obtained from successive images in a linked scene vector chain. In embodiments, object vector data structures for image j are of the form:

$$
\begin{aligned}
O(j,k) = \text{ Scene Vector} \quad &S(j, g) \quad &\text{Eq. 36}\\
\text{Scene Vector} \quad &S(j, h)\\
\text{Normal Angle} \quad &(\varphi, \theta)\\
\text{Distance} \quad &d\\
\text{Sensor Velocity} \quad &v\\
\text{Area} \quad &a\\
\text{Vertex Count} \quad &V\\
\text{Vertices} \quad &Vertex0(m, n)\\
\quad &Vertex0(\varphi, \theta)\\
\quad &Vertex1(m, n)\\
\quad &Vertex1(\varphi, \theta)\\
\quad &Vertex2(m, n)\\
\quad &Vertex2(\varphi, \theta)\\
\quad &\cdots\\
\quad &VertexV-1(m, n)\\
\quad &VertexV-1(\varphi, \theta)\\
\text{Midpoint} \quad &Midpoint\ (m, n)\\
\quad &Midpoint\ (\varphi, \theta)\\
\text{Previous Object Vector Link} \quad &O(j-1, e)\\
\text{Next Object Vector Link} \quad &O(j+1, f)
\end{aligned}
$$

In embodiments, there exists a one-to-many relationship between object vectors and scene vectors. In embodiments, essential object vector attributes are scene vector identifiers like S(j,g) and S(J,h). A Normal Angle attribute is determined from the normal angles of the scene vectors that are used to produce the object vector. Distance is determined from the distances of the scene vectors that are used to produce the object vector. Sensor Velocity is the same sensor velocity attribute utilized for all scene vectors associated with an image. Object Area is the combined area of all the scene vectors that comprise the object. In embodiments, Previous Object Vector Link field of an object vector is assigned a NULL value for the first object vector in a sequence of equivalent object vectors. The Next Object Vector Link field of an object vector is assigned a NULL value for the last object vector in a sequence of equivalent object vectors.

In embodiments, reflectivity is not an attribute that is elevated to object vectors. This allows for objects to consist of scene vectors of different reflectivity values. As an example, a traffic barrel will consist of scene vectors that, when combined into a single object vector, will display alternating layers of low and high reflectivity. This identifiable pattern allows for the relatively straightforward identification of items like road barrels in scenes when utilizing object vectors.

For any linked list of object vectors, relative object motion can be determined at any point in the linked chain and for any image. Instantaneous relative velocity for an object is determined by:

$$V_r(j,k)=[O(j,k)\cdot distance-O(j-1,k)\cdot distance]/[time(j)-time(j-1)] \qquad \text{Eq. 37}$$

where O(j,k)·distance is the object distance attribute for object vector j

O(j−1,k)·distance is the object distance attribute for object vector j−1 time(j) is the time at which image j was collected time(j−1) is the time at which image j−1 was collected Object velocity is computed according to:

$$V_o(j,k)=O(j,k)\cdot SensorVelocity-V_r(j,k) \qquad \text{Eq. 38}$$

where O(j,k)·SensorVelocity is the sensor velocity attribute of object vector O(j,k)

Vr(j,k) is the relative velocity in accordance with Eq. 37

Figure 27:
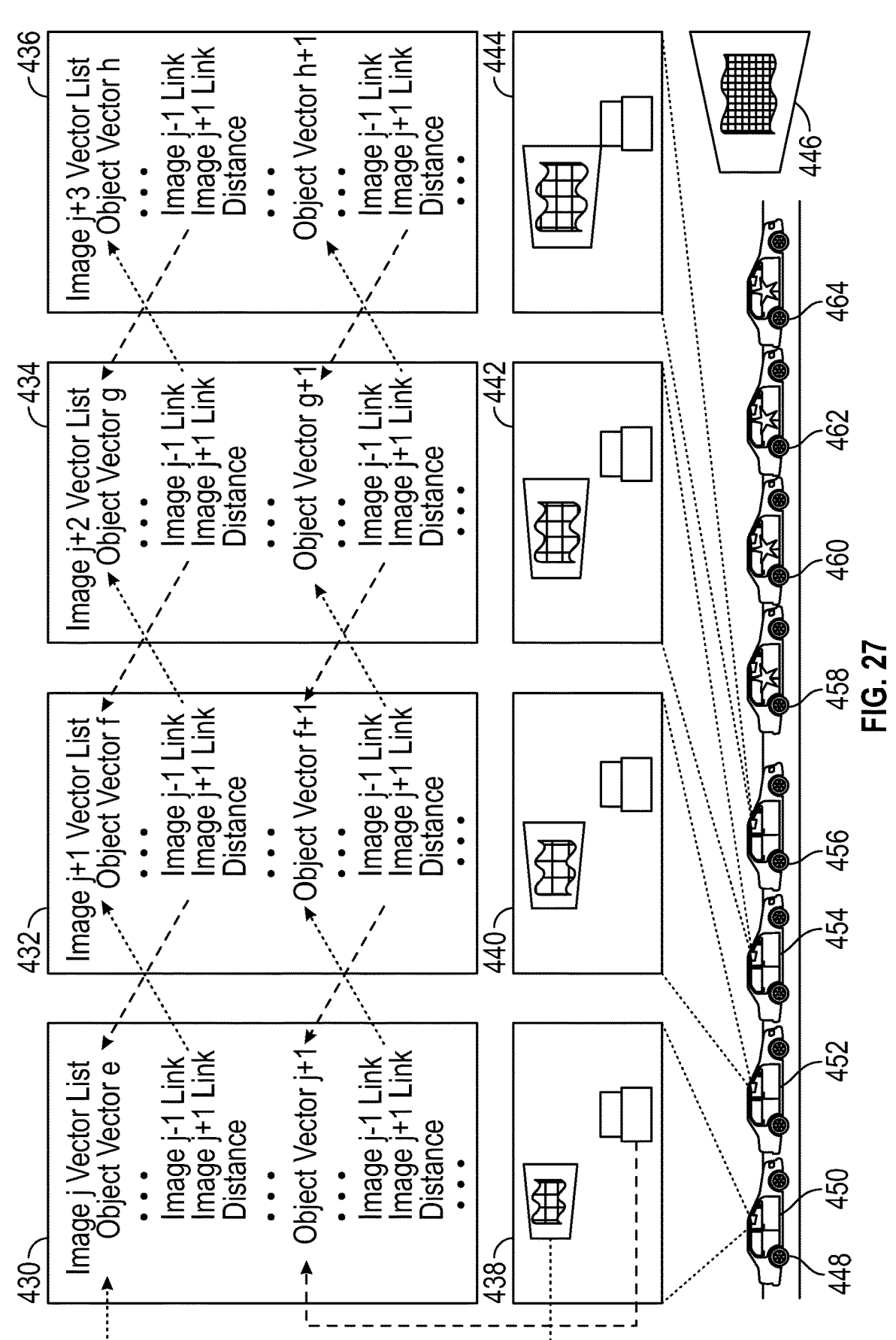
FIG. 27 illustrates an embodiment of linking of image vectors and object vectors from images collected along a travel path.

FIG. 27 illustrates a roadway scene that shows four locations 458, 460, 462, 464 of a vehicle on a roadway and four locations 448, 452, 454, 456 of a vehicle with an imaging sensor 450 configured in accordance with embodiments. A stationary billboard 446 is shown on the side of the roadway. Four images 438, 440, 442, 444 are shown corresponding to four consecutive images collected with the imaging sensor 450. Image j is shown in image 438, image j+1 is shown in image 440, image j+2 is shown in image 442, and image j+3 is shown in image 444. A partial image j vector list 430 is shown with an object vector corresponding to the billboard 446 and a second object vector associated with the car in front of the imaging sensor 450. The object vectors in each image vector list 430, 432, 434, 436 form portions of linked chains of object vectors corresponding to the stationary object and the in-motion object. A distance attribute is shown for each of the eight object vectors illustrated in FIG. 27. Object vectors corresponding to the billboard 446 will contain a distance attribute that decreases in magnitude as image count increases. For scenes whereby the imaging sensor-equipped vehicle is traveling at roughly the same rate and in the same direction as a vehicle within the field of view, object vectors corresponding to the in-motion vehicle will contain a distance attribute that is relatively consistent in magnitude as image count increases. For non-stationary objects, Eq. 38 is utilized to determine the object velocity values.

In real-time object recognition systems like those used for autonomous vehicle control and those used for imaging sensor-based ADAS functionality, system latency and system throughput rates are of primary importance. Embodiments are utilized to rapidly and efficiently convert raw imaging sensor data into data elements that enable fast, reliable object detection and recognition by utilizing the converted data elements. In embodiments, not all photodetector data pixels from bitmaps and/or point clouds need to be represented as portions of image vectors, scene vectors, or object vectors. In embodiments, the processes to select, classify and link vectors may also make determinations whether certain pixels are of high enough value to be represented in vector space for further processing.

Figure 28:
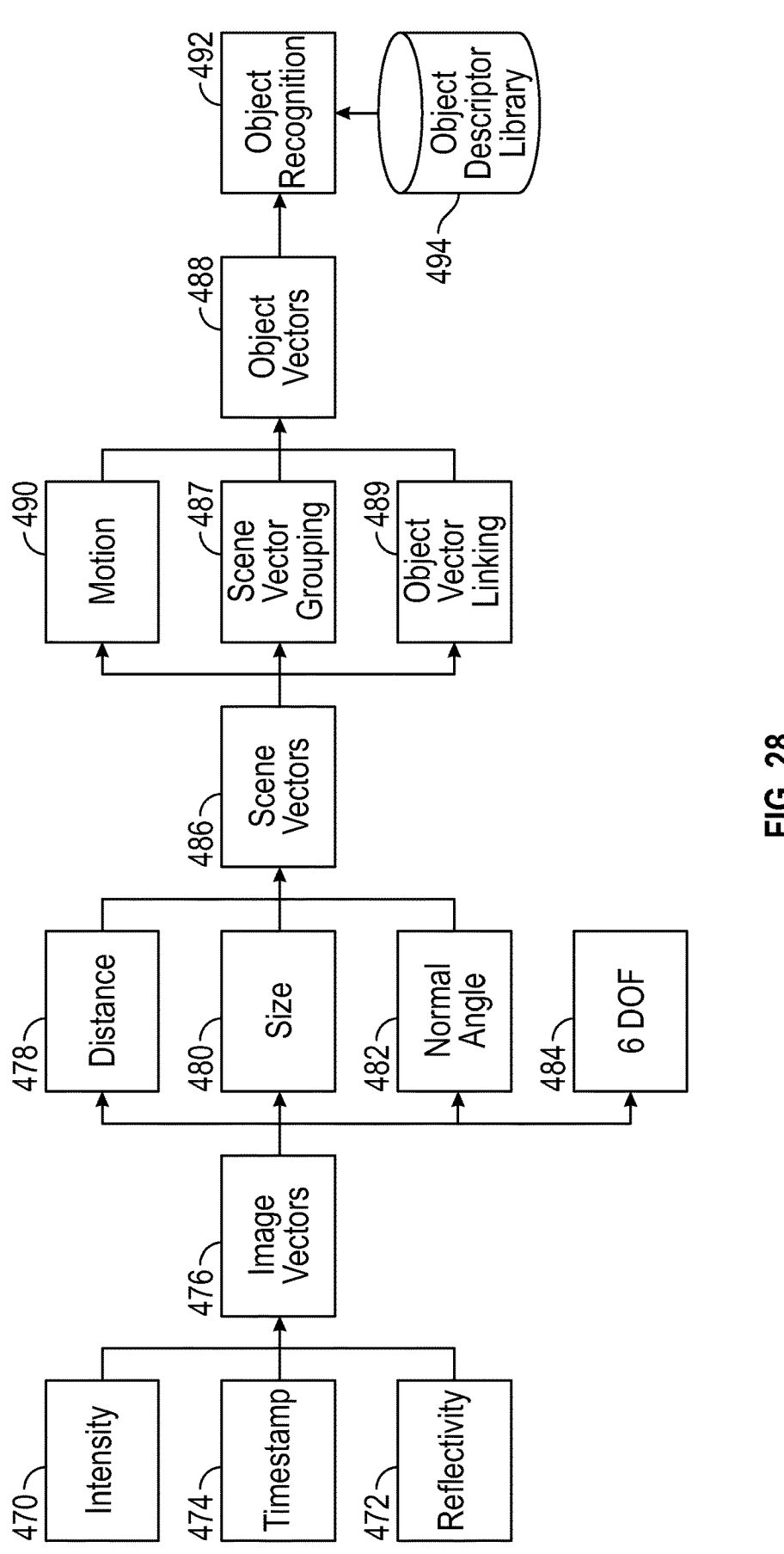
FIG. 28 illustrates an embodiment of attribution levels for vector hierarchy for vector-based object recognition.

For object vector processing systems in embodiments, there may exist a hierarchy of vector types by which lower-order vectors are enhanced with additional scene information to produce higher-order vectors. Additionally, in embodiments there may exist a hierarchy of vector types by which lower-order vectors are grouped with other lower-order vectors to produce object vectors that have similar characteristics that form the basis for the grouping. FIG. 28 illustrates embodiments of hierarchical vector relationships for an image and for a sequence of images that produce linked image vectors. Image vectors 476 are shown to contain image-related information like intensity 470 and reflectivity 472. In addition, an image timestamp 474 may be included for object vectorization systems wherein imaging sensor motion and/or object motion are desired.

In embodiments, a vector list for an image is a data structure that consists of all image vectors, scene vectors and object vectors that are identified and attributed for a given image. A vector list for an image will include image vectors and may include scene vectors and object vectors. In embodiments, not all pixels in an image must be represented by an image vector. In embodiments, image vectors do not overlap in image space. In other words, each pixel in an image is assigned to only one image vector.

In embodiments, there is a one-to-one relationship between an image vector 476 and its associated scene vector 486. A given scene vector 486 will consist of the same vertices and same midpoint as the associated image vector 476, with the addition of one or more attributes that are determined by projecting the image vector 476 into scene space. In embodiments, scene attributes that are utilized for scene vectors may include, but are not limited to, scene vector distance 478, scene vector size 480, and scene vector normal angle 482. Additionally, in embodiments, linked image vectors may be used to produce six-degree-of-freedom 484 information (x, y, z, roll, pitch, yaw) for a single imaging sensor, for a pair of imaging sensors, or for a vehicle that contains one or more accelerometers or other IMU sensors.

In embodiments there exists a one-to-one or many-to-one relationship between scene vectors 486 and object vectors 488. Object vectors 488 are created by utilizing scene vector grouping 487 to determine associations between scene vectors that share one or more common vertices in image space and/or in scene space. Object vector linking 489 defines the process by which object vectors from multiple images are associated with one-another. In embodiments, linked object vectors enable real-time processes like object tracking for moving objects and localization for stationary objects or infrastructure objects represented in a map. In embodiments, object vectors 488 may include a motion 490 attribute. In embodiments, object motion 490 associated with object vectors is determined from an ancillary sensor like radar or Doppler LiDAR, is determined in concert with accelerometers on board the imaging sensor, is determined by an imaging sensor velocity metric supplied by another on-board sensor, or is determined by utilizing Eq. 38 herein.

In embodiments, vectorized object recognition 492 describes the process by which object vectors are compared to elements in an object descriptor library 494. In embodiments, essential attributes for each object in the object descriptor library 494 are identified, and the object recognition 492 processing compares the essential attributes from the object vectors to determine matches between object vectors and object descriptors.

Figure 29:
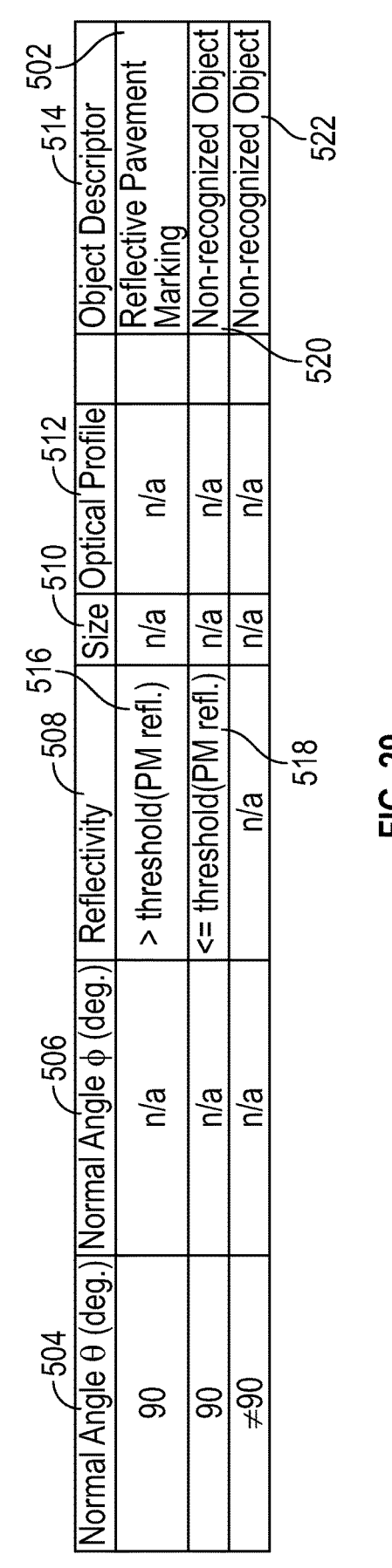
FIG. 29 illustrates an embodiment of an object descriptor library definition for a Lane Departure Warning System or a Lane Keep System.

FIG. 29 illustrates an object descriptor library 500 for vectorized object recognition for a simplified Lane Departure Warning system or a Lane Keep System for a roadway-based vehicle. In embodiments, the library 500 is stored in the form of a database (DB) of attributes that are associated with each object descriptor 514 in the DB. The illustrated library 500 contains a single object descriptor 514 for a reflective pavement marking 502. DB entries consist of attribute values that are utilized to uniquely identify objects as being a member of the object set or object class defined by the object descriptor 514. In embodiments, attribute entries 504, 506, 508, 510, 512 in a library 500 are typically stored in a preferred search order, thus allowing efficient processing for DBs that contain many object descriptor 514 entries. The first searchable attribute for the DB is the elevation coordinate of the normal angle of each scene vector or object vector, denoted Normal Angle θ (deg.) 504. In embodiments, scene vectors and object vectors that do not have an elevation coordinate of the normal angle of 90 degrees are not identified as a reflective pavement marking. The second searchable attribute for the DB is the azimuth coordinate of the normal angle of each scene vector or object vector, denoted Normal Angle φ (deg.) 506. In embodiments, scene vector and object vector attributes are not compared for a Normal Angle φ (deg.) 506 attribute because the azimuth coordinate of a normal angle is undefined for elevation coordinate angles equal to 90 degrees. In embodiments, reflective pavement markings will have a minimum reflectivity 508 value. In embodiments, for an object descriptor library 500, scene vectors and object vectors with a reflectivity 508 value>threshold (PM refl.) 516 may be identified as a reflective pavement marking 502.

Lane Keep Systems will typically identify longitudinal reflective markings that have a minimum length and/or a maximum width. In embodiments, those attributes of reflective pavement markings like maximum width, minimum length or minimum aspect ratio may all be included in object descriptor entries for DBs to more granularly define and identify longitudinal reflective pavement markings.

Advanced Lane Keep Systems also may identify the specific class of material type for longitudinal reflective markings. In embodiments, optical profile 512 entries in a DB would be used to differentiate between predefined material types for reflective pavement markings 502. According to the object descriptor library shown in FIG. 29, scene vectors and object vectors that have a Normal Angle θ (deg.) 504 of 90 degrees and a reflectivity value 508<=threshold (PM refl.) 518 are defined as non-recognized objects 520. According to the object descriptor library shown in FIG. 29, scene vectors and object vectors that have a Normal Angle θ (deg.) 504 that is not equal to 90 degrees are defined as non-recognized objects 522.

Figure 30:
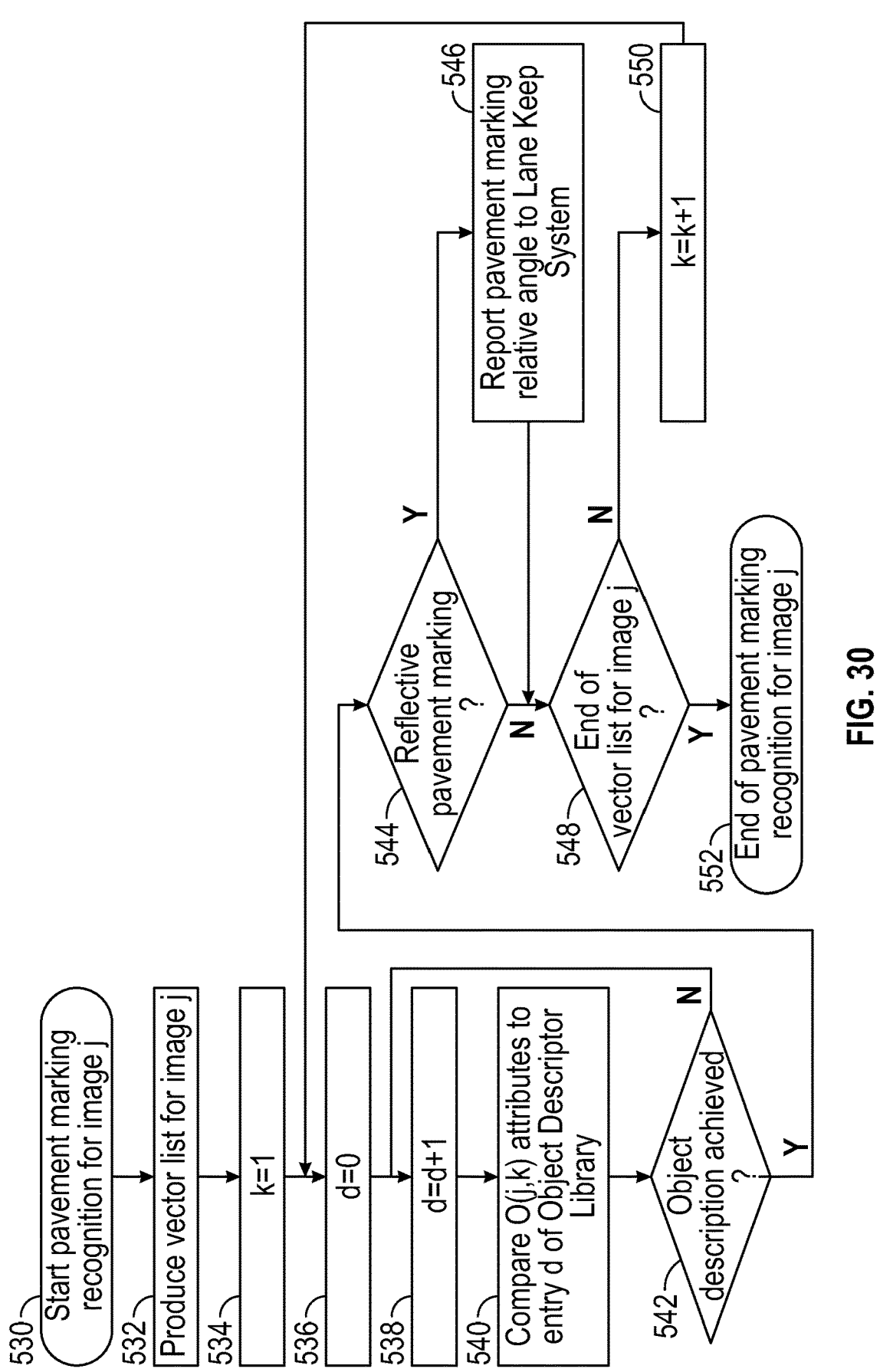
FIG. 30 illustrates an embodiment of a flowchart of a procedure for a Lane Keep System that utilizes object vector processing.

FIG. 30 shows a flowchart for the procedure that utilizes scene vectors and object vectors to perform object recognition for pavement markings for a Lane Keep System. The procedure start 530 is followed by the acquisition of image j and subsequent processing a vector list corresponding to image j 532. In embodiments, a vector list will contain K elements, and step 534 initializes the vector counter for the recognition procedure. In embodiments, an object descriptor library will contain D entries, and step 536 initializes the descriptor counter for the recognition procedure. Step 538 increments the descriptor counter in preparation for an attribute comparison between a vector and a descriptor attribute list. Step 540 compares the attributes of descriptor d for entry k. Decision step 542 determines if there is a match between the vector attributes and the object descriptor attributes. If no match is found, the procedure returns to search for a match with the next descriptor in the library. If an object descriptor match is found, the procedure tests to determine if the matched object descriptor is for a reflective pavement marking 544. In embodiments, upon acknowledgement that the matched descriptor is for a reflective pavement marking, the procedure reports a pavement marking relative angle to a lane keep system 546. Step 548 of the procedure checks to determine of all vectors for image j have been processed. If the vector list has unprocessed vectors, the vector counter is incremented 550 and the newly-indexed vector is compared to entries in the object descriptor library 540. Upon completion of all object vector processing for image j, the procedure for pavement marking recognition is completed 552.

Figure 31:
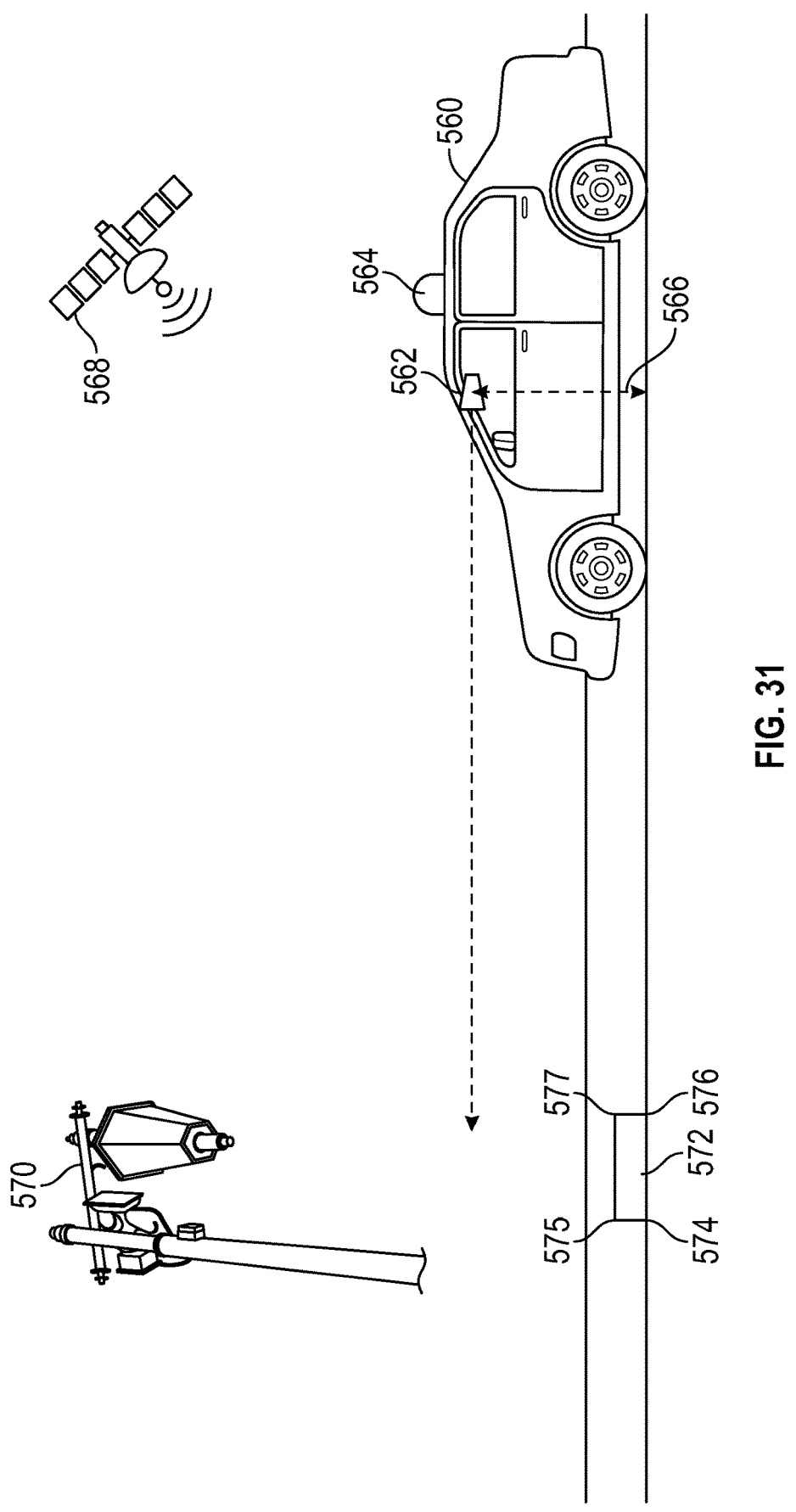
FIG. 31 illustrates an embodiment of methods for obtaining sensor pose information for a vehicle using imaging sensors.

FIG. 31 illustrates a vehicle 560 with an image sensor 562 of known height 566 and a positioning system receiver 564 traversing a roadway containing a pavement marking 572. In embodiments, based on receiver-supplied positioning information and lever arm calibration data, a sensor pose estimation at the time at which an image was produced is expressed as:

Lat$_{pose}$(j) sensor latitude in absolute coordinate space at the time at which image j was produced Long$_{pose}$(j) sensor longitude in absolute coordinate space at the time at which image j was produced Alt$_{pose}$(j) sensor altitude in absolute coordinate space at the time at which image j was produced Heading$_{pose}$(j) vehicle or sensor heading in absolute coordinate space at the time at which image j was produced, expressed as absolute azimuth angle ($\varphi_{pose}$(j)) and absolute elevation angle ($\theta_{pose}$(j))

In embodiments, a vector list for image j includes an object vector k that corresponds to a roadway pavement marking 572. Utilizing imaging sensor pose estimation, a vector midpoint description, and principles from photogrammetry, an absolute coordinate system location of a reflective pavement marking midpoint is expressed as:

$$\text{Lat}_{mid(j,k)} = \text{Lat}_{pose}(j) + d_{mid(j,k)} * \sin(\theta_{pose}(j) + \theta_{mid(j,k)}) * \sin(\varphi_{pose}(j) + \varphi_{mid(j,k)}) \quad \text{Eq. 39}$$

$$\text{Long}_{mid(j,k)} = \text{Long}_{pose}(j) + d_{mid(j,k)} * \sin(\theta_{pose}(j) + \theta_{mid(j,k)}) * \cos(\varphi_{pose}(j) + \varphi_{mid(j,k)}) \quad \text{Eq. 40}$$

$$\text{Alt}_{mid(j,k)} = \text{Alt}_{pose}(j) + d_{mid(j,k)} * \cos(\theta_{pose}(j) + \theta_{mid(j,k)}) \quad \text{Eq. 41}$$

Where Lat$_{pose}$(j) is a sensor pose latitude for image j
Long$_{pose}$(j) is a sensor pose longitude for image j
Alt$_{pose}$(j) is a sensor pose altitude for image j
d$_{mid(j,k)}$ is a distance from a sensor to a midpoint of vector k of image j
$\varphi_{pose}$(j) is an azimuth angle for a sensor pose for image j
$\varphi_{mid(j,k)}$ is an azimuth angle for a midpoint of vector k of image j
$\theta_{pose}$(j) is an elevation angle for a sensor pose for image j
$\theta_{mid(j,k)}$ is an elevation angle for a midpoint of vector k of image j In embodiments, absolute locations for all vertices 574, 575, 576, 577 in a scene vector or object vector are expressed as:

$$\text{Lat}_{vert-v(j,k)} = \text{Lat}_{pose}(j) + d_{vert-v(j,k)} * \sin(\theta_{pose}(j) + \theta_{vert-v(j,k)}) * \sin(\varphi_{pose}(j) + \varphi_{vert-v(j,k)}) \quad \text{Eq. 42}$$

$$\text{Long}_{vert-v(j,k)} = \text{Long}_{pose}(j) + d_{vert-v(j,k)} * \sin(\theta_{pose}(j) + \theta_{vert-v(j,k)}) * \cos(\varphi_{pose}(j) + d_{vert-v(j,k)}) \quad \text{Eq. 43}$$

$$\text{Alt}_{vert-v(j,k)} = \text{Alt}_{pose}(j) + d_{vert-v(j,k)} * \cos(\theta_{pose}(j) + \theta_{vert-v(j,k)}) \quad \text{Eq. 44}$$

Where Lat$_{pose}$(j) is a sensor pose latitude for image j
Long$_{pose}$(j) is a sensor pose longitude for image j
Alt$_{pose}$(j) is a sensor pose altitude for image j $d_{mid(j,k)}$ is a distance from a sensor to a midpoint of vector k of image j $\varphi_{pose}(j)$ is an azimuth angle for a sensor pose for image j $\varphi_{vert-v(j,k)}$ is an azimuth angle for vertex v of vector k of image j $\theta_{pose}(j)$ is an elevation angle for a sensor pose for image j $\theta_{vert-v(j,k)}$ is an elevation angle for vertex v of vector k of image j Sensor pose estimation will typically contain errors in latitude, longitude, altitude and heading propagated by spatial inaccuracies including, but not limited to, errors in positioning system transmitters, propagation timing inaccuracies in the received signals, processing errors introduced by the receiver processing circuitry, and timing synchronization errors introduced between image capture events and spatial positioning system events. The use of photogrammetry and sensor pose estimation to produce absolute coordinates for vector midpoints and vector vertices will typically produce insufficient spatial accuracy for real-time autonomous control systems. Furthermore, HD Maps produced using sensor pose estimation and photogrammetry will typically contain spatial errors that are sufficiently large, thus rendering them less safe for use by autonomous vehicle control systems. It is, therefore, desirable to have a method in embodiments for establishing sensor pose correction. In embodiments, a method for performing highly accurate sensor pose correction includes the automated creation of HD Maps with high spatial accuracy.

Figure 32:
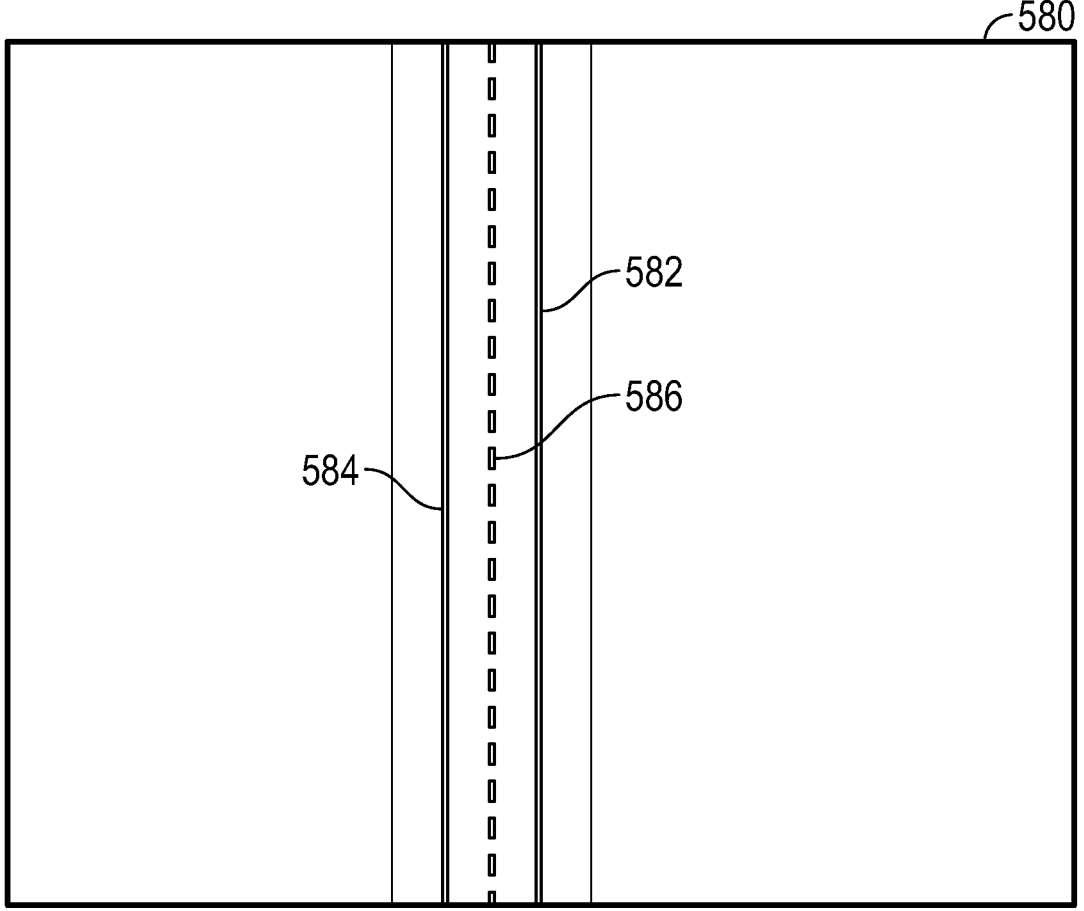
FIG. 32 illustrates an embodiment of elements of an orthophoto.

FIG. 32 illustrates a section of an orthophoto 580 that includes a section of roadway. The roadway contains a right-side solid longitudinal pavement marking 582, a left-side solid longitudinal pavement marking 584, and a center dashed longitudinal pavement marking 586. In GIS (Geographical Information Systems), orthophotos allow the access to spatial information for every pixel in the orthophoto file. In embodiments, this spatial information on a per-pixel basis is utilized to provide more accurate GNSS information for scene and object vectors than can be obtained via sensor pose estimation and photogrammetry. In embodiments, conflation of scene vectors and object vectors with orthophotos is utilized to provide higher-accuracy HD Maps than can be obtained via sensor pose estimation and photogrammetry. In embodiments, HD Maps produced via scene vector and object vector conflation with orthophotos is utilized to produce high-accuracy sensor pose correction for localization for autonomous vehicle control systems.

FIG. 33 illustrates an object descriptor library 590 utilized in embodiments for orthophoto conflation of scene vectors and object vectors. An object descriptor for a reflective pavement marking 591 has an elevation component of a normal angle equal to 90 degrees and a reflectivity value that is higher than a threshold for reflective pavement markings. In embodiments, scene vectors and object vectors that include attributes that meet these criteria are classified as reflective pavement markings. Vectors that have an elevation component of a normal angle equal to 90 degrees and a reflectivity value that is less than or equal to a threshold are classified as objects related to a roadway surface 592. Reflective road signs exist in scenes at various orientations relative to a lane of travel. In embodiments it is desirable to only recognize signs that are relevant to a particular lane or to a defined direction of travel. For road sign recognition, an elevation component of a normal angle of a vector is tested to validate that $\theta_{min} < \theta < \theta_{max}$ where $\theta_{min}$ is the minimum allowable normal angle elevation and $\theta_{max}$ is the maximum allowable normal angle elevation. For cases whereby the normal angle elevation meets the criteria, an azimuth elevation component of a normal angle of a vector is tested to validate that $\varphi_{min} < \varphi < \varphi_{max}$ where $\varphi_{min}$ is the minimum allowable normal angle azimuth and $\varphi_{max}$ is the maximum allowable normal angle azimuth. Non-recognized object descriptors 594, 595, 596, 597, 598, 599 are shown for scene vectors and object vectors that do not meet the attribution criteria for reflective pavement markings 591, road surfaces 592, or reflective signs 593.

Figure 34:
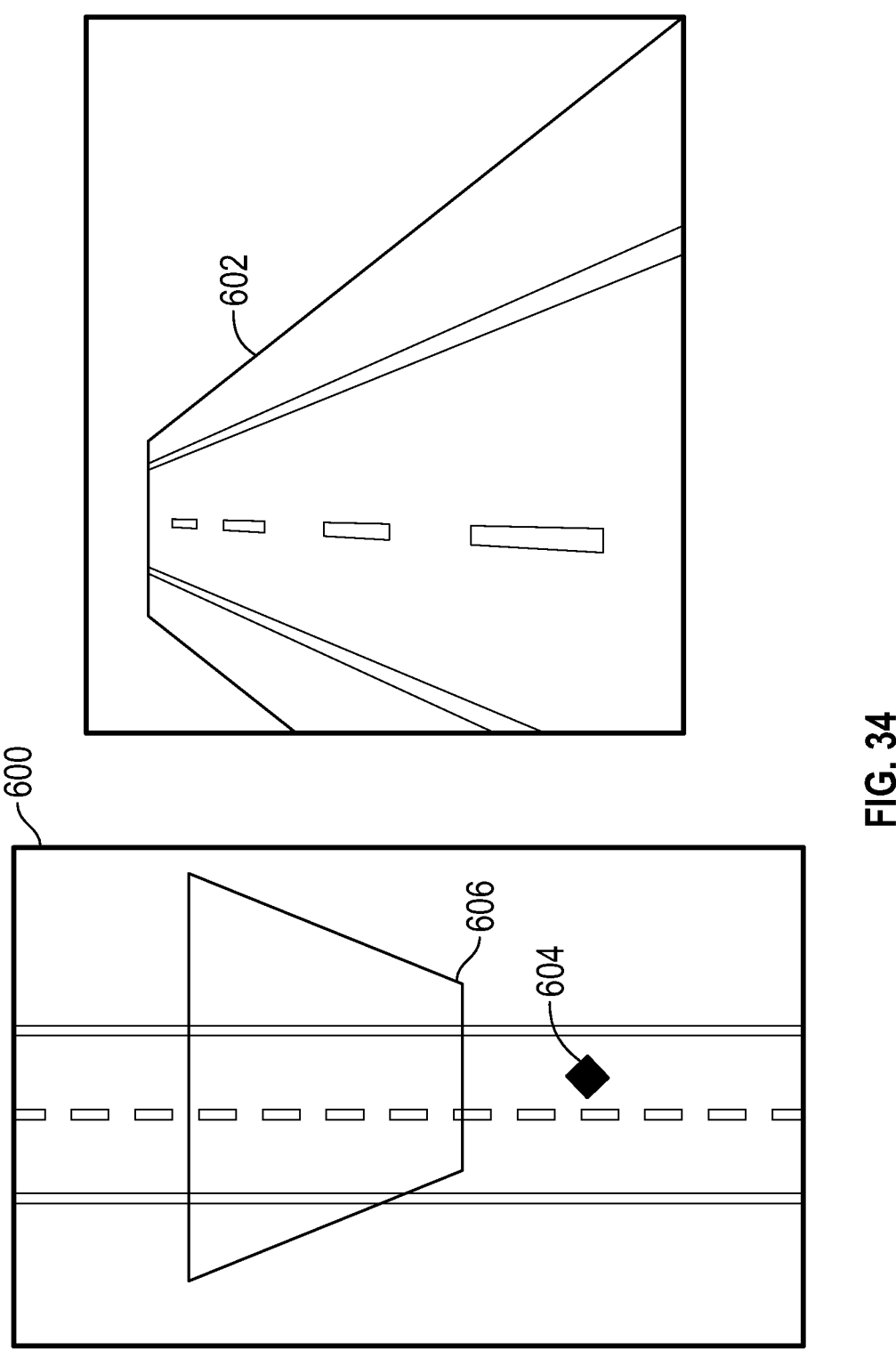
FIG. 34 illustrates an embodiment of conflation of a vector-based imaging sensor and an orthophoto utilizing sensor pose estimation.

In embodiments, conflation of scene vectors and object vectors with orthophotos is utilized to provide higher-spatial-accuracy HD Maps than can be obtained via sensor pose estimation and photogrammetry. FIG. 34 illustrates imagery sources that form the input to a conflation process. An orthophoto 600 section of a roadway is shown, with an attribution layer that contains spatial information for each image pixel. A sensor view 602 of a roadway is shown, the view corresponding to an image collected from a vehicle on a roadway. A sensor pose estimation is computed for the sensor view 602 of the roadway. In preparation for conflation, the estimated sensor pose 604 is identified in the orthophoto 600, along with a projection of the sensor field of view. Conflation is performed for relevant identified sensor image 602 pixels within the field of view 606 on the orthophoto 600.

Because not all image pixels require a spatial reference in an object vectorization system, conflation is utilized to identify spatial parameters for scene vector and object vector midpoints and vertices. FIG. 35 illustrates conflation of object vectors with an orthophoto to achieve a modified spatial reference for vector midpoints and vertices. An image field of view 614 is shown overlaid on an orthophoto 610, the field of view 614 identifying the spatial range of vectors for which updated spatial information is achieved. Object vectors corresponding to the field of view 614 are shown in sensor image 612 space. In embodiments, for each object vector, midpoint and vertex spatial coordinates are obtained and inserted into each object vector. Object vectors with updated spatial coordinates are shown overlaid on an orthophoto 610. A pavement marking object vector 616 is shown in image space and the same pavement marking object vector 618 is shown in orthophoto space. In embodiments, object vectors for image j that have been modified to include an absolute coordinate system spatial reference for vertices and midpoints are of the form:

$$
\begin{array}{llll}
O(j,k) = & \text{Scene Vector} & S(j,g) & \text{Eq. 45} \\
& \text{Scene Vector} & S(j,h) & \\
& \text{Normal Angle} & (\varphi, \theta) & \\
& \text{Distance} & d & \\
& \text{Sensor Velocity} & v &
\end{array}
$$

-continued

| | |
|---|---|
| Area | $a$ |
| Length | $l$ |
| Width | $w$ |
| Vertex Count | $V$ |
| Vertices | $Vertex0(m, n)$ |
| | $Vertex0(\varphi, \theta)$ |
| | $Vertex0(lat, long, alt)$ |
| | $Vertex1(m, n)$ |
| | $Vertex1(\varphi, \theta)$ |
| | $Vertex1(lat, long, alt)$ |
| | $Vertex2(m, n)$ |
| | $Vertex2(\varphi, \theta)$ |
| | $Vertex2(lat, long, alt)$ |
| | ... |
| | $VertexV - 1(m, n)$ |
| | $VertexV - 1(\varphi, \theta)$ |
| | $VertexV - 1(lat, long, alt)$ |
| Midpoint | Midpoint $(m, n)$ |
| | Midpoint $(\varphi, \theta)$ |
| | Midpoint $(lat, long, alt)$ |
| Previous Object Vector Link | $O(j - 1, e)$ |
| Next Object Vector Link | $O(j + 1, f)$ |

FIG. 36 illustrates results of conflating object vectors for multiple images on a roadway. A field of view for image j 622 and image j+1 624 are shown overlaid on an orthophoto 620. Object vectors 626 established from images j–2 through j+4 are shown overlaid on an orthophoto 620.

In embodiments, object vectors 630 representing features on roadway surfaces provide spatial reference for features that are included in HD Maps. FIG. 37 illustrates polyline HD Map features that are generated from object vectors 630. Road edge polylines 632 conform to the outermost edges of road surface object vectors. A centerline polyline 634 conforms to the midpoints of object vectors that represent the dashed centerline. Longitudinal lane marker polylines 636 conform to the midpoints of object vectors that represent the longitudinal left and right edge pavement markings. Trajectory polylines 638, 639 represent allowable directions and locations of travel for vehicles. Trajectory polylines do not typically represent physical roadway features. In embodiments, trajectories may be spatially located relative to physical features in a scene.

HD Maps that have been created and utilized in early versions of autonomous vehicles have typically consisted of attributed polylines. FIG. 38 illustrates an aerial image 642 view of a complex intersection and an associated polyline-based HD Map rendering 640 of the same intersection. Points that define polyline segment ends will generally include a GNSS attribute and a type attribute. Navigation according to polyline-based HD Maps requires precise vehicle location information for proper utilization of GNSS-based HD Map polylines. Trajectory polyline segment ends may include directional attributes, speed limit attributes, vehicle use type attributes, and GNSS location attributes.

FIG. 39 illustrates scene views that are utilized in a typical autonomous vehicle control system. The top panels illustrate a sensor view 650 and a polyline-based HD Map view 652 rendered according to the estimated pose of the imaging sensor. View 654 is the physical feature polyline-based HD Map view with a rendered vehicle trajectory. All physical feature polylines, the trajectory polyline, and the estimated sensor pose are described in a common positional coordinate space.

Polyline-based HD Maps suffer limitations in practice that make their widespread adoption in vehicle safety system problematic. One limitation is the requirement for highly-accurate sensor pose information. A second limitation is the utilization of polyline trajectories whereby some or most of the segment edges are not specifically tied to sensor-recognizable physical features. A third limitation is the representation of longitudinal physical features in polyline form and not in a sensor-friendly recognizable format. A fourth limitation is that polyline-based HD Maps are not safe when there is the potential for hacking or spoofing for one of the system inputs—GNSS, sensor or HD Maps. In embodiments, object-vector-based HD Maps are produced with authenticated trajectories to overcome the traditional HD Map limitations including, but not limited to, limitations cited herein.

FIG. 40 illustrates a sensor view 660 of a roadway for which an object-vector-based HD Map with authenticated trajectories is created. The illustrated scene includes raised edge barriers 662 on each side of a roadway, longitudinal reflective pavement markings 664 denoting the extents of an allowable lane of travel, a pavement surface 666 of unknown type, and edge curbing surfaces 668 of unknown type.

FIG. 41 illustrates object vector locations for road surface elements, with vector locations shown within a sensor field of view. In embodiments, road surface vectors are essentially of the form of Eq. 45 wherein object vectors include midpoints, vertices, reflectivity values, and links to vectors from preceding images. Road surface object vectors shown herein will ultimately be classified as longitudinal pavement markings 670, asphalt road surfaces 672, and concrete road surfaces 674.

FIG. 42 illustrates an object descriptor library 680 used for classifying and identifying object vectors that are used for object-vector-based HD Map creation. Object descriptors 682 with a normal angle elevation θ of 90 degrees and a reflectivity attribute that exceeds a pavement marking reflectivity threshold are classified as reflective pavement markings. Reflective pavement marking vectors with an aspect ratio greater than a minimum allowable value are classified as longitudinal pavement markings and those reflective pavement markings that do not meet an aspect ratio requirement are classified as other reflective pavement markings. Object descriptors 684 with a normal angle elevation θ of 90 degrees and a reflectivity attribute that is less than a pavement marking reflectivity threshold are classified as one of five asphalt road surfaces if an optical profile of a linked chain of object vectors matches one of the asphalt optical profiles in the object descriptor library. Object descriptors 686 with a normal angle elevation θ of 90 degrees and a reflectivity attribute that is less than the pavement marking reflectivity threshold are classified as one of five concrete road surfaces if the optical profile of a linked chain of object vectors matches one of the concrete optical profiles in the object descriptor library. In embodiments, an object descriptor 687 with a normal angle elevation θ of 90 degrees and a reflectivity attribute that is less than the pavement marking reflectivity threshold is classified as a gravel road surface if the optical profile of a linked chain of object vectors matches the gravel optical profile in the object descriptor library. In embodiments, an object descriptor 688 with a normal angle elevation θ of 90 degrees and a reflectivity attribute that is less than the pavement marking reflectivity threshold is classified as a cobblestone road surface if the optical profile of a linked chain of object vectors matches the cobblestone optical profile in the object descriptor library. In embodiments, an object descriptor 689 with a normal angle elevation θ of 90 degrees and a reflectivity attribute that is less than the pavement marking reflectivity threshold is classified as "other" road surface if the optical profile of a linked chain of object vectors fails to match any road surface optical profiles in the object descriptor library. In practice, optical profiles from linked chains of objects vectors will rarely produce exact matches with road surface optical profiles in an object descriptor library. In embodiments, linked chains of object vectors are compared to all road surface optical profiles in an object descriptor library, with each profile comparison yielding a score relating to the likelihood that the vector optical profile is a match to the compared object descriptor. In embodiments, the road surface type yielding the highest likelihood of a match is assigned to an object vector that will be utilized for HD Map generation.

FIG. 43 illustrates the creation of HD Map polyline features from classified road surface object vectors. A left-road-edge polyline 700 is produced from a series of attributed left-road-edge line segment points 702, whereby the segment points 702 correspond to the leftmost vertex points of the leftmost road surface object vectors. A right-road-edge polyline 704 is produced from a series of attributed right-road-edge line segment points 706, whereby the segment points 706 correspond to the rightmost vertex points of the rightmost road surface object vectors. A left-lane-edge polyline 708 is produced from a series of attributed left-lane-edge line segment points 710, whereby the segment points 710 correspond to a point equidistant between vertices that define the short side of a longitudinal reflective pavement marking object vector. A right-lane-edge polyline 712 is produced from a series of attributed right-lane-edge line segment points 714, whereby the segment points 714 correspond to a point equidistant between vertices that define the short side of a longitudinal reflective pavement marking object vector. A directional lane trajectory polyline 716 is produced from a series of attributed segment points 718, whereby each segment point 718 is defined as a point equidistant between a left-lane-edge line segment point 710 and a right-lane-edge line segment point 714.

Traditional HD Maps have utilized polyline or polyline-like linear features to describe lane-level topology and enable real-time control in autonomous vehicle control systems. The polyline approach to HD Maps has several limitations that prevent their widespread adoption in vehicle safety systems including, but not limited to: 1) attributed trajectory polyline points include 3D location (lat, long, alt), but typically do not include relative locations from physical features on the roadway, 2) attributed lane-edge and road edge polylines align with the longitudinal paths of the physical features they represent, but the attribution is insufficient to adequately describe the features in sufficient detail for proper recognition, identification and classification for on-board imaging sensors, and 3) GNSS outages on board a vehicle for long periods of time create positional-error problems for polyline-based system that rely mainly on the spatial location of polyline features. A five-feature polyline HD Map similar to that shown in FIG. 43 has a format roughly equivalent to:

$$PolylineDataStructure(p) \qquad \text{Eq. 46}$$

$$\text{Type} \quad RoadEdge$$

$$\text{Points} \quad 4$$

$$PolylinePoint(p, 0)$$

$$Lat, long, alt$$

$$PolylinePoint(p, 1)$$

$$Lat, long, alt$$

$$PolylinePoint(p, 2)$$

$$Lat, long, alt$$

$$PolylinePoint(p, 3)$$

$$Lat, long, alt$$

$$PolylineDataStructure(p + 1)$$

$$\text{Type} \quad RoadEdge$$

$$\text{Points} \quad 4$$

$$PolylinePoint(p + 1, 0)$$

$$Lat, long, alt$$

$$PolylinePoint(p + 1, 1)$$

-continued

*Lat, long, alt*

*PolylinePoint*(*p* + 1, 2)

*Lat, long, alt*

*PolylinePoint*(*p* + 1, 3)

*PolylineDataStructure*(*p* + 2)

Type   *LaneEdge*

Points   4

*PolylinePoint*(*p* + 2, 0)

*Lat, long, alt*

*PolylinePoint*(*p* + 2, 1)

*Lat, long, alt*

*PolylinePoint*(*p* + 2, 2)

*Lat, long, alt*

*PolylinePoint*(*p* + 2, 3)

*Lat, long, alt*

*PolylineDataStructure*(*p* + 3)

Type   *LaneEdge*

Points   4

*PolylinePoint*(*p* + 3, 0)

*Lat, long, alt*

*PolylinePoint*(*p* + 3, 1)

*Lat, long, alt*

*PolylinePoint*(*p* + 3, 2)

*Lat, long, alt*

*PolylinePoint*(*p* + 3, 3)

*Lat, long, alt*

*PolylineDataStructure*(*p* + 4)

Type   Trajectory

Direction   One-way

Points   4

*SpeedLimit*   30

Restrictions   None

*PolylinePoint*(*p* + 4, 0)

*Lat, long, alt*

*PolylinePoint*(*p* + 4, 1)

*Lat, long, alt*

*PolylinePoint*(*p* + 4, 2)

*Lat, long, alt*

*PolylinePoint*(*p* + 4, 3)

*Lat, long, alt*

Eq. 46 provides a description for an HD Map that is utilized in a GNSS-based or a terrestrial-position-based system. Polyline features provide positional information and a polyline type attribute, thus giving on-board imaging sensors a general guide as to how features may be identified. This polyline feature structure, however, becomes more problematic and ultimately unusable when significant GNSS outages occur. Furthermore, hacking or spoofing of GNSS or terrestrial positional signals renders the positional polyline HD Map approach unsafe for ADAS and ADS. Trajectory polylines from Eq. 46 only provide a spatial reference, with no tags or links to physical features that can be sensed, detected, interpreted or classified by on-board imaging sensors.

FIG. 44 illustrates labeling of object vectors created for a sensor view. Vertices from the illustrated objects are utilized as reference points in polyline features for vector-based HD Maps. In embodiments, position-centric polyline HD Map limitations are overcome by utilizing a vector-based HD Map with authenticated trajectories similar to that shown in FIG. 43 and having a format roughly equivalent to:

$$O(j, k) \hspace{3cm} \text{Eq. 47}$$

(object descriptor for object vector *k* of image *j*)

$$O(j, k + 1)$$

(object descriptor for object vector *k* + 1 of image *j*)

...

$$O(j, k + 16)$$

(object descriptor for object vector *k* + 16 of image *j*)

*PolylineDataStructure*(*p*)

Type   *RoadEdge*

Points   4

*PolylinePoint*(*p*, 0)

*O*(*j*, *k*).*Vertex*0(*lat, long, alt*)

*PolylinePoint*(*p*, 1)

*O*(*j*, *k* + 6).*Vertex*0(*lat, long, alt*)

*PolylinePoint*(*p*, 2)

*O*(*j*, *k* + 12).*Vertex*0(*lat, long, alt*)

*PolylinePoint*(*p*, 3)

*O*(*j*, *k* + 12).*Vertex*0(*lat, long, alt*)

*PolylineDataStructure*(*p* + 1)

Type   *RoadEdge*

Points   4

*PolylinePoint*(*p* + 1, 0)

*O*(*j*, *k* + 5).*Vertex*3(*lat, long, alt*)

*PolylinePoint*(*p* + 1, 1)

*O*(*j*, *k* + 11).*Vertex*3(*lat, long, alt*)

*PolylinePoint*(*p* + 1, 2)

*O*(*j*, *k* + 16).*Vertex*3(*lat, long, alt*)

*PolylinePoint*(*p* + 1, 3)

*O*(*j*, *k* + 16).*Vertex*2(*lat, long, alt*)

*PolylineDataStructure*(*p* + 2)

Type   *LaneEdge*

Points   4

*PolylinePoint*(*p* + 2, 0)

-continued

Midpoint $[O(j, k + 2).Vertex0(lat, long, alt),$ $O(j, k + 2).Vertex3(lat, long, alt)]$ PolylinePoint$(p + 2, 1)$ Midpoint $[O(j, k + 8).Vertex0(lat, long, alt),$ $O(j, k + 8).Vertex3(lat, long, alt)]$ PolylinePoint$(p + 2, 2)$ Midpoint $[O(j, k + 13).Vertex0(lat, long, alt),$ $O(j, k + 13).Vertex3(lat, long, alt)]$ PolylinePoint$(p + 2, 3)$ Midpoint $[O(j, k + 13).Vertex1(lat, long, alt),$ $O(j, k + 13).Vertex2(lat, long, alt)]$ PolylineDataStructure$(p + 3)$

| Type | LaneEdge |
|------|----------|
| Points | 4 |

PolylinePoint$(p + 3, 0)$

Midpoint $[O(j, k + 4).Vertex0(lat, long, alt),$ $O(j, k + 4).Vertex3(lat, long, alt)]$ PolylinePoint$(p + 3, 1)$ Midpoint $[O(j, k + 10).Vertex0(lat, long, alt),$ $O(j, k + 10).Vertex3(lat, long, alt)]$ PolylinePoint$(p + 3, 2)$ Midpoint $[O(j, k + 15).Vertex0(lat, long, alt),$ $O(j, k + 15).Vertex3(lat, long, alt)]$ PolylinePoint$(p + 3, 3)$ Midpoint $[O(j, k + 15).Vertex1(lat, long, alt),$ $O(j, k + 15).Vertex2(lat, long, alt)]$ PolylineDataStructure$(p + 4)$

| Type | Trajectory |
|------|-----------|
| Direction | One-way |
| Points | 4 |
| SpeedLimit | 30 |
| Restrictions | None |

PolylinePoint$(p + 4, 0)$

Midpoint $[O(j, k + 2).Vertex3(lat, long, alt),$ $O(j, k + 4).Vertex0(lat, long, alt)]$ PolylinePoint$(p + 4, 1)$ Midpoint $[O(j, k + 8).Vertex3(lat, long, alt),$ $O(j, k + 10).Vertex0(lat, long, alt)]$ PolylinePoint$(p + 4, 2)$ Midpoint $[O(j, k + 13).Vertex3(lat, long, alt),$ $O(j, k + 15).Vertex0(lat, long, alt)]$ PolylinePoint$(p + 4, 3)$ Midpoint $[O(j, k + 13).Vertex2(lat, long, alt),$ $O(j, k + 15).Vertex1(lat, long, alt)]$ Eq. 47 contains many noteworthy inclusions that offer advantages including, but not limited to: 1) attributed trajectory polyline points include a 3D location (lat, long, alt) that is derived from vector vertices that define physical features on a roadway, 2) attributed lane-edge and road-edge polylines are derived from vertices of object vectors that represent physical features, with the object vector descriptors containing sufficient information for proper recognition, identification and classification for on-board imaging sensors, and 3) linking of physical feature object vectors to polyline features allows for precise navigation of roadways during long GNSS or other positioning system outages and allows for precise navigation during positional input signal hacking or spoofing.

FIG. 45 illustrates views of a roadway for a real-time autonomous navigation system that utilizes authenticated trajectory information. The left-side view represents a sensor view 720 with road-based object vectors overlaid on the image. The right-side view represents a vector-based HD Map 722 data set that has been rendered from a viewpoint of an estimated pose and a field of view of an imaging sensor. The navigation system is configured to direct a vehicle along a designated trajectory 724, the location of which is defined by a left-lane-edge reflective pavement marking 726 and a right-lane-edge reflective pavement marking 728. In embodiments, the navigation system determines, based on the format of the vector-based HD Map data, that the trajectory 724 is configured to enable validation or authentication of the trajectory 724 information based on input from an imaging sensor. The navigation system obtains object vector information for a left-side reflective pavement marking 730 and information for a right-side reflective pavement marking 732. Real-time comparison of vector sets establishes a match between a sensor-space reflective pavement marking vector 734 and a rendered HD Map-space left-side reflective pavement marking vector 730, and establishes a match between a sensor-space reflective pavement marking vector 736 and a rendered HD Map-space right-side reflective pavement marking vector 732. At this point in the process, the trajectory information is authenticated since the physical features upon which the trajectory information is based have been validated from the sensor-view vector processing system. Prior to utilizing the authenticated trajectory information for navigation of a vehicle, a navigation system may update a sensor pose from an estimated pose to a corrected pose. In embodiments, computations for corrected sensor pose are:

$$Lat_{pose}(j) = Lat_{mid(j,k)} - d_{mid(j,k)} * \sin(\theta_{pose}(j) + \theta_{mid(j,k)}) * \sin(\varphi_{pose}(j) + \varphi_{mid(j,k)}) \qquad \text{Eq. 48}$$

$$Long_{pose}(j) = Long_{mid(j,k)} - d_{mid(j,k)} * \sin(\theta_{pose}(j) + \theta_{mid(j,k)}) * \cos(\varphi_{pose}(j) + \varphi_{mid(j,k)}) \qquad \text{Eq. 49}$$

$$Alt_{pose}(j) = Alt_{mid(j,k)} - d_{mid(j,k)} * \cos(\theta_{pose}(j) + \theta_{mid(j,k)}) \qquad \text{Eq. 50}$$

Where $Lat_{pose}(j)$ is a sensor pose latitude for image j $Long_{pose}(j)$ is a sensor pose longitude for image j $Alt_{pose}(j)$ is a sensor pose altitude for image j $d_{mid(j,k)}$ is a distance from a sensor to a midpoint of vector k of image j $\varphi_{pose}(j)$ is an azimuth angle for a sensor pose for image j $\varphi_{mid(j,k)}$ is an azimuth angle for a midpoint of vector k of image j $\theta_{pose}(j)$ is an elevation angle for a sensor pose for image j $\theta_{mid(j,k)}$ is an elevation angle for a midpoint of vector k of image j Those skilled in the art will recognize there exist a number of methods for sensor pose correction with one or more known control points. In embodiments, with a real-time navigation system utilizing a vector-based HD Map and a vectorized sensor view, control points in various methods are HD Map object vector Midpoint (lat, long, alt) locations that are projected onto vector midpoints in sensor space.

FIG. 46 illustrates a flowchart for a procedure for a vehicle navigation system that utilizes a vector-based HD Map. At the start 740 of the procedure, the processing system obtains an initial imaging sensor location and heading and converts this data into an estimated sensor pose 742. The estimated sensor pose and sensor calibration parameters define a field of view (FOV) in absolute space. The procedure obtains vector-based HD map information based on the sensor pose FOV 744. For the current image indicator j, the procedure collects image j and produces an object vector list 746 associated with image j. At 748 the procedure compares vectors from the image j vector list and vectors from the sensor pose FOV from the vector-based HD Map. A purpose of the navigation procedure is to direct a vehicle along a trajectory. A selected trajectory for a navigation procedure is obtained from the sensor pose FOV from the vector-based HD Map. Trajectories that enable authentication will have reference vectors that were utilized to establish 3D points along a desired travel path. At 750 the procedure obtains the reference vector information for one or more points along a desired authenticatable trajectory. At 752, a decision is made that determines if the reference vectors from the trajectory definition from the vector-based HD Map spatial and attributed match for vectors contained in the image j vector list. If the reference vectors match the image j object vectors, the trajectory is deemed authenticated 754. In embodiments, midpoints of reference vectors are utilized as control points to update the estimated sensor pose to a corrected sensor pose 756. In embodiments whereby accurate control points are not available from object vectors or reference vectors due to inaccuracies at the vector spatial layer, pose correction may be accomplished using 6 DOF information from Eqs. 13-17. If some, most, or all of the reference vectors are not located in the image j vector list, the procedure can execute a change detection at 758, which may include transmitting image data and/or vector data to an off-board data center for processing to determine if changes are warranted for a vector-based HP Map.

In embodiments, navigation procedures may be implemented such that all trajectories are utilized in on-board mobility applications, but only authenticated trajectories are utilized in on-board vehicle safety systems. At 760, the procedure includes sending trajectory information to a vehicle control system. Having completed the navigation tasks associated with image j, the image counter is incremented 762 in preparation for procedure steps corresponding to the next image obtained from an imaging sensor. At 764, the procedure includes testing to see if the navigation function is complete. If navigation is not complete, the procedure returns to 744 to collect and process the next image. If navigation is complete the vehicle navigation procedure ends 766.

The use of vector descriptors, object vectorization and vector-based HD Maps in accordance with various embodiments leads to architectural changes for on-board navigation and vehicle control systems. FIG. 47 illustrates a block diagram showing functional components of an Advanced Driver Assist System (ADAS) or an Automated Driving System (ADS). Sensor 770 input to the system provides information 772 to machine vision 776 including, but not limited to, Lighting-invariant Imaging, distance at an object level or pixel level, object or pixel motion, six-degree-of-freedom (x, y, z, roll, pitch, yaw) positioning data, material assessment, and imaging through fog and dust. A domain controller 774 block consists of hardware and software that coordinates the acquisition of all sensor data and performs machine vision 776 tasks and procedures. Early-stage machine vision utilized image processing 782 for many vision tasks.

More recently machine vision has utilized Convolutional Neural Networks (CNNs) 784 for many vision tasks, especially for tasks that involve imaging in unstructured environments. In embodiments, the inclusion of object vector processing 778 in the machine vision stack 776 illustrates that object vector processing 778 can co-exist with other vision tasks and procedures. A map engine is a software construct that encompasses the handling of digital map data within a navigation system. A polyline-based HD Map engine 786 typically works with or interfaces to ADAS or ADS functionality within a vehicle control environment. In embodiments, a vector-based HD Map engine 780 is an integral component in a machine vision stack 776, working in concert with vector processing 778. In embodiments having equivalent computing power, CNNs can achieve object recognition or identification results of 100 objects per second, image processing can achieve object recognition or identification results of 200-300 objects per second, and vector processing can achieve object recognition or identification results in excess of 1000 objects per second.

In embodiments of imaging along a roadway, each incident ray is reflected at the same angle to the surface normal as the incident ray, but on the opposing side of the surface normal in the plane formed by incident and reflected rays. The result is that an image reflected by a surface is reproduced in mirror-like or specular fashion. For roadway-based surfaces like asphalt and concrete, road surface optical profiles establish the amount of reflectivity at various measurement distances and various angles relative to an active imaging sensor. The reflectivity values in optical profiles represent the amount of specular reflection off the micro-texture surfaces and macro-texture surfaces that make up a road surface.

The coefficient of retroreflection for a surface is expressed as:

$$R_{retro} = \text{Radiance/Flux Density} \qquad \text{Eq. 51}$$

For road surfaces that do not contain embedded retroreflective elements, the radiance portion of Eq. 46 is due to specular reflection from micro-surfaces. The coefficient of retroreflection for a surface that does not contain embedded retroreflectors whereby the retroreflected signal is due to micro-texture surface and macro-texture surface specular reflection is expressed as:

$$Rs(\alpha) = [\Sigma(A_{micro\text{-}texture} \text{ with normal angles parallel to } \alpha + \Sigma A_{macro\text{-}texture} \text{ with normal angles parallel to } \alpha)]/A_{surface}(\alpha_N) \qquad \text{Eq. 52}$$

Where $\alpha$ is an incident angle of a radiance signal emitted from a surface $\alpha_N$ is a normal angle for a surface $A_{micro\text{-}texture}$ is an area of a micro-texture surface with a normal angle parallel to $\alpha$ $A_{macro\text{-}texture}$ is an area of a macro-texture surface with a normal angle parallel to $\alpha$ $A_{surface}(\alpha_N)$ is an area of a surface that contains multiple micro-surfaces In accordance with the NCHRP Guide for Pavement Friction (2009) ("NCHRP Pavement 2009"), pavement friction is the force that resists the relative motion between a vehicle tire and a pavement surface. This resistive force is generated as a tire rolls or slides over a pavement surface, is characterized using the non-dimensional friction coefficient, $\mu$, which is defined as the ratio of the tangential friction force ($F_{Friction}$) between a tire tread rubber and a horizontal traveled surface to a perpendicular force or vertical load ($F_{VerticalLoad}$) and is computed as:

$$\mu = F_{Friction}/F_{VerticalLoad} \qquad \text{Eq. 53}$$

From NCRP Pavement 2009, pavement friction plays a vital role in keeping vehicles on the road, as adequate friction is necessary for a driver or a control system to control/maneuver a vehicle in a safe manner, in both the longitudinal and lateral directions. Providing adequate friction for safe driving is a key input for highway geometric design, as it is used in determining the adequacy of the minimum stopping sight distance, minimum horizontal radius, minimum radius of crest vertical curves, and maximum super-elevation in horizontal curves. Generally speaking, the higher the friction available at a pavement-tire interface, the more control a vehicle has on a roadway.

NCHRP Pavement 2009 states that pavement friction is the result of a complex interplay between two principal frictional force components-adhesion and hysteresis. Adhesion is the friction that results from the small-scale bonding/interlocking of the vehicle tire rubber and the pavement surface as they come into contact with each other. It is a function of the interface shear strength and contact area. The hysteresis component of frictional forces results from the energy loss due to bulk deformation of a vehicle tire. The deformation is commonly referred to as enveloping of a tire around a texture. When a tire compresses against a pavement surface, the stress distribution causes the deformation energy to be stored within the rubber. As a tire relaxes, part of the stored energy is recovered, while the other part is lost in the form of heat (hysteresis), which is irreversible. This loss leaves a net frictional force to help stop the forward motion.

NCHRP Pavement 2009 states that although there are other components of pavement friction (e.g., tire rubber shear), they are insignificant when compared to the adhesion and hysteresis force components. Thus, friction can be viewed as the sum of the adhesion and hysteresis frictional forces.

$$F_{Friction} = F_{Adhesion} + F_{Hysteresis} \qquad \text{Eq. 54}$$

Both components depend largely on pavement surface characteristics, the contact between tire and pavement, and the properties of the tire. Also, because tire rubber is a visco-elastic material, temperature and sliding speed affect both components.

NCHRP Pavement 2009, which is incorporated herein by reference, states that because adhesion force is developed at the pavement-tire interface, it is most responsive to the micro-level asperities (micro-texture) of the aggregate particles contained in the pavement surface. In contrast, the hysteresis force developed within the tire is most responsive to the macro-level asperities (macro-texture) formed in the surface via mix design and/or construction techniques. As a result of this phenomenon, adhesion governs the overall friction on smooth-textured and dry pavements, while hysteresis is the dominant component on wet and rough-textured pavements.

As discussed in NCHRP Pavement 2009, Wallman and Astrom in 2001 defined the factors that influence pavement friction forces, which can be grouped into four categories:

pavement surface characteristics, vehicle operational parameters, tire properties, and environmental factors. FIG. 48 illustrates a table 800 that shows the various factors comprising each category. Because each factor in this table plays a role in defining pavement friction, friction is better understood as a process instead of an inherent property of a pavement. It is only when all these factors are fully specified that friction takes on a definite value. The more critical factors are shown in bold in FIG. 48 and are briefly discussed below. Among these factors, the ones considered to be within a highway agency's control are micro-texture and macro-texture, pavement materials properties, and slip speed. Pavement surface texture is defined as the deviations of the pavement surface from a true planar surface. These deviations occur at three distinct levels of scale, each defined by the wavelength ($\lambda$) and peak-to-peak amplitude (A) of its components. The three levels of texture, as established in 1987 by the Permanent International Association of Road Congresses (PIARC), are as follows:

Micro-texture ($\lambda$<0.02 in [0.5 mm], A=0.04 to 20 mils [1 to 500 $\mu$m])—Surface roughness quality at the sub-visible or microscopic level. It is a function of the surface properties of the aggregate particles contained in the asphalt or concrete paving material.

Macro-texture ($\lambda$=0.02 to 2 in [0.5 to 50 mm], A=0.005 to 0.8 in [0.1 to 20 mm])—Surface roughness quality defined by the mixture properties (shape, size, and gradation of aggregate) of asphalt paving mixtures and the method of finishing/texturing (dragging, tining, grooving, depth, width, spacing and orientation of channels/grooves) used on a concrete paved surfaces.

Mega-texture ($\lambda$=2 to 20 in [50 to 500 mm], A=0.005 to 2 in [0.1 to 50 mm])—Texture with wavelengths in the same order of size as the pavement-tire interface. It is largely defined by the distress, defects, or "waviness" on the pavement surface.

Road surface classes and types will exhibit characteristics that determine the amount of micro-texturing and macro-texturing exhibited by road surface types over their installed lives. Upon install, road surface types will exhibit known ratios of macro-texturing and micro-texturing. The normal faces of micro-texture structures and macro-texture structures, however, will be "visible" in different ratios to an active imaging sensor at various entrance angles (the angle between a road surface normal angle and an angle at which a retroreflected signal contacts a road surface). In embodiments, a texturing LUT for a known road surface type may take the form:

| Entrance Angle ($\alpha$) | Micro-texture % | Macro-texture % |
| --- | --- | --- |
| 80° | $P_{Micro\text{-}texture}(\alpha)$ | $P_{Macro\text{-}texture}(\alpha)$ |
| 81° | $P_{Micro\text{-}texture}(\alpha)$ | $P_{Macro\text{-}texture}(\alpha)$ |
| 82° | $P_{Micro\text{-}texture}(\alpha)$ | $P_{Macro\text{-}texture}(\alpha)$ |
| 83° | $P_{Micro\text{-}texture}(\alpha)$ | $P_{Macro\text{-}texture}(\alpha)$ |
| 84° | $P_{Micro\text{-}texture}(\alpha)$ | $P_{Macro\text{-}texture}(\alpha)$ |
| 85° | $P_{Micro\text{-}texture}(\alpha)$ | $P_{Macro\text{-}texture}(\alpha)$ |
| 86° | $P_{Micro\text{-}texture}(\alpha)$ | $P_{Macro\text{-}texture}(\alpha)$ |
| 87° | $P_{Micro\text{-}texture}(\alpha)$ | $P_{Macro\text{-}texture}(\alpha)$ |
| 88° | $P_{Micro\text{-}texture}(\alpha)$ | $P_{Macro\text{-}texture}(\alpha)$ |
| 89° | $P_{Micro\text{-}texture}(\alpha)$ | $P_{Macro\text{-}texture}(\alpha)$ |

In practice there may exist multiple road texturing LUTs that represent various surface material types and various road surface installation variations. FIG. 49 illustrates embodiments whereby a coefficient of friction is determined for a roadway, the determination being made prior to a vehicle 810 traversing the measured point on the roadway.

An active imaging sensor 812 on board a vehicle 810 measures a reflectivity value for a location 814 with a known normal angle 816 for a surface on a roadway. The reflectivity measurement is made along a retroreflectivity axis 818 that defines the angle at which a radiance signal is emitted from the location 814. An entrance angle defines the angle between the surface normal angle 816 and the retroreflectivity axis 818.

In embodiments, utilizing relationships from Eqs. 52-54, a coefficient of friction of a road surface of a known type, as dynamically determined by a reflectivity measurement of a location on a roadway surface at a known entrance angle, is expressed as:

$$\mu(S,\alpha)=[C(S)_{Micro-texture}*Rs(\alpha)*P_{Micro-texture}(S,\alpha)+C$$
$$(S)_{Macro-texture}*Rs(\alpha)*P_{Macro-texture}(S,\alpha)]/$$
$$F_{VerticalLoad} \qquad \text{Eq. 55}$$

Where $C(S)_{Micro-texture}$ is a force conversion constant for surface type S $C(S)_{Micro-texture}$ is a force conversion constant for surface type S $\alpha$ is the entrance angle at which a reflectivity measurement is made $Rs(\alpha)$ is a coefficient of specular reflection for a road surface location $P_{Micro-texture}(S,\alpha)$ is a percentage of reflected signal due to micro-texture $P_{Micro-texture}(S,\alpha)$ is a percentage of reflected signal due to macro-texture In embodiments, macro-texture and micro-texture elements are considered in Eq. 55 according to texturing LUT percentages. For known or detected wet roadway conditions, Eq. can be modified to eliminate the micro-texture numerator term because friction performance on wet roadways primarily depends on the hysteresis, or macro-texturing, numerator component.

Various different embodiments taken from the disclosure as set forth in the specification, figures and claims of the priority application are summarized by titles, abstracts and claim language as follows:

A Lighting-Invariant Sensor for Generating Reflectivity Values for Objects in a Scene Abstract—Lighting-invariant imaging produces consistent output for all weather conditions and all lighting conditions within a scene. Flux density output from a lighting-invariant sensor and radiance determination from photodetector intensity values are predetermined as being either known or calibrated on a per-pixel basis. Reflectivity values of objects are produced in real-time, non-real-time, or cloud processing based on radiance values of pixels and objects and the associated incident flux density values for those same pixels or objects.

FIG. 5 illustrates an embodiment of a lighting-invariant imaging sensor on board a vehicle for use in determining reflectivity values for a roadway scene as characterized by the following:

A lighting-invariant imaging sensor configured to generate reflectivity values for objects in a scene comprising:

at least one emitter configured to emit active light toward the scene as predetermined flux densities of emitted light throughout a field of illumination that includes at least a portion of the scene;

an array of photodetectors configured to receive light for a field of view that includes at least a portion of the scene, wherein each photodetector in the array of photodetectors is configured to produce a captured intensity value as a response to a number of incident photons of light;

control circuitry operably coupled to the at least one emitter and the array of photodetectors and configured to store an image of data as image pixels in at least one frame buffer, wherein a frame buffer intensity value of each image pixel is based on the captured intensity value of a set of corresponding photodetectors; and a processing system operably coupled to the control circuitry and the at least one frame buffer to generate a reflectivity value for one or more image pixels of the scene, wherein the processing system is configured to:

utilize the predetermined flux densities of emitted light to determine a flux density of incident light for a given image pixel; and utilize the frame buffer intensity value of the given image pixel to convert the frame buffer intensity value to a radiance value; and generate a reflectivity value for a given image pixel according to a formula in which the reflectivity value equals the radiance value divided by the flux density for the given image pixel.

The lighting-invariant imaging sensor, wherein the predetermined flux densities of the emitted light are selected from the set of either known flux densities or calibrated flux densities.

The lighting-invariant imaging sensor, wherein the active imaging sensor and the control circuitry are on board a vehicle and the processing system consists of one or more of: an on board processing system and an off board processing system.

The lighting-invariant imaging sensor, wherein the at least one emitter comprises one or more light sources selected from the set of: an LED, a laser, a laser diode and one or more vehicle headlamps.

The lighting-invariant imaging sensor, wherein the at least one frame buffer comprises at least two successive frame buffers, and wherein the processing system is configured to:

analyze the at least two successive frame buffers to determine a minimum intensity value due to ambient light in the scene and a maximum intensity value for the image pixels; and generate a lighting-invariant image based on a difference between the minimum intensity values and the maximum intensity values of the image pixels such that the lighting-invariant image is based on a portion of the reflectivity values corresponding to a reflected portion of the emitted light.

Calibrated Imaging System for Optically Determining 6-DOF Information for a Moving Object Abstract—A calibrated imaging system includes an imaging sensor with a calibrated boresight pixel having a boresight axis parallel to and in the same direction as x-axis movement of a moving object that is operably coupled to a processing system to determine six-degree-of-freedom (6-DOF) movement of the moving object, such as a vehicle. In various embodiments, the processing system can be on board the moving object and one or more forward-facing and rear-facing calibrated imaging sensors can be used to determine 6-DOF movement for the moving object.

FIG. 6 illustrates an embodiment of x-axis, y-axis and z-axis movement and roll, pitch and yaw rotation for a moving vehicle as characterized by the following:

An imaging sensor system for optically determining six degree-of-freedom (DOF) information for a moving object moving in an environment, the system comprising:

an imaging sensor system with a photodetector array carried by the moving object, wherein the imaging sensor system is configured to:

define a known pixel location in the photodetector array as a boresight pixel;

calibrate a view axis of the boresight pixel relative to a forward motion axis of the moving object by a boresight angle, define an optical center of the photodetector array that is determined to be a known height above a surface over which the moving object is traveling; and capture and store at least two successive images of a scene of the environment surrounding the moving object, wherein each image is captured during a capture cycle and stored as an image of data of image pixels in one or more frame buffers; and a processing system operably coupled to the imaging sensor system to generate a series of images of the scene, wherein the processing system is configured to analyze the at least two successive images of data to:

determine image locations of a set of matching objects each of which is common to the at least two successive images;

determine whether which of the set of matching objects are surface objects that lie on the surface over which the moving object is traveling using the boresight angle and the known height of the photodetector array;

determine an amount of forward, x-axis movement for the moving object along the forward motion axis of the moving object;

project the set of matching objects from a previous image into a current image based on the amount of forward, x-axis movement for the moving object;

determine roll movement of the imaging sensor system based on a set of angular displacements between corresponding ones of the set of matching objects projected from the prior image and the set of matching objects projected into the current image;

determine pitch and z-axis movement based on vertical displacement between corresponding ones of the set of matching objects projected from the prior image and the set of matching objects projected into the current image space; and determine yaw and y-axis movement based on horizontal displacement between corresponding ones of the set of matching objects projected from the prior image and the set of matching objects projected into the current image space.

The imaging sensor system, wherein the imaging sensor system comprises at least one of an active imaging sensor system and a passive imaging sensor system.

The imaging sensor system, wherein the imaging sensor system is on board the moving object and the processing system consists of one or more of: an on board processing system and an off board processing system.

The imaging sensor system, wherein the processing system determines x-axis movement, roll movement, z-axis movement, and y-axis movement of the imaging sensor system based on one of: only the imaging sensor system, or the imaging sensor system and at least one additional inertial movement unit sensor.

The active imaging sensor, wherein the active light source consisting of at least one emitter comprises one or more light sources selected from the set of: an LED, a laser, a laser diode, and one or more vehicle headlamps.

The imaging sensor system, wherein the moving object is a vehicle and the surface over which the moving object is traveling is a roadway and surface objects that lie on the roadway include surface markers.

System for Optical Determination of Coefficient of Friction for a Surface

Abstract—Friction plays a vital role in keeping vehicles on the road, as adequate surface friction is necessary for a driver or a control system to control/maneuver a vehicle in a safe manner, in both longitudinal and lateral directions. Providing adequate friction for safe driving is a key input for highway geometric design, as it is used in determining the adequacy of minimum stopping sight distance, minimum horizontal radius, minimum radius of crest vertical curves, and maximum super-elevation in horizontal curves. Roadway safety is enhanced with a system that determines the tangential friction force of a road surface prior to a vehicle traversing a roadway. An optical system that determines tangential friction force and coefficient of friction for the road surface in real-time allows a driver or a vehicle safety system to take corrective action in response to changes in road surface friction and to adjust speed or trajectory for roadway topology based on such changes.

FIG. 49 illustrates an embodiment whereby a coefficient of friction is determined for a roadway as characterized by the following:

An image processing system for determining a tangential friction force for a surface comprising:

an active imaging sensor including at least one emitter configured to emit active light toward the surface as predetermined flux densities of emitted light throughout a field of illumination that includes at least a portion of the surface;

an array of photodetectors configured to receive light for a field of view that includes the portion of the surface, wherein each photodetector in the array of photodetectors is calibrated to produce a captured intensity value as a response to a number of incident photons of light;

control circuitry operably coupled to the at least one emitter and the array of photodetectors and configured to store an image of data as image pixels in at least one frame buffer, wherein a frame buffer intensity value of each image pixel is based on the captured intensity value of a set of corresponding photodetectors; and a processing system operably coupled to the at least one frame buffer, wherein the processing system is configured to:

determine a flux density of incident light for a given image pixel based on the predetermined flux densities of emitted light; and utilize the frame buffer intensity value of the given image pixel to convert the frame buffer intensity value to a radiance value;

generate a reflectivity value for a given image pixel based on the radiance value and the flux density for the given image pixel;

determine a set of image pixels that represent the surface and for each of such surface pixels compute a set of characteristic values, including:

a reflectivity value computed by the radiance value divided by the flux density of the surface pixel;

a normal angle to the surface; and an entrance angle defined as an angular orientation between an optical path of the surface pixel and the normal angle to the surface;

compute a macro-texture percentage and a micro-texture percentage for the set of surface pixels based on the set of characteristic values of the surface pixels; and compute a tangential friction force for the surface based on a magnitude of the macro-texture percentage and the micro-texture percentage as a percentage of a total surface area for the set of surface pixels.

The image processing system, wherein the active imaging sensor is a lighting-invariant imaging sensor.

The image processing system, wherein the at least one emitter comprises one or more light sources selected from the set of: an LED, a laser, a laser diode, and one or more vehicle headlamps.

The image processing system, wherein the surface comprises a roadway surface and preferably comprises asphalt or concrete.

The image processing system, wherein the processing system is further configured to compute a coefficient of friction for the surface by dividing the tangential friction force by one of a perpendicular force or a vertical load.

The image processing system, wherein the set of surface pixels used to compute the tangential friction force are selected from one of a single image or multiple images.

The image processing system, wherein the predetermined flux densities of the emitted light are selected from the set of either known flux densities or calibrated flux densities.

The image processing system, wherein the surface comprises a roadway and the image processing system is carried by a vehicle traversing the roadway, and whereby the tangential friction force is used in modifying operational parameters of the vehicle.

System for Generating Authenticated Trajectories for a Vehicle System

Abstract—Map-based vehicle trajectories based on Global Navigation Satellite System (GNSS) coordinates can lead to unsafe conditions for road-based vehicles in situations involving GNSS hacking, spoofing, or outages that can render navigation systems incapable of directing vehicles along prescribed travel paths. A system for a vehicle vision system adds physical feature references to trajectory polyline points to create authenticated trajectories, thus allowing the on-board vision systems the ability to authenticate the physical feature references in active sensor views of a roadway. The creation and utilization of such authenticated trajectories can lead to safer vehicle travel.

FIG. 45 illustrates an embodiment whereby an authenticated trajectory is generated for a roadway as characterized by the following:

A system for generating authenticated trajectories for a map comprising:

an active imaging sensor having at least one emitter and a photodetector array configured to capture intensity values and determine reflectivity values for pixels in an image of a scene stored as image pixels in at least one frame buffer; and a processing system operably coupled to the at least one frame buffer, wherein the processing system is configured to:

identify a set of image vectors that each represent a segmented portion of the image for which a polygon of pixels have reflectivity values in common;

from the set of image vectors, identify a subset of image vectors that define edges of allowable travel lanes of a roadway on the map; and generate polyline points corresponding to the edges that represent authenticated trajectories for the map, each polyline point including offsets from the polygon of pixels from the subset of image vectors that form a basis for a location of the polyline point, whereby the polyline points are stored in a digital representation of the map configured to be used by a vehicle vision system as authenticated trajectories for the roadways on the map.

The authenticated trajectory generation system, wherein the active imaging sensor is a lighting-invariant imaging sensor.

The authenticated trajectory generation system, wherein the active imaging sensor system is on board a vehicle and the operably-coupled processing system consists of one or more of an on board processing system and an off board processing system.

The authenticated trajectory generation system, wherein the image vector comprises a data structure that describes a set of vertices of an object-bounding polygon produced from one of an edge-detection processor and a corner-feature-detection processor.

The authenticated trajectory generation system, wherein the polyline points include spatial attributes.

A vehicle navigation system that utilizes authenticated trajectories comprising:

an active imaging sensor having at least one emitter and a photodetector array configured to capture intensity values and determine reflectivity values for pixels in an image of a scene;

a digital map that includes authenticated trajectories whereby each trajectory polyline point including offsets from image vector polygon pixels from a plurality of image vector representations that form a basis for a location of each trajectory polyline point; and a processing system operably coupled to the vehicle navigation system, the processing system configured to, for each trajectory polyline point:

identify image vectors for polygons of pixels with reflectivity values in common, the image vectors identified in an image that represents segmented portions of an image that includes the each trajectory polygon point;

identify the image vectors that form a basis for a location of the each trajectory polyline point;

authenticate that the image vector representations that form the basis for the each trajectory polyline point are identified and located within the image vector representations of the image; and generate a notification to the navigation system that the trajectory polyline point has been authenticated by the processing system.

The vehicle navigation system, wherein the active imaging sensor is a lighting-invariant imaging sensor.

The vehicle navigation system, wherein the image vector comprises a data structure that describes a set of vertices of an object-bounding polygon produced from one of an edge-detection processor and a corner-feature-detection processor.

The vehicle navigation system, wherein the polyline points include spatial attributes.

System for Automated Image Conflation of Scenes
for a Roadway

Abstract—Conflation of scene vectors and object vectors with orthophotos is utilized to provide higher-spatial-accuracy HD Maps than can be obtained via sensor pose estimation and photogrammetry. Various imagery sources form the input to a conflation process, such as an orthophoto of a section of a roadway with an attribution layer that contains spatial information for each image pixel and a sensor view of a roadway corresponding to an image collected from a vehicle on a roadway. A sensor pose estimation is computed for the sensor view of the roadway. In preparation for conflation, the estimated sensor pose is identified in the orthophoto, along with a projection of the sensor field of view. Conflation is performed for relevant identified sensor image pixels within the field of view on the orthophoto.

FIG. 34 illustrates an embodiment of conflation of a vector-based imaging sensor and an orthophoto utilizing sensor pose estimation as characterized by the following:

An automated image conflation system for scenes for a roadway comprising:

an active imaging sensor including at least one emitter;

a photodetector array configured to capture intensity values and determine reflectivity values for pixels in an image of a scene that are stored in a frame buffer; and a calibration matrix specifying angular offsets for all pixels from an optical center of the photodetector array;

a pose processing system configured to provide an estimated sensor pose for the active imaging sensor based on the optical center of the photodetector array at a known height above the roadway; and an image processing system operably coupled to the active imaging sensor system and the pose processing system, the image processing system configured to:

identify features in an image of the scene that display a contrast in reflectivity values; and for each feature, utilize the calibration matrix and the estimated sensor pose to compute a spatial location of the feature;

identify features in an orthophoto of the scene that match identified features in the image of the scene; and utilize location information for matched identified features in the orthophoto to modify the spatial location of each feature in the image based on a spatial location of the corresponding matched identified feature in the orthophoto.

In embodiments, the systems and/or their components or subsystems described herein can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing, processing, and other such devices discussed herein are therefore configured to perform basic arithmetical, logical, and input/output operations.

Computing, processing, and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In embodiments, the processing systems or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In embodiments, the systems, circuitry, processors and memory, including frame buffers, may be operably interconnect by wired or wireless connections and/or communications. Wired connections can include serial, parallel or bus-based electrical and/or fibre optic communications. Wireless connections such as Bluetooth, Zigbee, WiFi, 3G, 4G, 5G or the like utilizing standard wireless communication protocols. Persons of ordinary skill in the relevant arts will recognize that embodiments may comprise fewer features than illustrated in any individual embodiment described above. The embodiments described herein are not meant to be an exhaustive presentation of the ways in which the various features of the embodiments may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. An image processing system for determining a coefficient of friction for a surface comprising:

an active imaging sensor including:

at least one emitter configured to emit active light toward the surface as predetermined flux densities of emitted light throughout a field of illumination that includes at least a portion of the surface;

at least one photodetector configured to receive light for a field of view that includes the portion of the surface, wherein the at least one photodetector is configured to produce an intensity value in response to a number of incident photons of light;

control circuitry operably coupled to the at least one emitter and the at least one photodetector and configured to store an image of data as image pixels in at least one frame buffer, wherein a frame buffer intensity value of each image pixel is based at least in part on the intensity value of the at least one photodetector; and a processing system operably coupled to the at least one frame buffer, wherein the processing system is configured to:

determine a flux density of incident light for a given image pixel based on the predetermined flux densities of emitted light; and utilize the frame buffer intensity value of the given image pixel to convert the frame buffer intensity value to a radiance value;

compute a reflectivity value for a given image pixel based on dividing the radiance value by the flux density for the given image pixel;

determine a set of image pixels that represent the surface and for each of such surface pixels compute a set of characteristic values, including:

a normal angle to the surface, and an entrance angle value defined as an angle between a surface normal angle and an angle at which a reflected signal contacts the surface; and compute a coefficient of friction for the surface based on the reflectivity values and the entrance angle values for the set of surface pixels.

2. The image processing system of claim 1, wherein the surface comprises an asphalt or concrete roadway surface.

3. The image processing system of claim 1, wherein the processing system is further configured to compute the coefficient of friction for the surface based on utilizing a plurality of texturing look-up tables (LUTs) for one or more road surface types.

4. The image processing system of claim 1, wherein the surface comprises a roadway and the image processing system is carried by a vehicle traversing a location on the roadway that is represented in the image data, and whereby the coefficient of friction is configured to be used in modifying operational parameters of the vehicle.

5. The image processing system of claim 1, wherein the set of intensity values used to compute the coefficient of friction is selected from one of a single image or multiple images.

6. The image processing system of claim 1, wherein predetermined flux densities of the emitted light are selected from the set of either known flux densities or calibrated flux densities.

7. The image processing system of claim 1, wherein the active imaging sensor is configured to a vehicle and the processing system comprises one or more of an on board processing system and an off board processing system.

8. The image processing system of claim 1, wherein the at least one emitter comprises one or more light sources selected from the set of: an LED, a laser, a laser diode, and one or more vehicle headlamps.

* * * * *